US012763468B2

(12) United States Patent
Kim et al.

(10) Patent No.: US 12,763,468 B2
(45) Date of Patent: Oct. 13, 2026

(54) ELECTRONIC APPARATUS COMPRISING ANTENNA

(71) Applicant: SAMSUNG ELECTRONICS CO., LTD., Suwon-si (KR)

(72) Inventors: Jiho Kim, Suwon-si (KR); Junwoo Kim, Suwon-si (KR); Kyungjae Lee, Suwon-si (KR); Sungjun Lee, Suwon-si (KR); Jungmin Cho, Suwon-si (KR); Soonho Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 112 days.

(21) Appl. No.: 18/788,993

(22) Filed: Jul. 30, 2024

(65) Prior Publication Data

US 2025/0030165 A1 Jan. 23, 2025

Related U.S. Application Data

(63) Continuation of application No. PCT/KR2024/010552, filed on Jul. 22, 2024.

(30) Foreign Application Priority Data

Jul. 20, 2023 (KR) ........................ 10-2023-0094644
Jul. 25, 2023 (KR) ........................ 10-2023-0097076
Oct. 20, 2023 (KR) ........................ 10-2023-0141251

(51) Int. Cl.
*H01Q 5/378* (2015.01)
*H01Q 5/50* (2015.01)
(Continued)

(52) U.S. Cl.
CPC ............... *H01Q 5/378* (2015.01); *H01Q 5/50* (2015.01); *H04M 1/0216* (2013.01); *H01Q 1/241* (2013.01)

(58) Field of Classification Search
CPC .......... H01Q 5/378; H01Q 5/50; H01Q 1/241; H01Q 1/243; H01Q 1/48; H04M 1/0216; H04M 1/0268
See application file for complete search history.

(56) References Cited

U.S. PATENT DOCUMENTS

2011/0057847 A1* 3/2011 Iwai ....................... H01Q 1/243 343/702
2019/0140342 A1 5/2019 Lim et al.
(Continued)

FOREIGN PATENT DOCUMENTS

CN 217215072 U 8/2022
CN 115249889 A 10/2022
(Continued)

OTHER PUBLICATIONS

International Search Report and Written Opinion (PCT/ISA/210 and PCT/ISA/237) dated Oct. 22, 2024, issued by International Searching Authority for International Application No. PCT/KR2024/010552.

(Continued)

*Primary Examiner* — Dameon E Levi
*Assistant Examiner* — Jordan E. DeWitt
(74) *Attorney, Agent, or Firm* — Sughrue Mion, PLLC

(57) ABSTRACT

An electronic device includes: a first housing; a second housing; a hinge structure coupled with the first and second housings so that the first and second housings are foldable relative to each other; and a wireless communication circuit on the second housing, wherein the second housing includes: a sixth side portion; a fifth side portion facing the sixth side portion; a fourth side portion facing the hinge structure; a third corner portion between the sixth side portion and the fourth side portion; a fourth corner portion between the fifth side portion and the fourth side portion; and a first matching circuit coupled with the sixth side (Continued)

portion and configured to induce a second surface current having a second phase opposite to a first phase of a first surface current induced on the first and second housings and the hinge structure based on the electronic device being in a folded state.

17 Claims, 74 Drawing Sheets

(51) Int. Cl.
*H04M 1/02* (2006.01)
*H01Q 1/24* (2006.01)

(56) References Cited

U.S. PATENT DOCUMENTS

| | | | | |
|---|---|---|---|---|
| 2019/0379288 | A1* | 12/2019 | Chaput | H02M 1/083 |
| 2020/0266524 | A1* | 8/2020 | Yoon | H01Q 1/243 |
| 2021/0099019 | A1* | 4/2021 | Lee | H02J 50/12 |
| 2021/0318720 | A1* | 10/2021 | Lin | H01Q 1/243 |
| 2022/0061175 | A1* | 2/2022 | Oh | H01Q 21/28 |
| 2022/0115768 | A1* | 4/2022 | Oh | H01Q 5/328 |
| 2022/0183173 | A1 | 6/2022 | Kim et al. | |
| 2023/0046925 | A1 | 2/2023 | Jang et al. | |
| 2023/0262151 | A1 | 8/2023 | Yun et al. | |
| 2023/0269314 | A1* | 8/2023 | Yun | H01Q 5/328<br>455/73 |
| 2023/0395970 | A1 | 12/2023 | Kim et al. | |
| 2024/0014575 | A1* | 1/2024 | Liao | H01Q 21/28 |
| 2025/0183927 | A1* | 6/2025 | Lee | H04B 17/11 |

FOREIGN PATENT DOCUMENTS

| | | | |
|---|---|---|---|
| CN | 115360512 | A | 11/2022 |
| CN | 115395233 | A | 11/2022 |
| CN | 115426424 | A | 12/2022 |
| CN | 116420349 | A | 7/2023 |
| KR | 10-2022-0052663 | A | 4/2022 |
| KR | 10-2022-0060900 | A | 5/2022 |
| KR | 10-2022-0079374 | A | 6/2022 |
| KR | 10-2022-0118201 | A | 8/2022 |
| KR | 10-2022-0146811 | A | 11/2022 |
| KR | 10-2023-0023543 | A | 2/2023 |
| KR | 10-2023-0048287 | A | 4/2023 |
| WO | 2024/060479 | A1 | 3/2024 |

OTHER PUBLICATIONS

Extended European Search Report dated Aug. 12, 2026, issued by the European Patent Office in European Application No. 24843571.1.

* cited by examiner

ELECTRONIC APPARATUS COMPRISING ANTENNA

CROSS-REFERENCE TO RELATED APPLICATIONS

This application is a continuation application of International Application No. PCT/KR2024/010552, filed on Jul. 22, 2024, which claims priority to Korean Patent Application No. 10-2023-0094644, filed on Jul. 20, 2023, Korean Patent Application No. 10-2023-0097076, filed on Jul. 25, 2023, and Korean Patent Application No. 10-2023-0141251 filed on Oct. 20, 2023, in the Korean Intellectual Property Office, the disclosures of which are incorporated by reference herein in their entireties.

BACKGROUND

1. Field

The present disclosure relates to an electronic device comprising an antenna.

2. Description of Related Art

A foldable electronic device may include a first housing and a second housing configured to be rotatably connected to the first housing through a hinge device. In such a foldable electronic device, at least a portion of a metal frame (e.g., a metal bezel) provided on the side surface of the first housing and/or the second housing may be used as an antenna. The antenna may be designed so that radiation performance may not be degraded according to a folding or unfolding operation of the electronic device.

SUMMARY

An electronic device may include a foldable electronic device including a first housing and a second housing foldably connected to the first housing through a hinge device. The electronic device may include a flexible display used in an unfolding state and provided to receive support of at least a portion of the second housing from the first housing through the hinge device. The foldable electronic device may include at least one antenna (e.g., a metal frame antenna) provided in an interior space of at least one housing or using at least a portion of a conductive side surface. The volume and number of such antennas may be determined based on a frequency, a bandwidth, and/or a type for each service provided by the electronic device.

The foldable electronic device may use a metal frame to reinforce its rigidity and, in a folded state, a metal frame of the first housing and a metal frame of the second housing may form a flattened “U” shape. However, planar parasitic resonance may occur through a conductive sheet (e.g., a copper (Cu) sheet) of the flexible display provided therein. Such a parasitic resonance may degrade radiation performance of the foldable electronic device.

The first housing and conductive portions included in the first housing, such as a conductive support member provided to the first housing and in which parasitic resonance may occur according to radiation current, the ground of the flexible display, the conductive side surface, and/or the metal frame, may be collectively referred to as the first housing. Similarly, the second housing and conductive portions included in the second housing, such as a conductive support member provided to the second housing and in which parasitic resonance may occur according to radiation current, the ground of the flexible display, the conductive side surface, and/or the metal frame, may be collectively referred to as the second housing.

Various embodiments of the present disclosure may provide an electronic device including an antenna that may help improve radiation performance by guiding a parasitic resonance frequency generated in a folded state to a band other than an operating frequency band (e.g., an out band) of the antenna.

According to an aspect of the disclosure, an electronic device includes: a first housing; a second housing including a second support member; a hinge structure coupled with the first housing and the second housing so that the first housing and the second housing are foldable relative to each other using the hinge structure as a central axis; and a wireless communication circuit provided on the second support member of the second housing, wherein the second housing further includes: a sixth side portion including a first conductive portion; a fifth side portion facing the sixth side portion and including a second conductive portion; a fourth side portion facing the hinge structure and including a third conductive portion; a third corner portion between the sixth side portion and the fourth side portion and including a fourth conductive portion; a fourth corner portion between the fifth side portion and the fourth side portion and including a fifth conductive portion; and a first matching circuit provided on the second support member, electrically coupled with the sixth side portion, and configured to induce a second surface current having a second phase opposite to a first phase of a first surface current induced on the first housing, the second housing, and the hinge structure based on the electronic device being in a folded state in which the first housing and the second housing are folded with respect to each other.

According to an aspect of the disclosure, an electronic device includes: a first housing; a second housing including a second support member; a hinge structure coupled with the first housing and the second housing so that the first housing and the second housing are foldable relative to each other using the hinge structure as a central axis; and a wireless communication circuit provided on the second support member of the second housing, wherein the second housing further includes: a sixth side portion including a first conductive portion; a fifth side portion facing the sixth side portion and including a second conductive portion; a fourth side portion facing the hinge structure and including a third conductive portion; a third corner between the sixth side portion and the fourth side portion and including a fourth conductive portion; a fourth corner portion between the fifth side portion and the fourth side portion and including a fifth conductive portion; and a first matching circuit on the second support member, electrically coupled with the sixth side portion and the fourth corner portion, and configured to induce a second surface current having a second phase opposite to a first phase of a first surface current induced to the first housing, the second housing, and the hinge structure based on the electronic device being in a folded state in which the first housing and the second housing are folded with respect to each other using the hinge structure as the central axis.

In addition, various effects directly or indirectly identified herein may be provided.

The effects that may be obtained from the present disclosure are not limited to the effects mentioned above and still other effects not mentioned may be clearly understood by one of ordinary skill in the art to which the present disclosure pertains from the following description.

BRIEF DESCRIPTION OF THE DRAWINGS

The above and other aspects, features, and advantages of certain embodiments of the present disclosure may be more apparent from the following description taken in conjunction with the accompanying drawings, in which.

DETAILED DESCRIPTION

Figure 1:
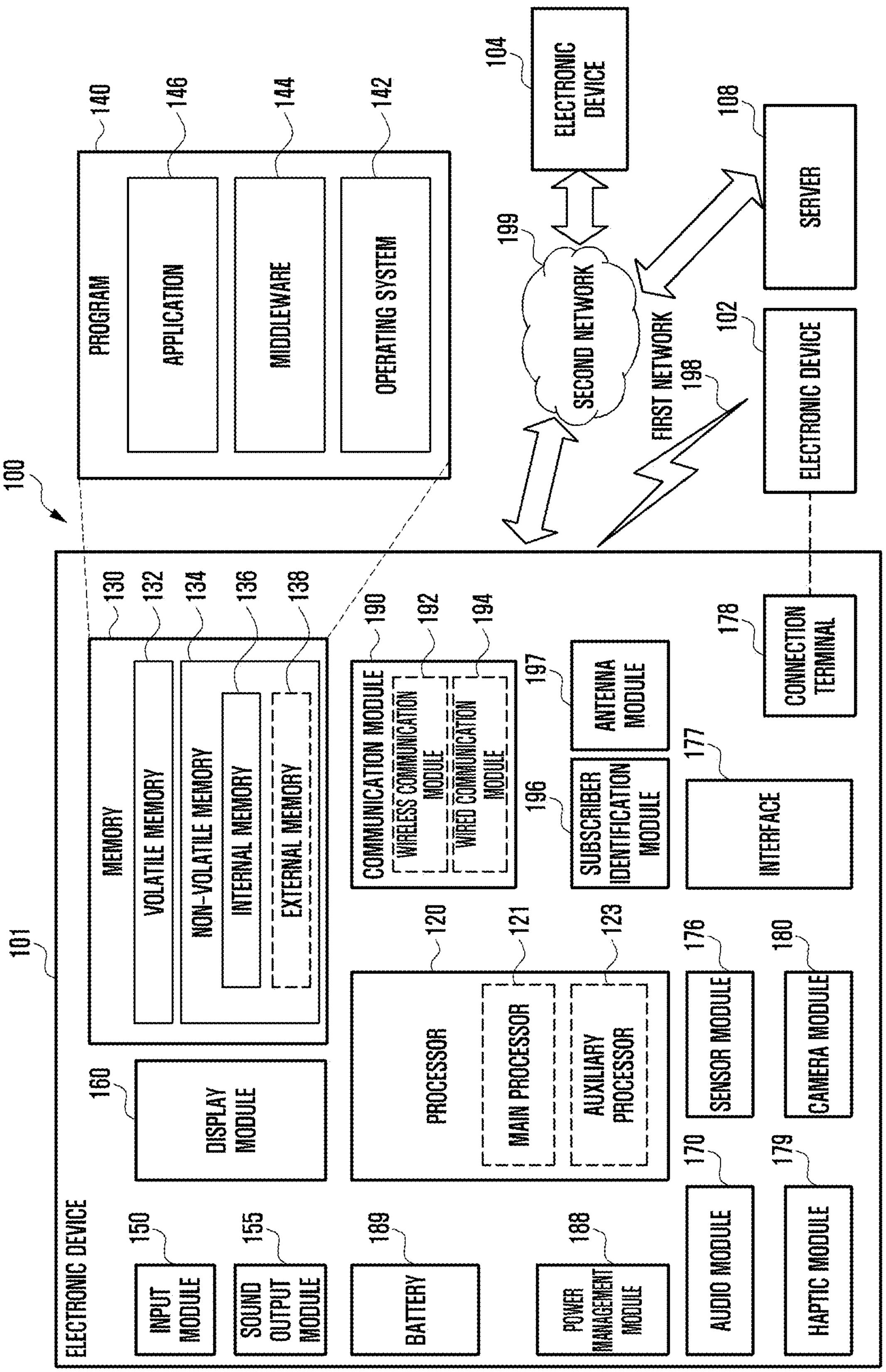
FIG. 1 is a block diagram of an electronic device in a network environment, according to various embodiments.

In the following, embodiments of the present disclosure are described with reference to the drawings to facilitate practice by one of ordinary skill in the art to which the disclosure pertains. However, the disclosure may be implemented in many different forms and is not limited to the embodiments described herein. With respect to the description in the drawings, the same or similar reference numerals may be used for the same or similar components. Also, in the drawings and associated descriptions, descriptions of well-known functions and configurations may be omitted for clarity and brevity.

It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

It is to be understood that when an element or layer is referred to as being "over," "above," "on," "below," "under," "beneath," "connected to" or "coupled to" another element or layer, it may be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present.

The terms "upper," "middle", "lower", and the like may be replaced with terms, such as "first," "second," third" to be used to describe relative positions of elements. The terms "first," "second," third" may be used to describe various elements but the elements are not limited by the terms and a "first element" may be referred to as a "second element". Alternatively or additionally, the terms "first", "second", "third", and the like may be used to distinguish components from each other and do not limit the present disclosure. For example, the terms "first", "second", "third", and the like may not necessarily involve an order or a numerical meaning of any form.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment. The embodiments described herein are example embodiments, and thus, the disclosure is not limited thereto and may be realized in various other forms.

The embodiments herein may be described and illustrated in terms of blocks, as shown in the drawings, which carry out a described function or functions. These blocks, which may be referred to herein as units or modules or the like, or by names such as device, logic, circuit, controller, counter, comparator, generator, converter, or the like, may be physically implemented by analog and/or digital circuits including one or more of a logic gate, an integrated circuit, a microprocessor, a microcontroller, a memory circuit, a passive electronic component, an active electronic component, an optical component, and the like.

In the present disclosure, the articles "a" and "an" are intended to include one or more items, and may be used interchangeably with "one or more." Where only one item is intended, the term "one" or similar language is used. For example, the term "a processor" may refer to either a single processor or multiple processors. When a processor is described as carrying out an operation and the processor is referred to perform an additional operation, the multiple operations may be executed by either a single processor or any one or a combination of multiple processors.

Hereinafter, various embodiments of the present disclosure are described with reference to the accompanying drawings.

FIG. 1 is a block diagram illustrating an example electronic device 101 in a network environment 100, according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor

121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing or training. An artificial intelligence model may be generated by machine learning. Such learning may be performed (e.g., by the electronic device 101) where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be and/or may include a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure. That is, the artificial intelligence model may be implemented in software, in hardware (e.g., circuitry), and/or a combination thereof.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include one or more of the group of, for example, a microphone, a mouse, a keyboard, a key (e.g., a button), and a digital pen (e.g., a stylus pen). That is, the input module 150 may be connected to the members of the group.

The sound output module 155 may output sound signals to the outside of the electronic device 101. The sound output module 155 may include, for example, a speaker or a receiver. The speaker may be used for general purposes, such as playing sound, for example, multimedia or playing recordings or for communication. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) and/or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may be and/or may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) and/or wirelessly. According to an embodiment, the interface 177 may be and/or may include, for example, a high definition multimedia interface (HDMI), a universal serial bus (USB) interface, a secure digital (SD) card interface, an audio interface, or the like.

A connecting terminal 178 may be and/or may include a connector via which the electronic device 101 may be physically connected with the external electronic device (e.g., the electronic device 102). According to an embodiment, the connecting terminal 178 may include, for example, a HDMI connector, a USB connector, a SD card connector, an audio connector (e.g., a headphone connector), or the like.

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, an electric stimulator, or the like.

The camera module 180 may capture a still image or moving images. According to an embodiment, the camera module 180 may include one or more lenses, image sensors, image signal processors, flashes, or the like.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may be and/or may include, for example, a primary cell which is not rechargeable, a secondary cell which is rechargeable, a fuel cell, or the like.

The communication module 190 may support establishing a direct (e.g., wired) communication channel and/or a wireless communication channel between the electronic device 101 and the external electronic device (e.g., the electronic device 102, the electronic device 104, or the server 108) and performing communication via the established communication channel. The communication module 190 may include one or more communication processors that may be operable independently from the processor 120 (e.g., the AP) and may support a direct (e.g., wired) communication and/or a wireless communication. According to an embodiment, the communication module 190 may include a wireless communication module 192 (e.g., a cellular communication module, a short-range wireless communication module, or a global navigation satellite system (GNSS) communication module) and/or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as, but not limited to, a legacy cellular network, a fifth-generation (5G) network, a next-generation communication network, the Internet, or a computer network (e.g., a LAN and/or a wide area network (WAN)). These various types of communication modules may be implemented as a single component (e.g., a single chip), or may be implemented as multi components (e.g., multi chips) separate from each other. The wireless communication module 192 may identify and/or authenticate the electronic device 101 in a communication network, such as the first network 198 or the second network 199, using subscriber information (e.g., international mobile subscriber identity (IMSI)) that may be stored in the subscriber identification module 196.

The wireless communication module 192 may support one or more of a 5G network, a fourth-generation (4G) network, and next-generation communication technology (e.g., new radio (NR) access technology). The NR access technology may support enhanced mobile broadband (eMBB), massive machine type communications (mMTC), or ultra-reliable and low-latency communications (URLLC). The wireless communication module 192 may support a high-frequency band (e.g., a millimeter (mmWave) band) to achieve a high data transmission rate, for example. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, large scale antenna, or the like. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 dB or less) for implementing mMTC, or user plane (U-plane) latency (e.g., 0.5 milliseconds (ms) or less for each of downlink (DL) and uplink (UL), or a round trip of one (1) ms or less) for implementing URLLC.

The antenna module 197 may transmit and/or receive a signal and/or power to and/or from the outside (e.g., the external electronic device) of the electronic device 101. According to an embodiment, the antenna module 197 may include an antenna including a radiating element including a conductive material and/or a conductive pattern formed in and/or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal and/or the power may then be transmitted and/or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting and/or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands and/or data may be transmitted and/or received between the electronic device 101 and the external electronic device 104 via the server 108 coupled with the second network 199. Each of the electronic devices 102 or 104 may be and/or may include a device of a same type as, or a different type, from the electronic device 101. According to an embodiment, all or some of the operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be and/or may include an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology and/or IoT-related technology.

Figure 2A:
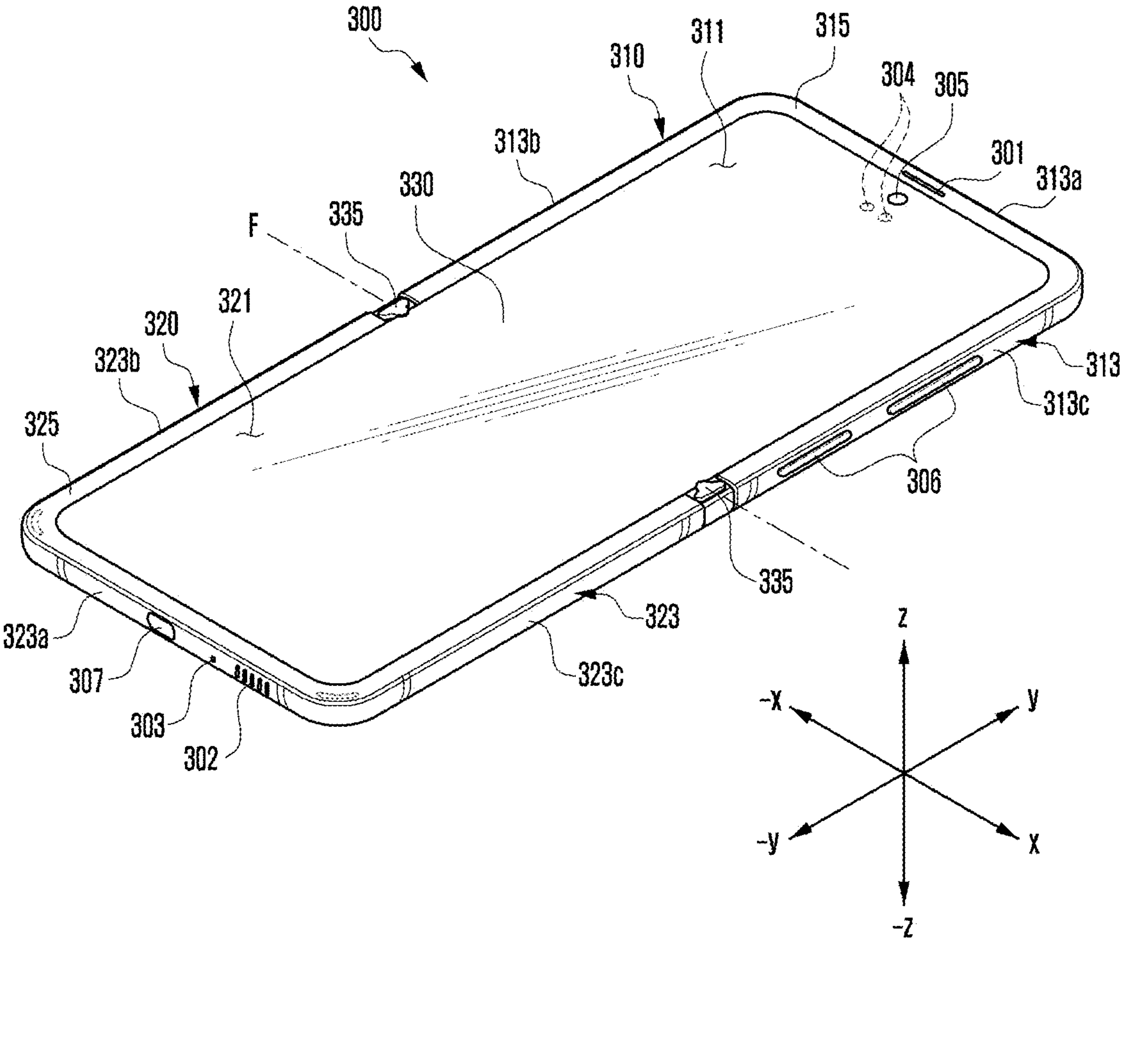
FIG. 2A is a perspective view of an electronic device illustrating a flat state or an unfolded state, according to various embodiments.
Figure 2B:
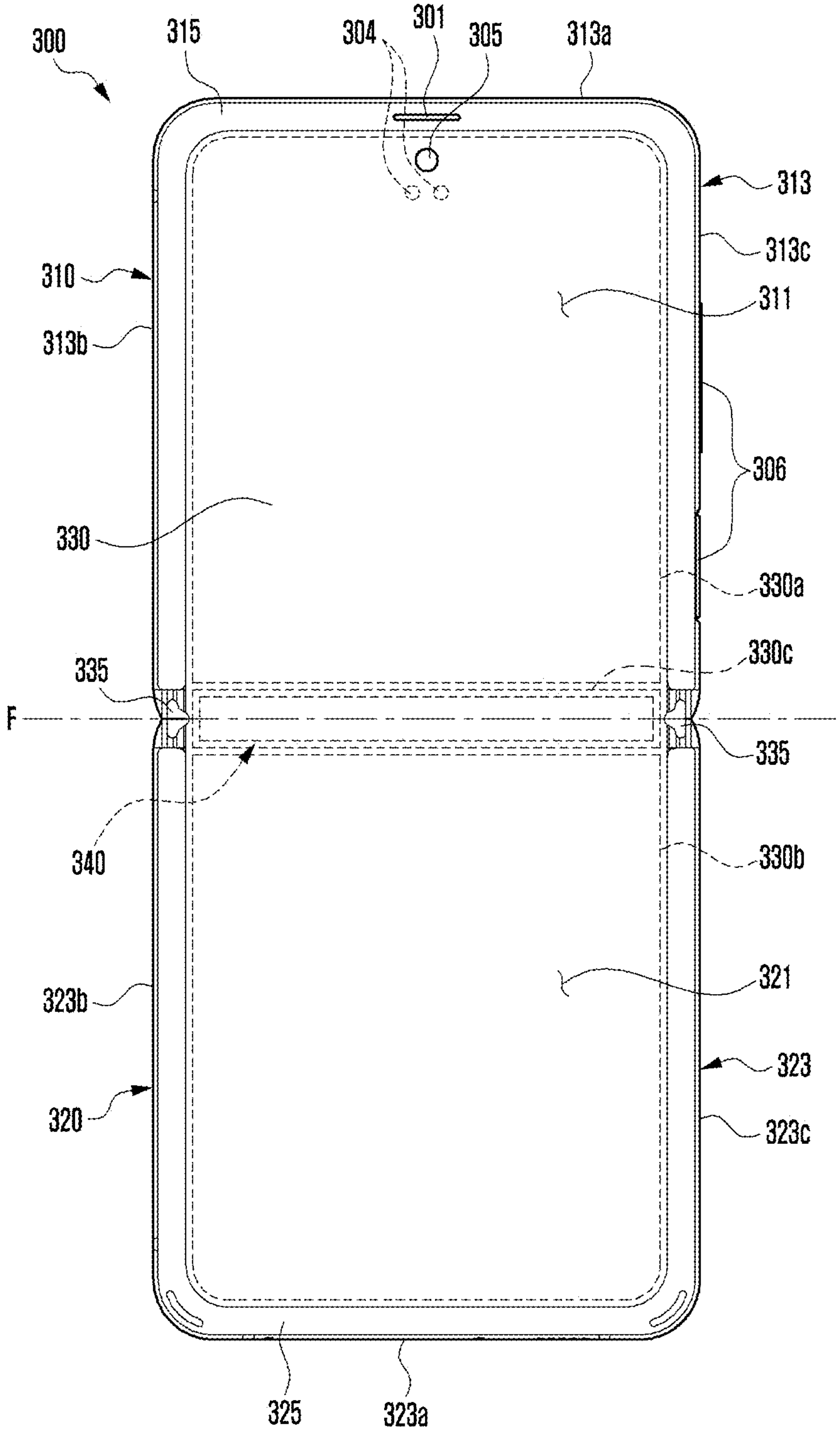
FIG. 2B is a plan view illustrating the front surface of the electronic device in the unfolded state, according to various embodiments.
Figure 2C:
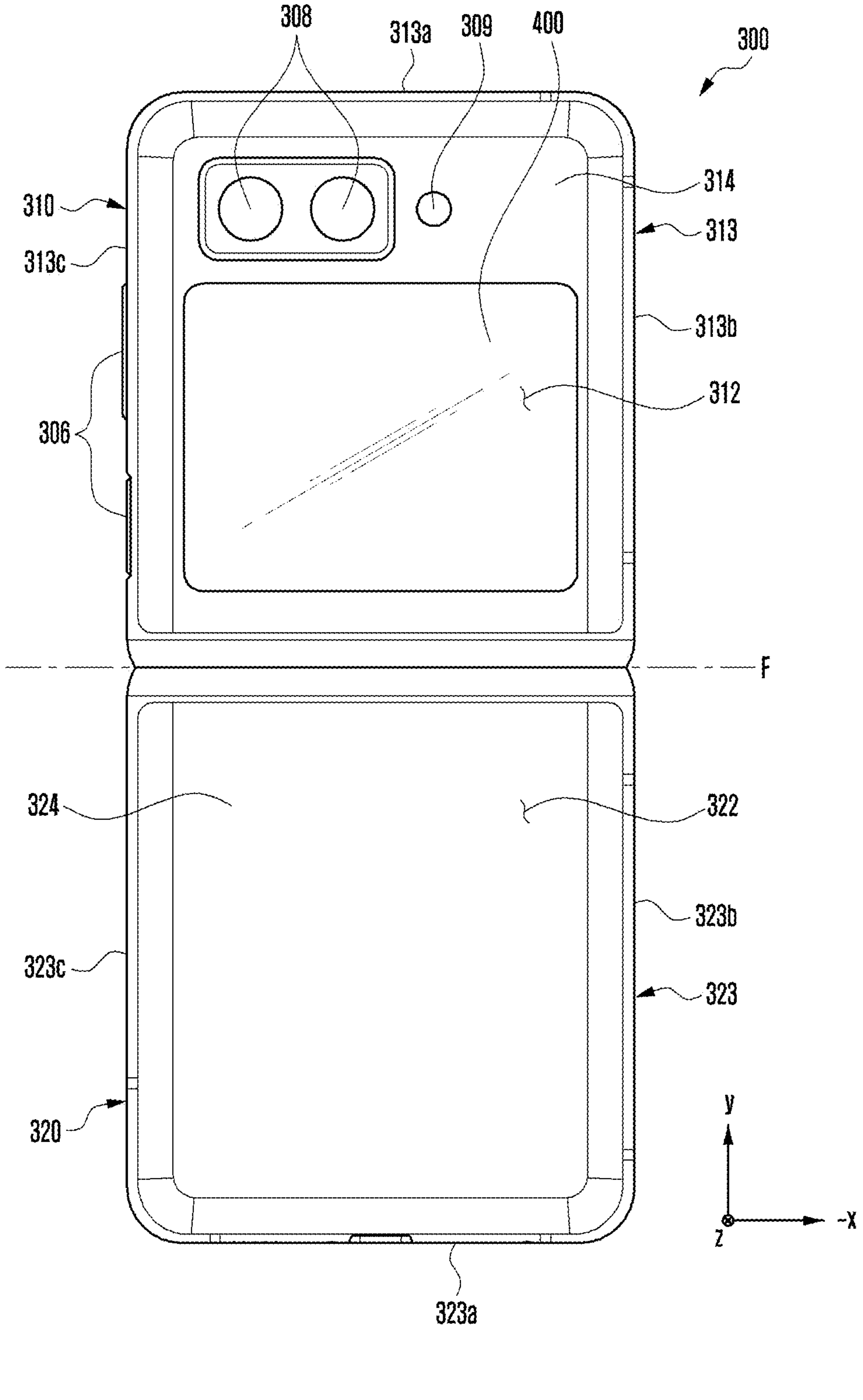
FIG. 2C is a plan view illustrating the rear surface of the electronic device in the unfolded state, according to various embodiments.
Figure 3A:
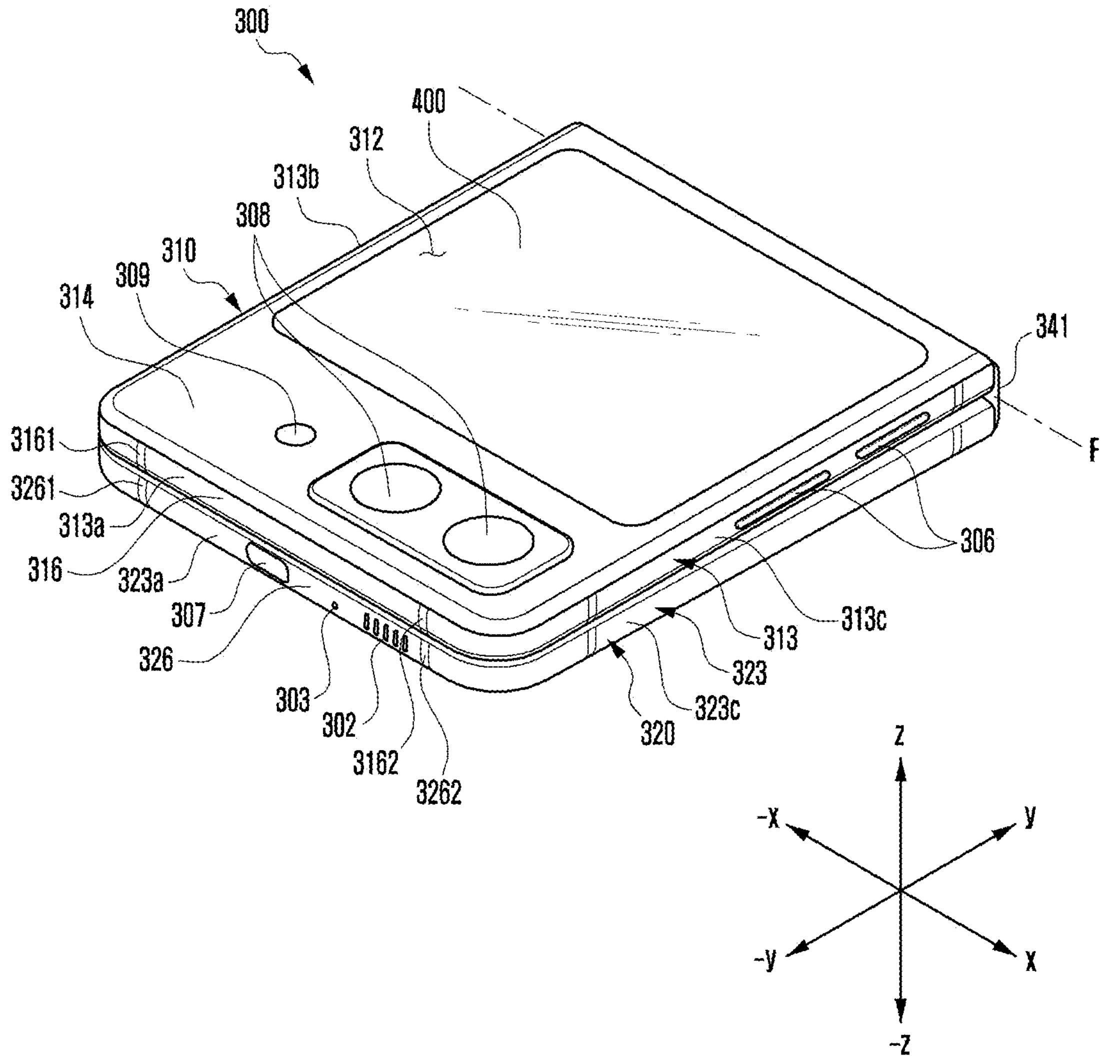
FIG. 3A is a perspective view of the electronic device illustrating a folded state, according to various embodiments.
Figure 3B:
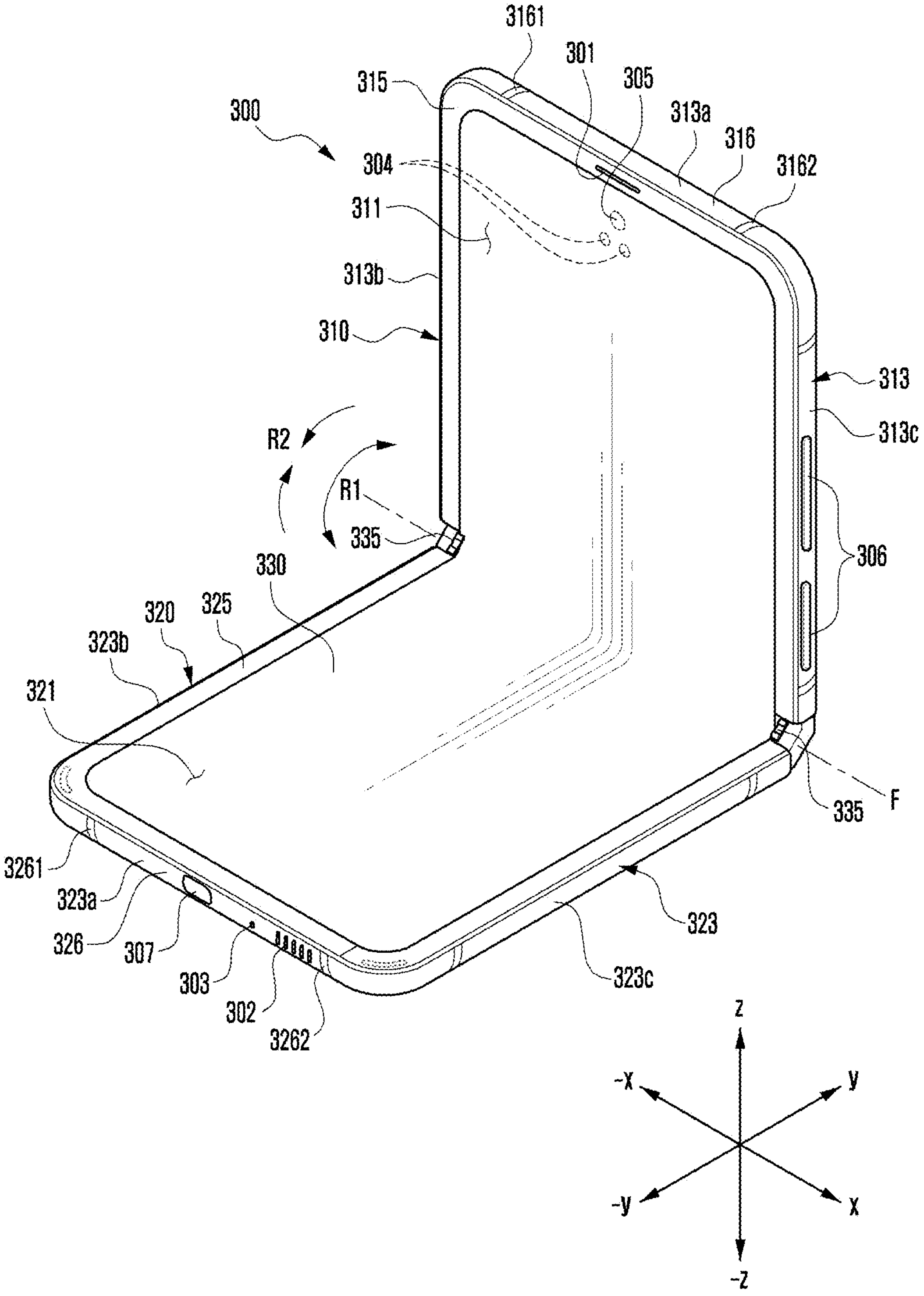
FIG. 3B is a perspective view of the electronic device illustrating an intermediate state, according to various embodiments.

FIG. 2A is a perspective view of an electronic device 300 illustrating a flat state or an unfolded state, according to various embodiments. FIG. 2B is a plan view illustrating the front surface of the electronic device 300 in the unfolded state, according to various embodiments. FIG. 2C is a plan view illustrating the rear surface of the electronic device 300 in the unfolded state, according to various embodiments. FIG. 3A is a perspective view of the electronic device 300 illustrating a folded state, according to various embodiments. FIG. 3B is a perspective view of the electronic device 300 illustrating an intermediate state, according to various embodiments.

With reference to FIGS. 2A to 3B, the electronic device 300 may include a single pair of housings (e.g., a first housing 310 and a second housing 320) (e.g., foldable housing) configured to rotatably couple to fold, facing each other based on a hinge structure (e.g., hinge structure 340 of FIG. 2B) (e.g., hinge device or hinge module). In some embodiments, the hinge structure 340 may be provided in the x-axis direction or may be provided in the y-axis direction. In some embodiments, two or more hinge structures 340 may be provided to fold in the same direction or in different directions. In an embodiment, the electronic device 300 may include a first display 330 (e.g., flexible display) provided in an area formed by the single pair of housings 310 and 320. In an embodiment, the first housing 310 and the second housing 320 may be provided on both sides of a folding axis (axis F) and may have a substantially symmetrical shape with respect to the folding axis (axis F). In an embodiment, the first housing 310 and the second housing 320 may have a different angle or distance therebetween depending on whether a state of the electronic device 300 is a flat state or an unfolded state, a folded state, or an intermediate state.

According to various embodiments, the single pair of housings 310 and 320 may include the first housing 310 (e.g., first housing structure) configured to couple with the hinge structure 340 and the second housing 320 (e.g., second housing structure) configured to couple with the hinge structure 340. In an embodiment, in the unfolded state, the first housing 310 may include a first surface 311 configured to face a first direction (e.g., front direction) (z-axis direction) and a second surface 312 configured to face the first surface 311 and a second direction (e.g., rear direction) (−z-axis direction). In an embodiment, in the unfolded state, the second housing 320 may include a third surface 321 configured to face the first direction (z-axis direction) and a fourth surface 322 configured to face the second direction (−z-axis direction). In an embodiment, the electronic device 300 may operate in such a manner that, in the unfolded state, the first surface 311 of the first housing 310 and the third surface 321 of the second housing 320 may face a substantially similar and/or the same first direction (z-axis direction) and, in the folded state, the first surface 311 and the third surface 321 may face each other. In an embodiment, the electronic device 300 may operate so that, in the unfolded state, the second surface 312 of the first housing 310 and the fourth surface 322 of the second housing 320 may face a substantially similar and/or the same second direction (−z-axis direction) and, in the folded state, the second surface 312 and the fourth surface 322 may face opposite directions. For example, in the folded state, the second surface 312 may face the first direction (z-axis direction), and the fourth surface 322 may face the second direction (−z-axis direction).

According to various embodiments, the first housing 310 may include a first side member 313 configured to at least partially form the appearance of the electronic device 300 and a first rear cover 314 configured to couple with the first side member 313 and to form at least a portion of the second surface 312 of the electronic device 300. In an embodiment, the first side member 313 may include a first side portion 313*a*, a second side portion 313*b* configured to extend from one end of the first side portion 313*a*, and a third side portion 313*c* configured to extend from the other end of the first side portion 313*a*. In an embodiment, the first side member 313 may be formed in a rectangular (e.g., square or rectangular) shape through the first side portion 313*a*, the second side portion 313*b*, and the third side portion 313*c*.

According to various embodiments, the second housing 320 may include a second side member 323 configured to at least partially form the appearance of the electronic device 300 and a second rear cover 324 configured to couple with the second side member 323 and to form at least a portion of the fourth surface 322 of the electronic device 300. In an embodiment, the second side member 323 may include a fourth side portion 323*a*, a fifth side portion 323*b* configured to extend from one end of the fourth side portion 323*a*, and a sixth side portion 323*c* configured to extend from the other end of the fourth side portion 323*a*. In an embodiment, the second side member 323 may be formed in a rectangular shape through the fourth side portion 323*a*, the fifth side portion 323*b*, and the sixth side portion 323*c*.

According to various embodiments, the single pair of housings 310 and 320 may not be limited to the illustrated form and coupling and may be implemented by other shapes or combination and/or coupling of parts. For example, in some embodiments, the first side member 313 may be integrally formed with the first rear cover 314, and the second side member 323 may be integrally formed with the second rear cover 324.

According to various embodiments, in the unfolded state, the electronic device 300 may be positioned as if the second side portion 313*b* of the first side member 313 and the fifth side portion 323*b* of the second side member 323 extend from each other. In an embodiment, in the unfolded state, the electronic device 300 may be positioned as if the third side portion 313*c* of the first side member 313 and the sixth side portion 323*c* of the second side member 323 extend from each other. In an embodiment, the electronic device 300 may be configured so that, in the unfolded state, a combined length of the second side portion 313*b* and the fifth side portion 323*b* is longer than a length of the first side portion 313*a* and/or the fourth side portion 323*a*. Also, the electronic device 300 may be configured so that a combined length of the third side portion 313*c* and the sixth side portion 323*c* is longer than a length of the first side portion 313*a* and/or the fourth side portion 323*a*.

According to various embodiments, the first side member 313 and/or the second side member 323 may be formed of metal or may further include a polymer injected into the metal. In an embodiment, the first side member 313 and/or the second side member 323 may include one or more conductive portions (e.g., a first conductive portion 316 and/or a second conductive portion 326) that may be configured to be electrically conductive fragmentation portions through one or more fragmentation portions (e.g., a first fragmentation portion 3161, a second fragmentation portion 3162, and/or a first fragmentation portion 3261, a second fragmentation portion 3262) formed of a polymer. In such a case, the one or more conductive portions 316 and/or 326 may be used as an antenna that may operate in at least one designated band (e.g., about 400 MHz to about 6,000 MHz) through electrical connection to a wireless communication circuit included in the electronic device 300.

According to various embodiments, the first rear cover 314 and/or the second rear cover 324 may be formed of a combination of at least one or at least two of coated or colored glass, ceramic, polymer, and metal (e.g., aluminum (Al), stainless steel (STS), or magnesium (Mg)).

According to various embodiments, the first display 330 may be provided to extend from the first surface 311 of the first housing 310 to at least a portion of the third surface 321 of the second housing 320 across the hinge structure 340. For example, the first display 330 may substantially include a first portion **330*a* corresponding to the first surface 311, a second portion 330*b* corresponding to the third surface 321, and a third portion 330*c* (e.g., bendable area) configured to connect the first portion 330*a* and the second portion 330*b* and corresponding to the hinge structure 340. In an embodiment, the electronic device 300 may include a first protection cover 315 (e.g., first protection frame or first decoration member) configured to couple along the edge of the first housing 310. In an embodiment, the electronic device 300 may include a second protection cover 325 (e.g., second protection frame or second decoration member) configured to couple along the edge of the second housing 320. In an embodiment, the first protection cover 315 and/or the second protection cover 325 may be formed of metal and/or polymer material. In an embodiment, the first protection cover 315 and/or the second protection cover 325 may be used as a decoration member. In an embodiment, the first display 330 may be positioned so that the edge of the first portion 330*a* may be interposed between the first housing 310 and the first protection cover 315. In an embodiment, the first display 330 may be positioned so that the edge of the second portion 330*b* is interposed between the second housing 320 and the second protection cover 325. In an embodiment, the first display 330 may be positioned so that the edge of the first display 330 corresponding to a protection cap 335 may be protected through the protection cap 335 provided in an area corresponding to the hinge structure 340. Consequently, the edge of the first display 330 may be substantially protected from the outside. In an embodiment, the electronic device 300 may include a hinge housing 341 (e.g., hinge cover) configured to support the hinge structure 340 and exposed to the outside when the electronic device 300 is in the folded state and invisible from the outside by being introduced into a first space (e.g., interior space of the first housing 310) and a second space (e.g., interior space of the second housing 320) when the electronic device 300 is in the unfolded state. In some embodiments, the first display 330 may be provided to extend from at least a portion of the second surface 312 to at least a portion of the fourth surface 322. In such embodiments, the electronic device 300 may be folded so that the first display 330** is exposed to the outside (e.g., an out-folding method).

According to various embodiments, the electronic device 300 may include a second display 400 (e.g., sub-display) provided separate from the first display 330. In an embodiment, the second display 400 may be provided to be at least partially exposed on the second surface 312 of the first housing 310, and accordingly, may replace a display function of the first display 330 in the folded state to display status information of the electronic device 300. In an embodiment, the second display 400 may be provided to be visible from the outside through at least some areas of the first rear cover 314. In some embodiments, the second display 400 may be provided on the fourth surface 322 of the second housing 320. In such embodiments, the second display 400 may be provided to be visible from the outside through at least some areas of the second rear cover 324.

According to various embodiments, the electronic device 300 may include at least one of an input device 303 (e.g., microphone), sound output devices (e.g., a first sound output device 301 and a second sound output device 302), a sensor module 304, camera devices (e.g., a first camera device 305 and a second camera device 308), a key input device 306, and a connector port 307. In an embodiment, the input device 303 (e.g., microphone), the first and second sound output devices 301 and 302, the sensor module 304, the first and second camera devices 305 and 308, the key input device 306, or the connector port 307 may refer to a hole and/or a shape formed in the first housing 310 and/or the second housing 320, but may also include an actual electronic part (e.g., input device, sound output device, sensor module, or camera device) that may be provided inside the electronic device 300 and may operate through the hole and/or the shape.

According to various embodiments, the input device 303 may include at least one microphone 303 provided to the second housing 320. In some embodiments, the input device 303 may include the plurality of microphones 303 provided to be capable of detecting a direction of sound. In some embodiments, the plurality of microphones 303 may be provided at appropriate positions in the first housing 310 and/or the second housing 320. In an embodiment, the first and second sound output devices 301 and 302 may include first speakers 301 and second speakers 302. In an embodiment, the first and second speakers 301 and 302 may include a communication receiver provided to the first housing 310 and a speaker 302 provided to the second housing 320. In some embodiments, the input device 303, the first and second sound output devices 301 and 302, and the connector port 307 may be provided in a space formed in the first housing 310 and/or the second housing 320 of the electronic device 300, and may be exposed to an external environment through at least one hole formed in the first housing 310 and/or the second housing 320. In an embodiment, at least one connector port 307 may be used to transmit and/or receive power and/or data to and/or from an external electronic device. In some embodiments, at least one connector port (e.g., ear jack hole) may accommodate a connector (e.g., ear jack) for transmitting and/or receiving an audio signal to and/or from the external electronic device. In some embodiments, a hole formed in the first housing 310 and/or the second housing 320 may be commonly used for the input device 303 and the first and second sound output devices 301 and 302. In some embodiments, the first and second sound output devices 301 and 302 may include a speaker (e.g., piezo speaker) that may operate by producing sound through the hole formed in the first housing 310 and/or the second housing 320.

According to various embodiments, the sensor module 304 may generate an electrical signal and/or a data value corresponding to an internal operating state of the electronic device 300 and/or an external environmental state. For example, the sensor module 304 may detect an external environment through the first surface 311 of the first housing 310. In some embodiments, the electronic device 300 may further include at least one sensor module provided to detect the external environment through the second surface 312 of the first housing 310. In an embodiment, the sensor module 304 (e.g., an illuminance sensor) may be provided below the first display 330 to detect the external environment through the first display 330. In an embodiment, the sensor module 304 may include at least one of a gesture sensor, a gyro sensor, a barometric sensor, a magnetic sensor, an acceleration sensor, a grip sensor, a color sensor, an IR sensor, a biometric sensor, a temperature sensor, a humidity sensor, a proximity sensor, a biometric sensor, an ultrasonic sensor, an illuminance sensor, or the like.

According to various embodiments, the first and second camera devices 305 and 308 may include a first camera device 305 (e.g., front camera device) provided on the first surface 311 of the first housing 310 and a second camera device 308 provided on the second surface 312 of the first housing 310. The electronic device 300 may further include a flash 309 provided near the second camera device 308. In an embodiment, the first and second camera devices 305 and 308 may include one or a plurality of lenses, image sensors, and/or image signal processors. The flash 309 may include, for example, a light emitting diode or a xenon lamp. In an embodiment, the first and second camera devices 305 and 308 may be provided so that two or more lenses (e.g., a wide-angle lens, an ultra-wide-angle lens, or a telephoto lens) and image sensors may be positioned on one surface (e.g., first surface 311, second surface 312, third surface 321, or fourth surface 322) of the electronic device 300. In some embodiments, the first and second camera devices 305 and 308 may also include time of flight (ToF) lenses and/or image sensors.

According to various embodiments, the key input device 306 (e.g., a key button) may be provided on the third side surface 313*c* of the first side member 313 of the first housing 310. In some embodiments, the key input device 306 may be provided on at least one side among the other side surfaces (e.g., the first side portion 313*a* and the second side portion 313*b*) of the first housing 310 and/or the side surfaces (e.g., the fourth side portion 323*a*, the fifth side portion 323*b*, and the sixth side portion 323*c*) of the second housing 320. In some embodiments, the electronic device 300 may not include a portion of or all of the key input devices 306 and the key input device 306 may be implemented in a different form on the first display 330, such as, but not limited to a soft key. In some embodiments, the key input device 306 may also be implemented using a pressure sensor included in the first display 330.

According to various embodiments, some camera devices (e.g., the first camera device 305) of the first and second camera devices 305 and 308 and/or the sensor module 304 may be displayed to be exposed through the first display 330. For example, the first camera device 305 and/or the sensor module 304 may be provided to make a contact with the external environment through an opening at least partially formed on the first display 330 in the interior space of the electronic device 300. In another embodiment, some sensor modules 304 may be provided to perform the function without being visually exposed through the first display 330 in the interior space of the electronic device 300. For example, in such an embodiment, the opening may be omitted in an area of the first display 330 that faces the sensor module 304.

With reference to FIG. 3B, the electronic device 300 may operate to maintain the intermediate state through the hinge structure 340. For example, the electronic device 300 may control the first display 330 so that different contents may be displayed on a display area corresponding to the first surface 311 and a display area corresponding to the third surface 321. In an embodiment, the electronic device 300 may operate in a substantially unfolded state (e.g., unfolded state of FIG. 2A) and/or a substantially folded state (e.g., folded state of FIG. 3A) based on a certain inflection angle (e.g., angle between the first housing 310 and the second housing 320 when in the intermediate state) through the hinge structure 340. For example, when a pressing force is provided in an unfolding direction (R1 direction) in the intermediate state folded at the certain inflection angle through the hinge structure 340, the electronic device 300 may operate to transition to an unfolded state (e.g., unfolded state of FIG. 2A). As another example, when the pressing force is provided in a folding direction (R2 direction) in the intermediate state folded at the certain inflection angle through the hinge structure 340, the electronic device 300 may operate to transition to a folded state (e.g., folded state of FIG. 3A). In an embodiment, the electronic device 300 may operate to maintain a state unfolded at various angles through the hinge structure 340.

Figure 4:
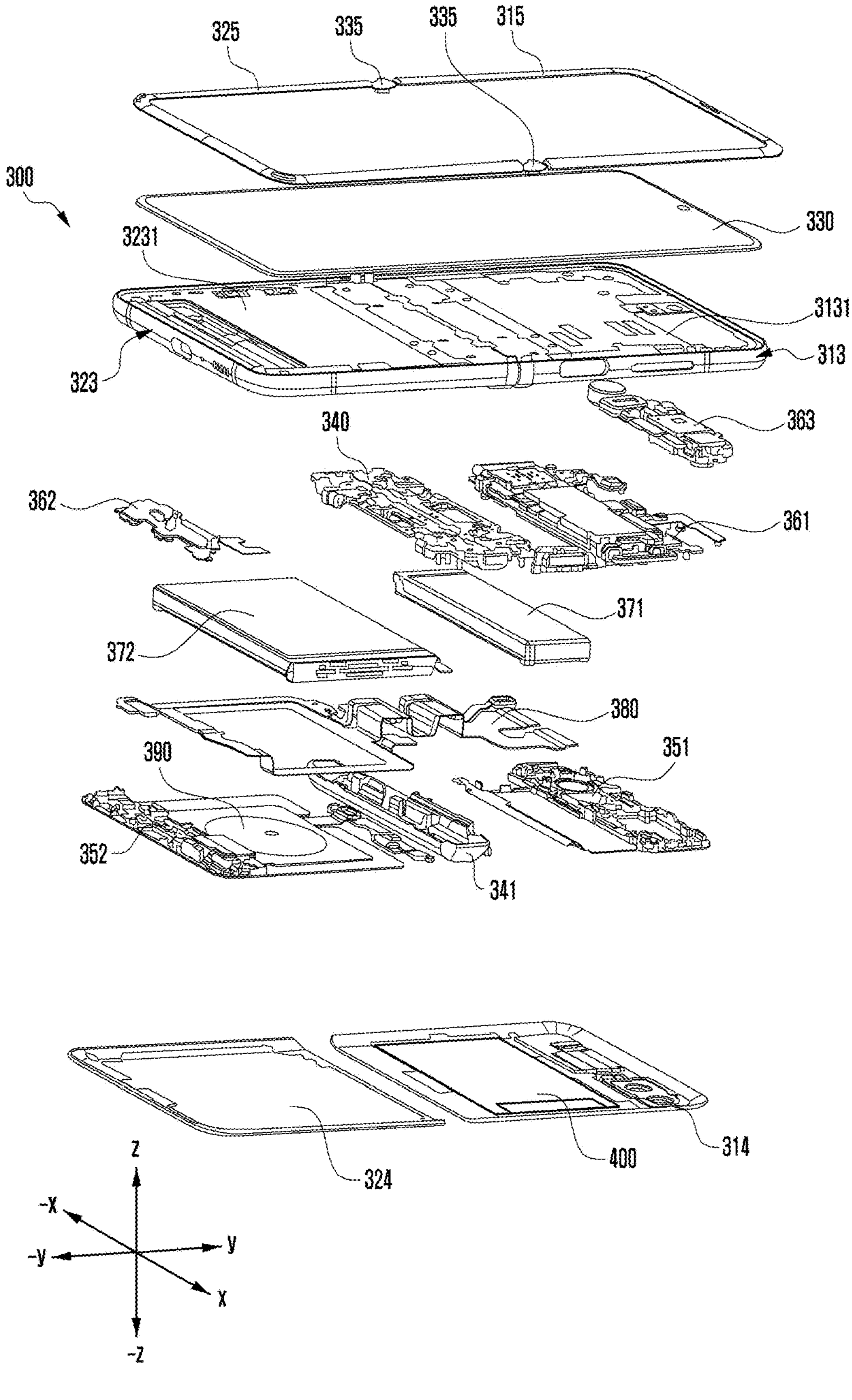
FIG. 4 is an exploded perspective view of the electronic device, according to various embodiments.

FIG. 4 is an exploded perspective view of the electronic device 300, according to various embodiments.

With reference to FIG. 4, the electronic device 300 may include the first side member 313 (e.g., first side frame), the second side member 323 (e.g., second side frame), and the hinge structure 340 configured to rotatably connect the first side member 313 and the second side member 323. In an embodiment, the electronic device 300 may include a first support member 3131 configured to at least partially extend from the first side member 313 and a second support member 3231 configured to at least partially extend from the second side member 323. In an embodiment, the first support member 3131 may be integrally formed with the first side member 313 and/or may be structurally coupled with the first side member 313. In an embodiment, the second support member 3231 may be integrally formed with the second side member 323, and/or may be structurally coupled with the second side member 323. In an embodiment, the electronic device 300 may include the first display 330 provided to receive support of the first support member 3131 and the second support member 3231. In an embodiment, the electronic device 300 may include the first rear cover 314 configured to couple with the first side member 313 and to provide a first space in between with the first support member 3131 and the second rear cover 324 configured to couple with the second side member 323 and to provide a second space in between with the second support member 3231. In an embodiment, the first side member 313 and the first rear cover 314 may be integrally formed. In an embodiment, the second side member 323 and the second rear cover 324 may be integrally formed. In an embodiment, the electronic device 300 may include a first housing (e.g., first housing 310 of FIG. 2A) (e.g., first housing structure) provided through the first side member 313, the first support member 3131, and the first rear cover 314. In an embodiment, the electronic device 300 may include a second housing (e.g., second housing 320 FIG. 2A) (e.g., second housing structure) provided through the second side member 323, the second support member 3231, and the second rear cover 324. In an embodiment, the electronic device 300 may include the second display 400 provided to be visible from the outside through at least some areas of the first rear cover 314.

According to various embodiments, the electronic device 300 may include a first plate assembly 361 (e.g., first plate or main PCB), a camera assembly 363, a first battery 371, or a first bracket 351 provided in a first space between the first side member 313 and the first rear cover 314. In an embodiment, the camera assembly 363 may include a plurality of camera devices (e.g., the first and second camera devices 305 and 308 of FIGS. 2A and 3A) and may be electrically connected to the first plate assembly 361. In an embodiment, the first bracket 351 may provide a support structure and improved rigidity to support the first plate assembly 361 and/or the camera assembly 363. In an embodiment, the electronic device 300 may include a second plate assembly 362 (e.g., second plate or sub-printed circuit board), an antenna 390 (e.g., coil member), a second battery 372, or a second bracket 352 provided in a second space between the second side member 323 and the second rear cover 324. In an embodiment, the electronic device 300 may include a wiring member 380 (e.g., a flexible PCB (FPCB)) provided to extend from the first plate assembly 361 to a plurality of electronic parts (e.g., second plate assembly 362, second battery 372, or antenna 390) provided between the second side member 323 and the second rear cover 324, across the hinge structure 340 and configured to provide electrical connection. In an embodiment, the antenna 390 may be and/or may include a near field communication (NFC) antenna, a wireless charging antenna, and/or a magnetic secure transmission (MST) antenna. For example, the antenna 390 may perform short distance communication with an external device and/or may wirelessly transmit and/or receive power required for charging.

According to various embodiments, the electronic device 300 may include the hinge housing 341 (e.g., hinge cover) configured to support the hinge structure 340 and exposed to the outside when the electronic device 300 is in the folded state (e.g., folded state of FIG. 3A) and may be invisible from the outside by being introduced into the first space and/or the second space when the electronic device 300 is in the unfolded state (e.g., unfolded state of FIG. 2A).

According to various embodiments, the electronic device 300 may include the first protection cover 315 configured to couple along the edge of the first side member 313. In an embodiment, the electronic device 300 may include the second protection cover 325 configured to couple along the edge of the second side member 323. In an embodiment, in the first display 330, the edge of a first flat portion (e.g., first portion 330*a* of FIG. 3B) may be protected by the first protection cover 315. In an embodiment, in the first display 330, the edge of a second flat portion (e.g., second portion 330*b* of FIG. 3B) may be protected by the second protection cover 325. In an embodiment, the electronic device 300 may include the protection cap 335 provided to protect the edge of a third portion (e.g., third portion 330*c* of FIG. 3B) corresponding to the hinge structure 340 in the first display 330. In some embodiments, the protection cap 335 and/or the first and second protection covers 315 and 325 may be omitted.

Figure 5A:
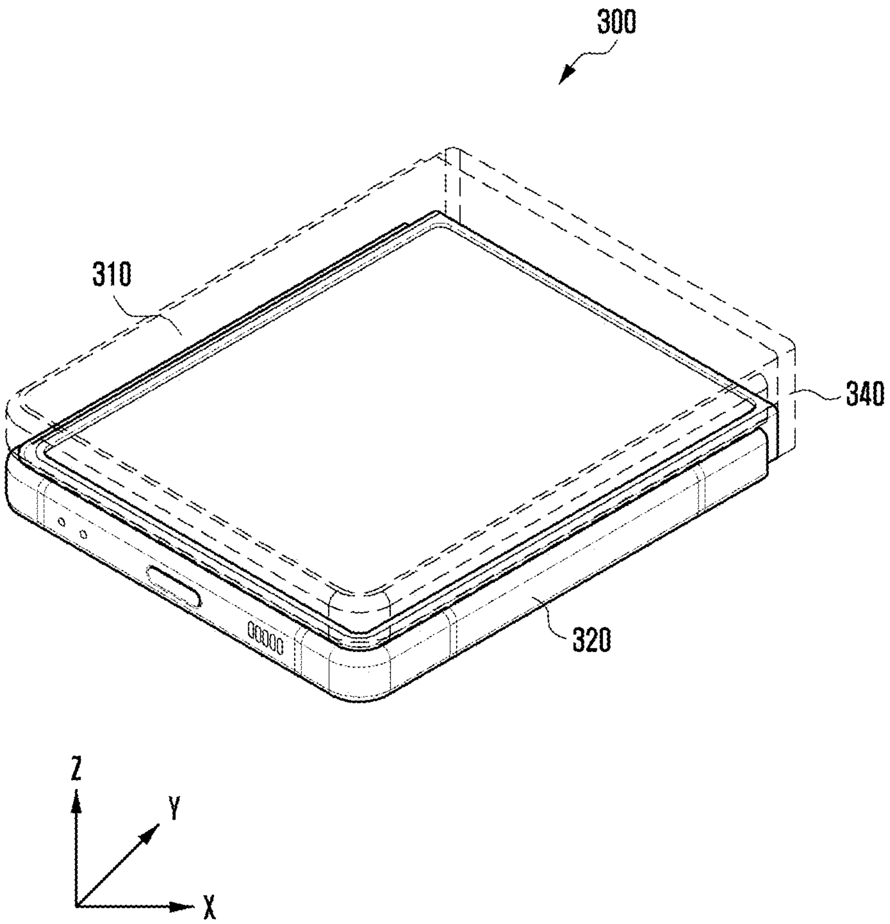
FIG. 5A is a perspective view illustrating the electronic device in the folded state, according to various embodiments.
Figure 5B:
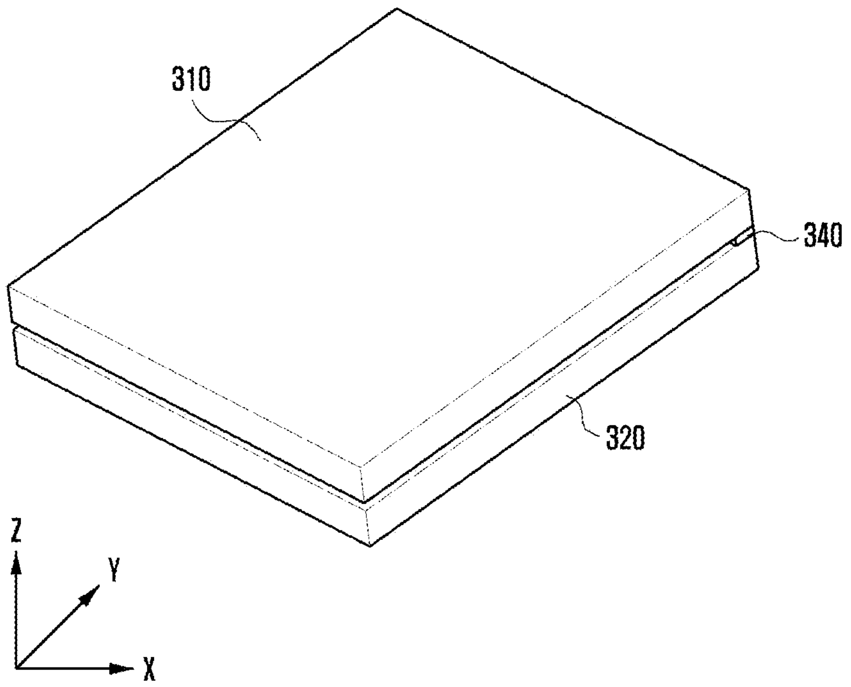
FIG. 5B is a conceptual diagram illustrating the electronic device in the folded state that is simplified into a shielded parallel plate model, according to various embodiments.
Figure 6A:
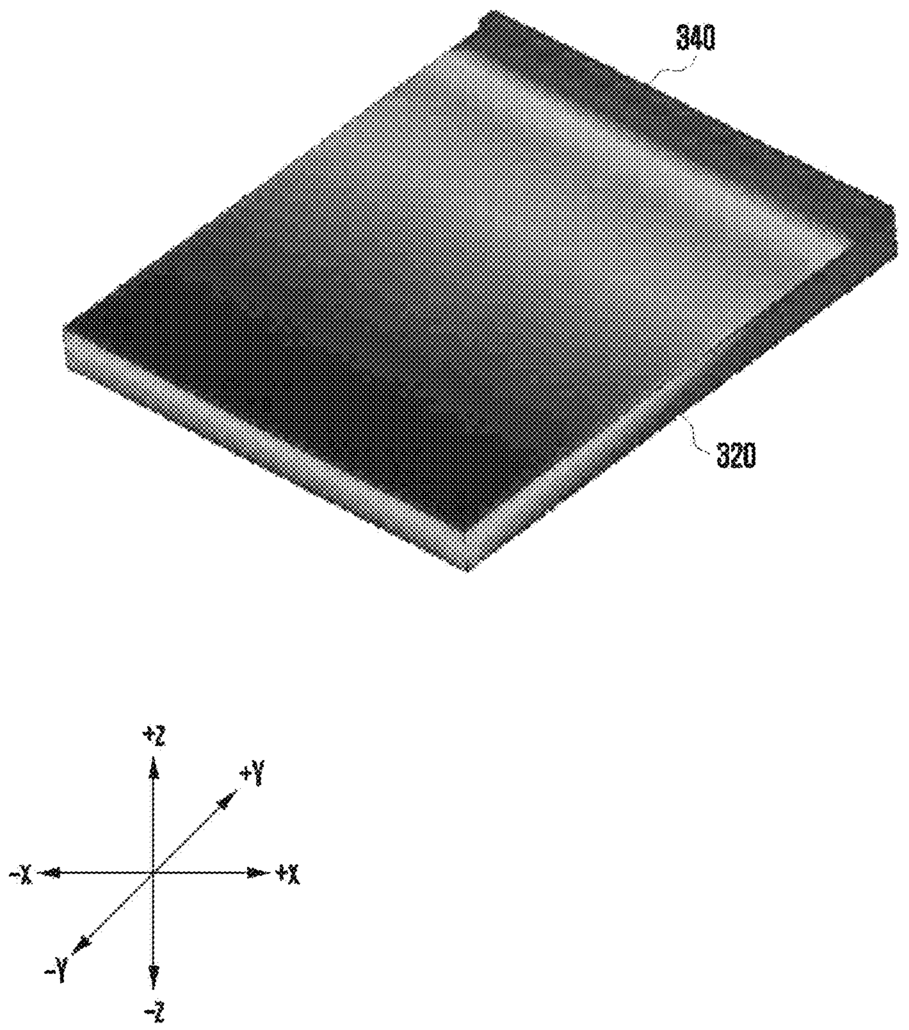
FIG. 6A is a conceptual diagram illustrating an electric field mode for some of a second housing and a hinge structure of the electronic device in the folded state in the shielded parallel plate model, according to various embodiments.
Figure 6B:
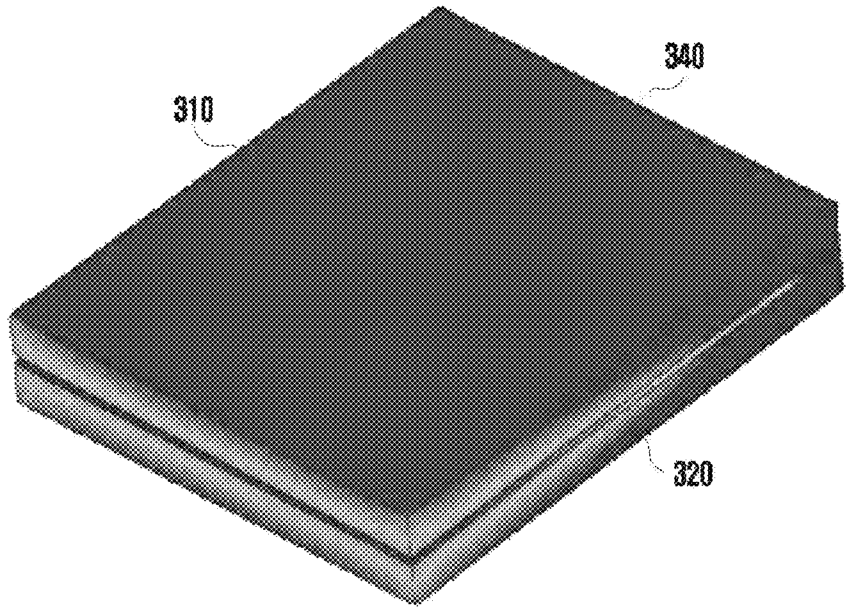
FIG. 6B is a conceptual diagram illustrating an electric field mode for the electronic device in the folded state in the shielded parallel plate model, according to various embodiments.
Figure 6B:
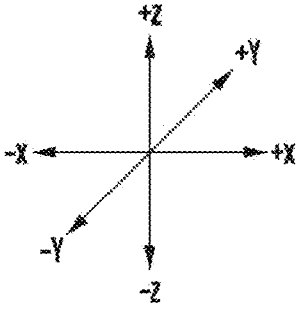
Figure 7A:
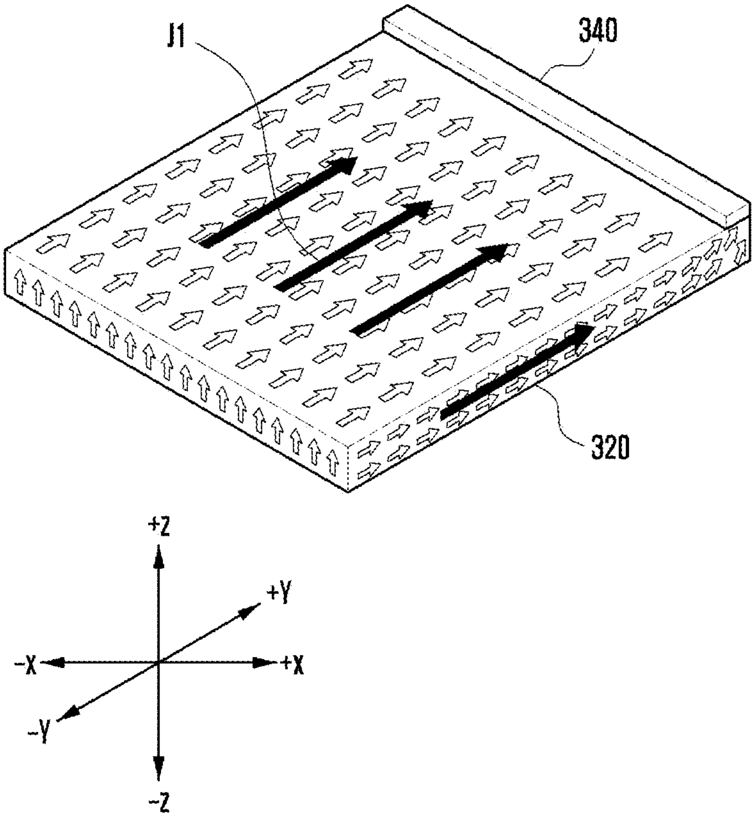
FIG. 7A is a conceptual diagram illustrating the current distribution for some of the second housing and the hinge structure of the electronic device in the folded state in the shielded parallel plate model, according to various embodiments.
Figure 7B:
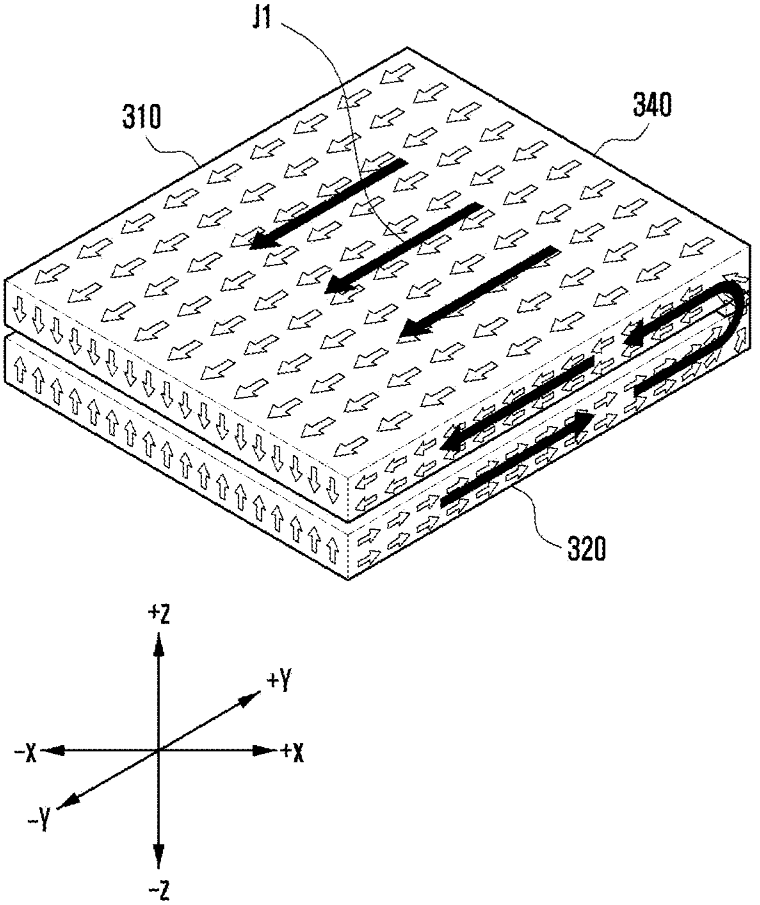
FIG. 7B is a conceptual diagram illustrating the current distribution for the electronic device in the folded state in the shielded parallel plate model, according to various embodiments.
Figure 8A:
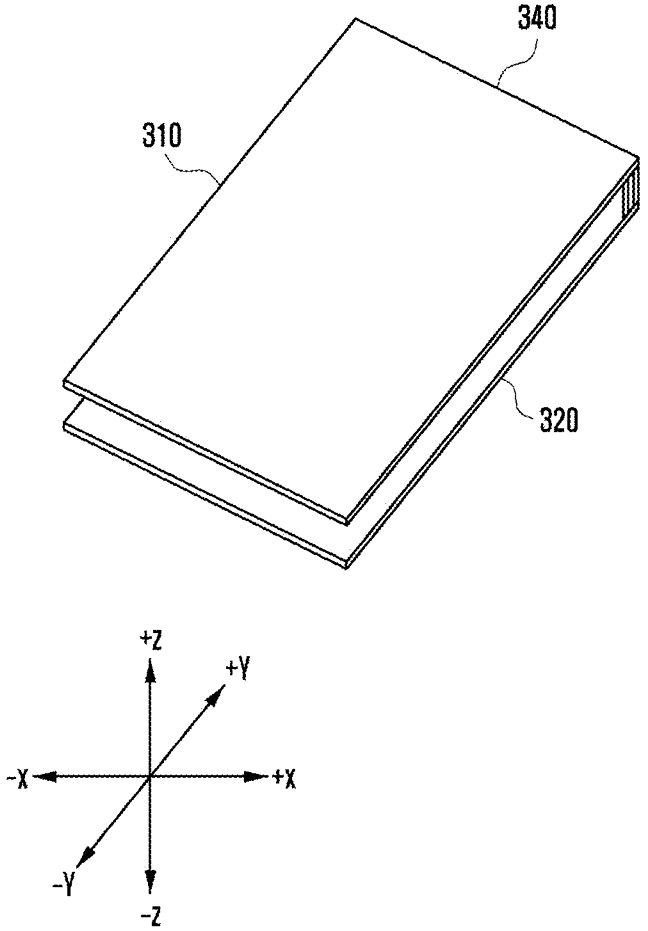
FIG. 8A is a conceptual diagram illustrating the electronic device in the folded state that is simplified into the shielded parallel plate model, according to various embodiments.
Figure 8B:
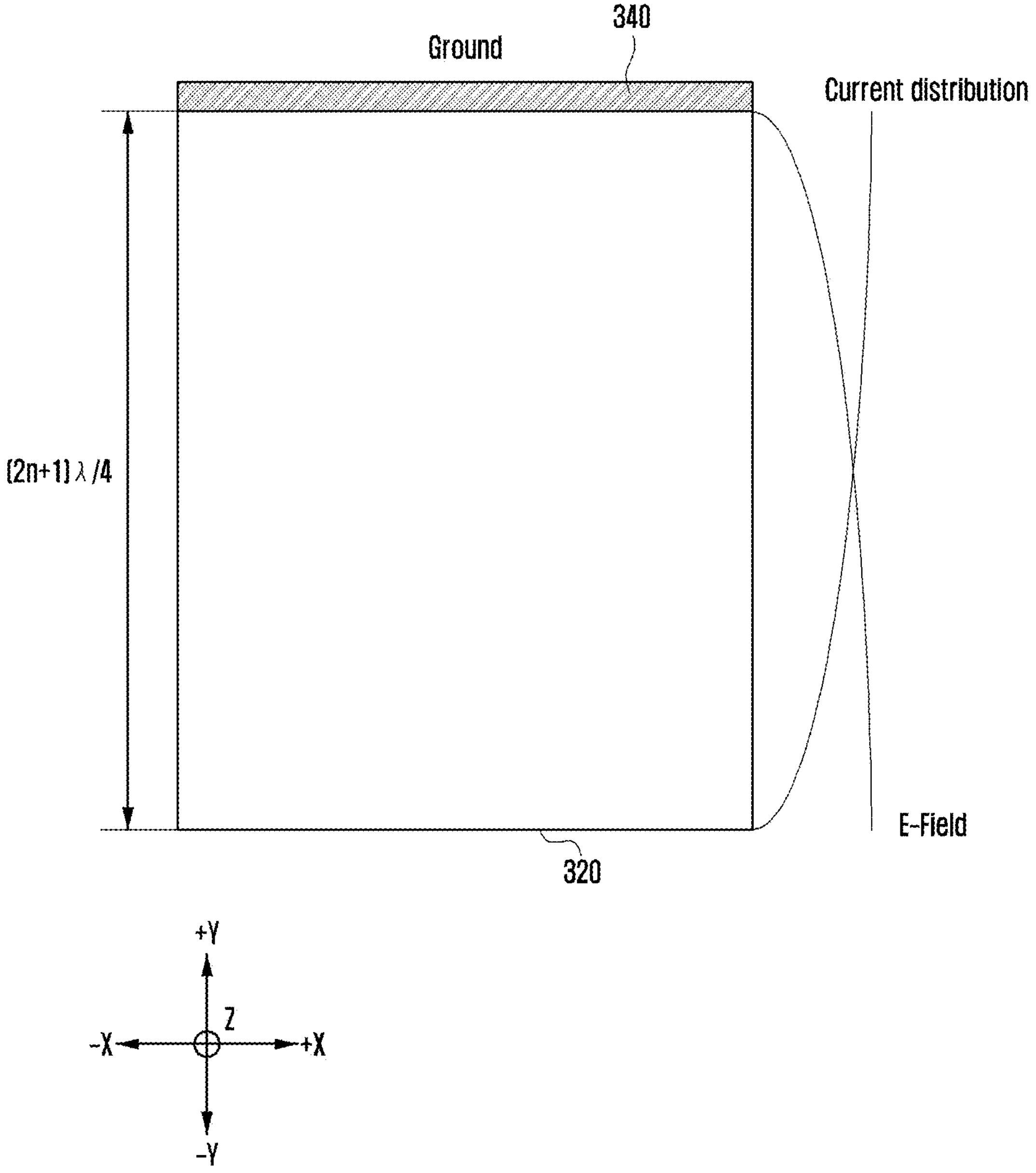
FIG. 8B is a conceptual diagram illustrating the current distribution for the electronic device in the folded state in the shielded parallel plate model, according to various embodiments.

FIG. 5A is a perspective view illustrating the electronic device 300 in the folded state, according to various embodiments. FIG. 5B is a conceptual diagram illustrating the electronic device 300 in the folded state that is simplified into a shielded parallel plate model, according to various embodiments. FIG. 6A is a conceptual diagram illustrating an electric field mode for some of the second housing 320 and the hinge structure 340 of the electronic device 300 in the folded state in the shielded parallel plate model, according to various embodiments. FIG. 6B is a conceptual diagram illustrating an electric field mode for the electronic device 300 in the folded state in the shielded parallel plate model, according to various embodiments. FIG. 7A is a conceptual diagram illustrating the current distribution for some of the second housing 320 and the hinge structure 340 of the electronic device 300 in the folded state in the shielded parallel plate model, according to various embodiments. FIG. 7B is a conceptual diagram illustrating the current distribution for the electronic device 300 in the folded state in the shielded parallel plate model, according to various embodiments. FIG. 8A is a conceptual diagram illustrating the electronic device 300 in the folded state that is simplified into the shielded parallel plate model, according to various embodiments. FIG. 8B is a conceptual diagram illustrating the current distribution for the electronic device 300 in the folded state in the shielded parallel plate model, according to various embodiments.

With reference to FIGS. 5A to 8B, the electronic device 300 may include and/or may be similar in many respects to the electronic device 300 described above with reference to FIGS. 2A to 4, and may include additional features not mentioned above. Consequently, repeated descriptions of the electronic device 300 described above with reference to FIGS. 2A to 4 may be omitted for the sake of brevity.

With reference to FIG. 5A, the electronic device 300 may be folded so that one surface of the first housing 310 (e.g., first surface 311 of FIG. 2A) and one surface of the second housing 320 (e.g., second surface 312 of FIG. 2A) face each other using the hinge structure 340 as the central axis. In the electronic device 300, when the one surface of the first housing 310 (e.g., first surface 311) and one surface of the second housing 320 (e.g., second surface 312) are folded to face each other using the hinge structure 340 as the central axis, the first housing 310, the hinge structure 340, and the second housing 320 may be electrically connected and, as the first housing 310 and the second housing 320 are adjacent, electromagnetic coupling may occur between the first housing 310 and the second housing 320.

With reference to FIGS. 5B and 7A, the first housing 310, the hinge structure 340, and the second housing 320 of the electronic device 300 in the folded state may become equivalent to the form of a shielded parallel plate. For example, the electronic device 300 equivalent to the form of the shielded parallel plate may also be referred to as a shielded parallel plate model 300. Hereinafter, the first housing 310 may also be referred to as a first plate 310, and the second housing 320 may be referred to as a second plate 320.

With reference to FIGS. 6A, 6B, and 7B, since the electric field (E-Field) of the electronic device 300 in the folded state may be proportional to potential, the potential may be zero (0) in the hinge 340 to which the first plate 310 and the second plate 320 are grounded and magnitude of the electric field may be zero (0), accordingly. Alternatively, in the electronic device 300 in the folded state, since the potential may increase as a distance from the hinge 340 increases, the magnitude of the electric field may also increase.

With reference to FIGS. 8A and 8B, in the shielded parallel plate model 300, a first surface current J1 may be formed on the surface of the first plate 310, the hinge 340, and the second plate 320. The first surface current J1 may be formed in the form of a current circulating the first plate 310, the hinge 340, and the second plate 320. For example, the first surface current J1 may circulate from one side surface of the second plate 320 (e.g., the fourth side surface 323*a* of second housing 320) to the hinge 340, from the hinge 340 to one side surface of the first plate 310 (e.g., the first side surface 313*a* of first housing 310), and back to one side surface of the second plate 320 (e.g., the fourth side surface

323*a* of second housing 320). As another example, a direction of the surface current induced in the first plate 310 may be opposite to a direction of the surface current induced in the second plate 320.

Figure 9A:
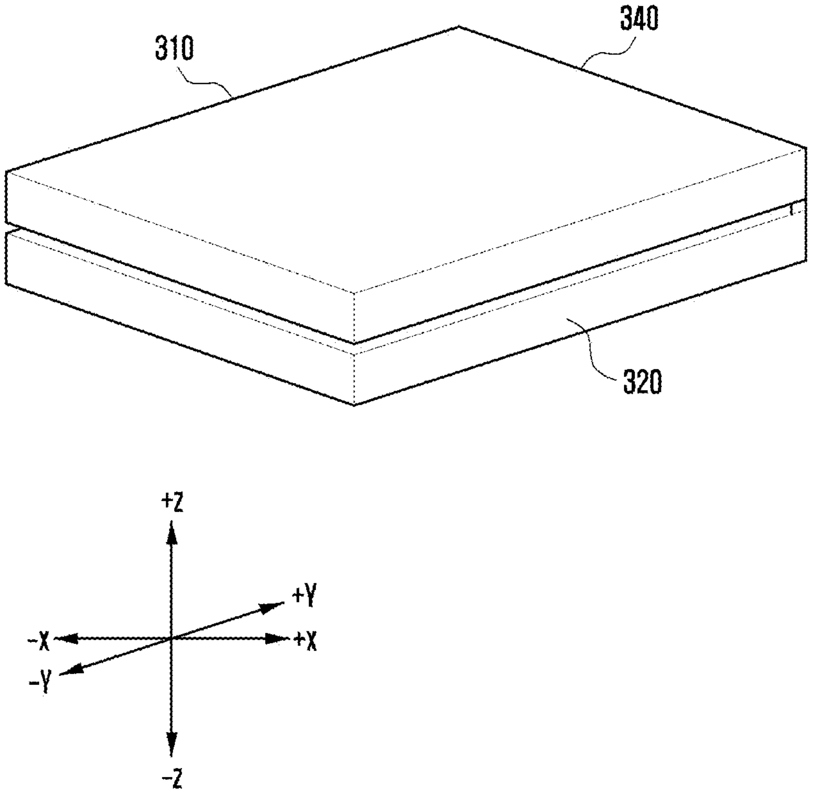
FIG. 9A is a conceptual diagram illustrating the shielded parallel plate model corresponding to the electronic device in the folded state that does not include a conductive portion on the side surface, according to various embodiments.
Figure 9B:
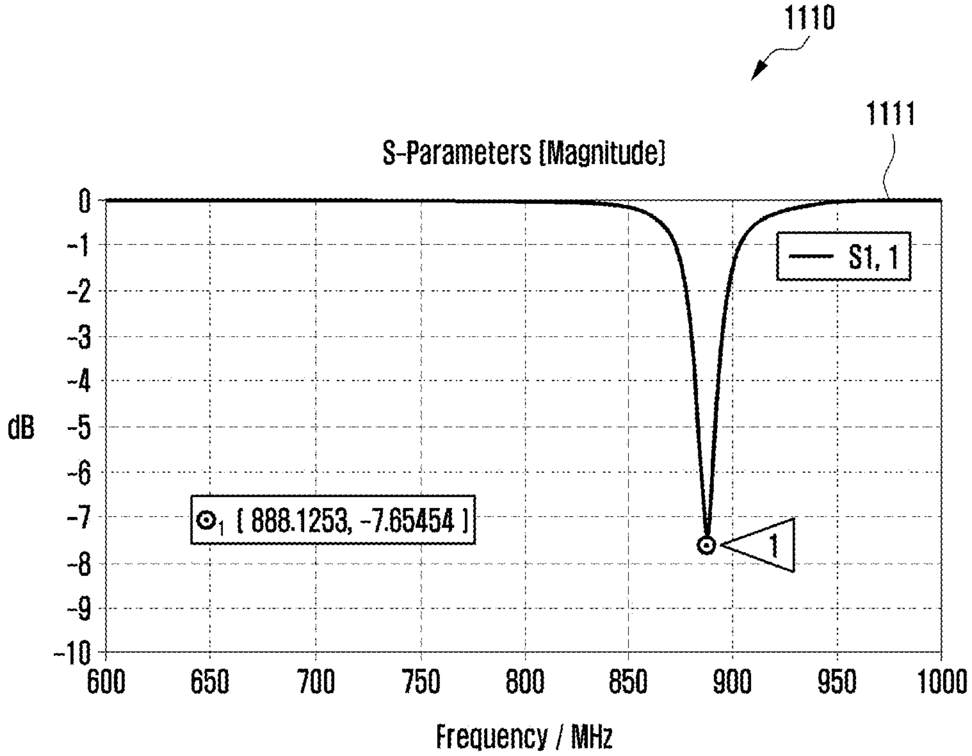
FIG. 9B is a graph showing a reflection coefficient of resonance frequency formed in the electronic device in the folded state that does not include a conductive portion on the side surface, according to various embodiments.
Figure 9C:
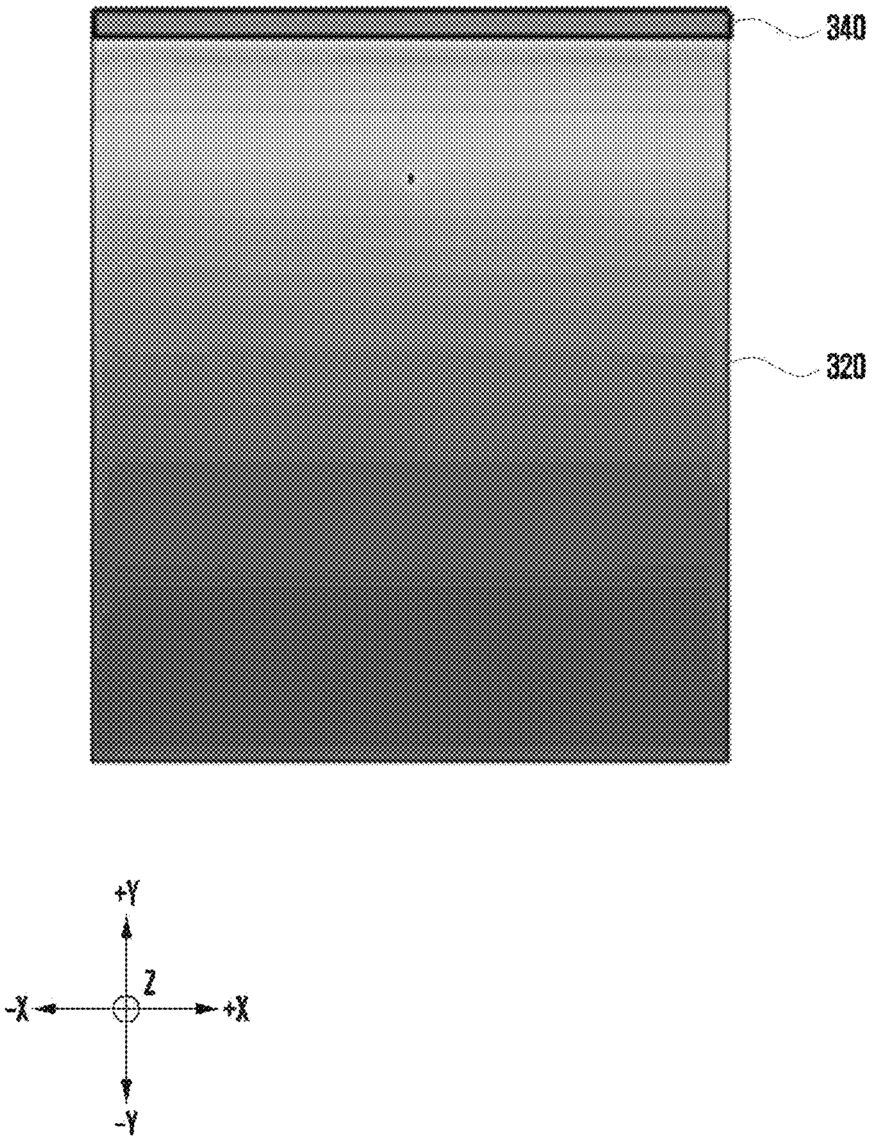
FIG. 9C is a conceptual diagram illustrating, in the shielded parallel plate model, an electric field mode of the second housing of the electronic device in the folded state that does not include a conductive portion on the side surface, according to various embodiments.

FIG. 9A is a conceptual diagram illustrating the shielded parallel plate model corresponding to the electronic device 300 in a folded state that does not include a conductive portion on the side surface, according to various embodiments. FIG. 9B is a graph 1110 showing a reflection coefficient (S1, 1) 1111 of resonance frequency formed in the electronic device 300 in the folded state that does not include a conductive portion on the side surface, according to various embodiments. FIG. 9C is a conceptual diagram illustrating, in the shielded parallel plate model, an electric field mode of the second housing 320 of the electronic device 300 in the folded state that does not include a conductive portion on the side surface, according to various embodiments.

With reference to FIG. 9A, the shielded parallel plate model corresponding to the electronic device 300 in the folded state that does not include a conductive portion on the side surface may be the same as or similar to the shielded parallel plate model 300 of FIG. 5B or the shielded parallel plate model 300 of FIG. 8A.

With reference to FIG. 9B, a first parasitic resonance frequency 1 formed in the electronic device 300 in the folded state that does not include a conductive portion on the side surface may operate at about 888.1253 MHz (e.g., 1111 graph).

With reference to FIG. 9C, since a mode of the electric field illustrated in the shielded parallel plate model corresponding to the electronic device 300 in the folded state that does not include a conductive portion on the side surface is proportional to the potential as shown in FIGS. 6A and 6B, the potential may be zero (0) in the hinge 340 to which the first plate 310 and the second plate 320 are grounded and the magnitude of the electric field may be zero (0), accordingly. Alternatively, in the electronic device 300 in the folded state, since the potential may increase as a distance away from the hinge 340 increase, the magnitude of the electric field may also increase. Due to the first surface current J1 formed on the surface of the electronic device 300 in the folded state, an electric field (e.g., a first parasitic resonance) may occur. The mode of the electric field of the electronic device 300 by the first parasitic resonance may be referred to as a first mode.

Figure 10A:
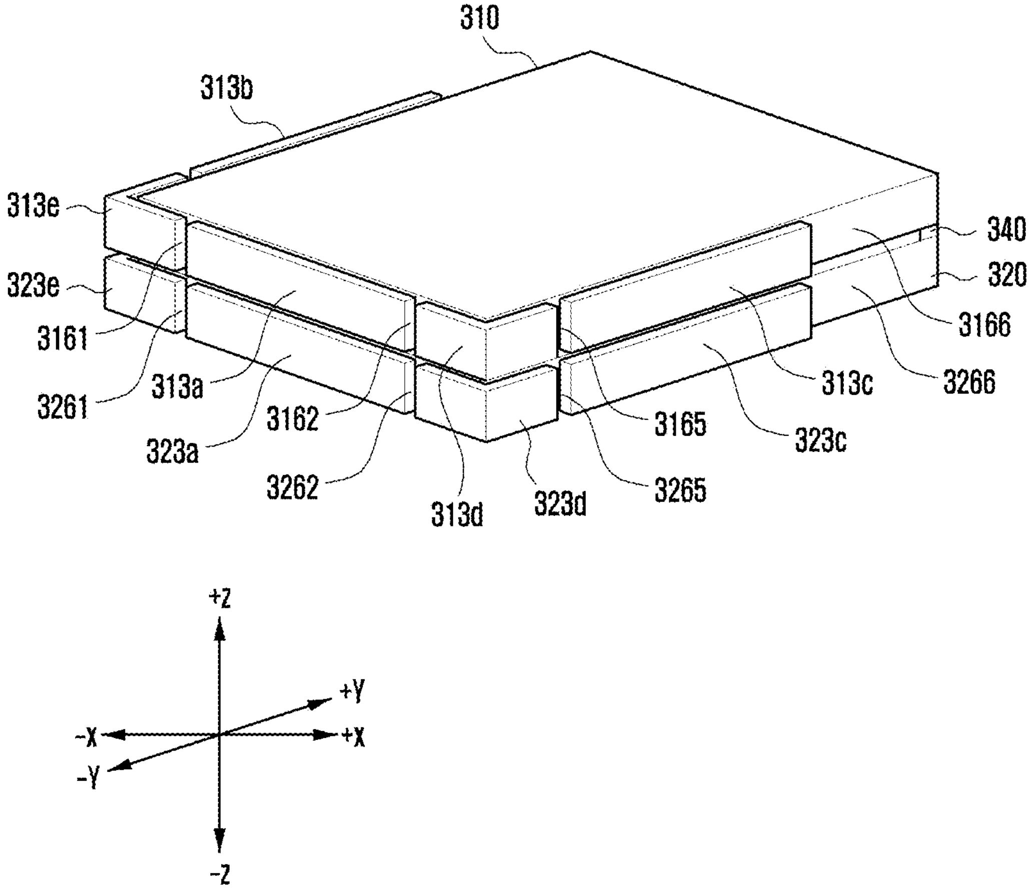
FIG. 10A is a conceptual diagram illustrating the shielded parallel plate model corresponding to the electronic device in the folded state that includes conductive side portions on the side portions, according to various embodiments.
Figure 10B:
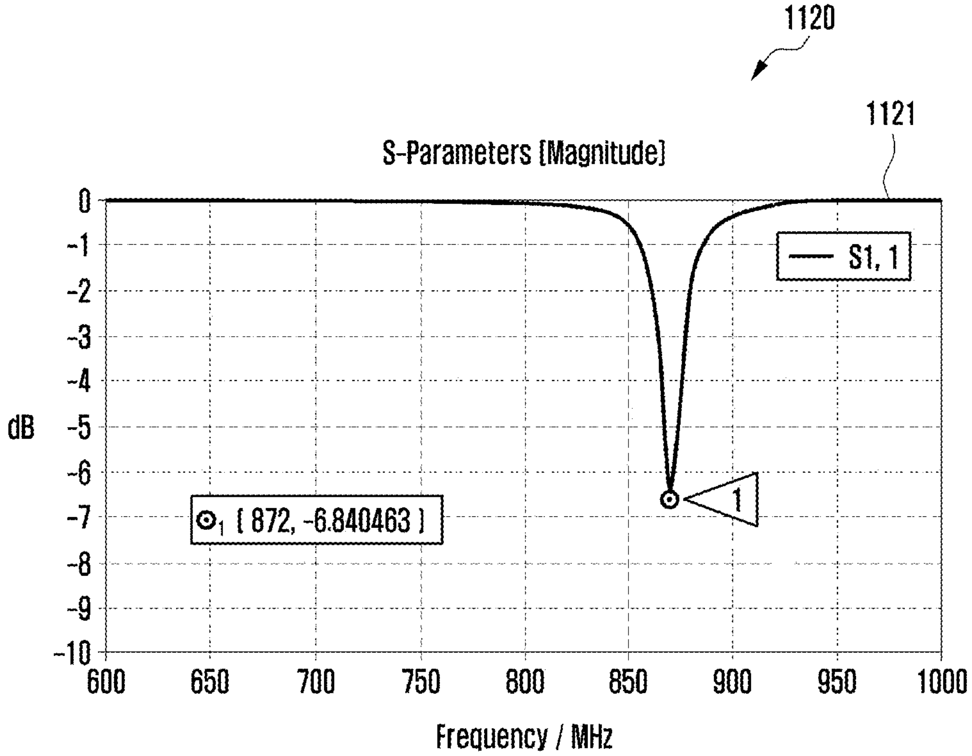
FIG. 10B is a graph showing a reflection coefficient of resonance frequency formed in the electronic device in the folded state that does not include conductive portions on the side portions, according to various embodiments.
Figure 10C:
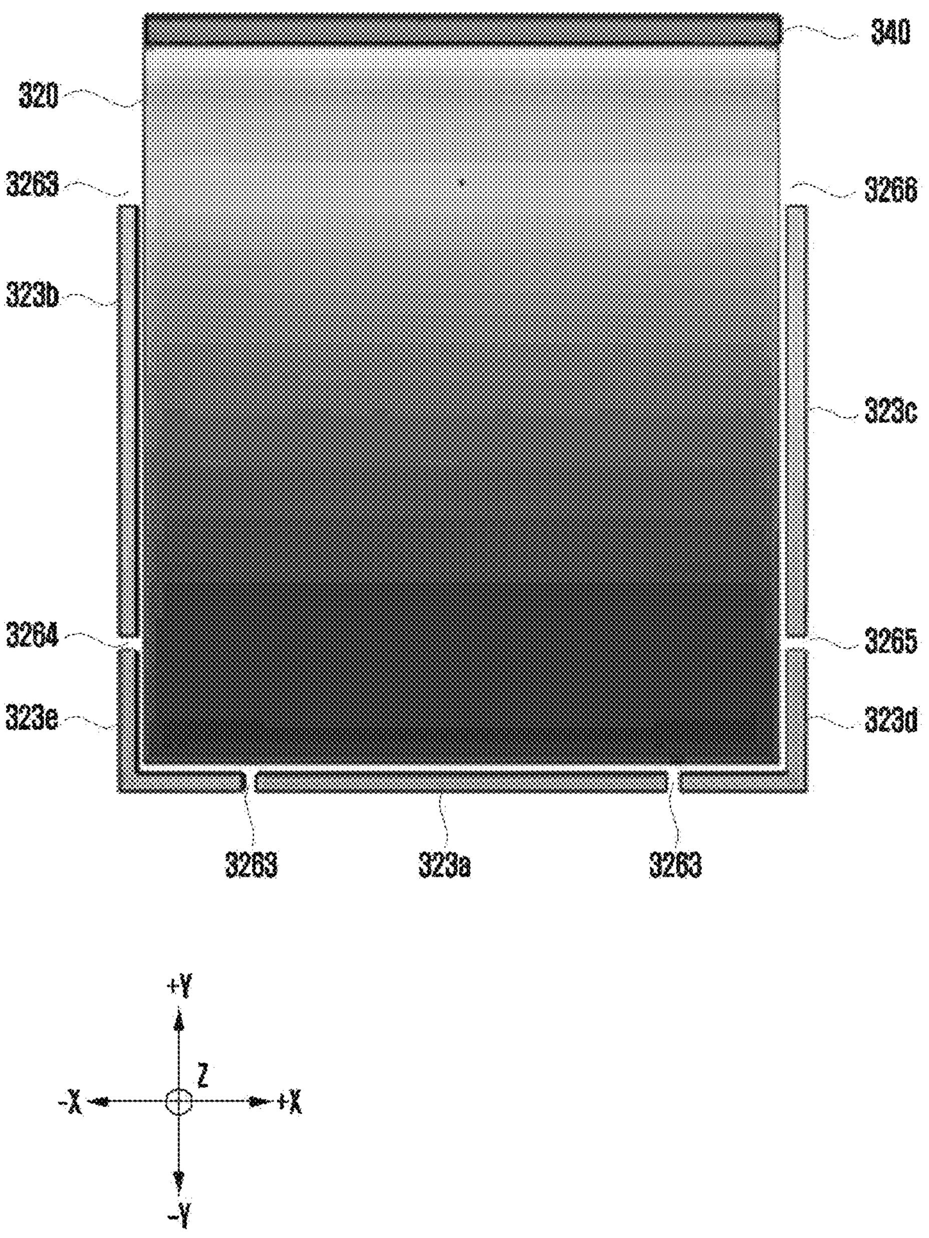
FIG. 10C is a conceptual diagram illustrating an electric field mode of the electronic device in the folded state that does not include conductive portions on the side portions, according to various embodiments.

FIG. 10A is a conceptual diagram illustrating the shielded parallel plate model corresponding to the electronic device 300 in the folded state that includes the first side member 313 and the second side member 323 including conductive side portions, according to various embodiments. FIG. 10B is a graph 1120 showing a reflection coefficient (S1,1) 1121 of resonance frequency formed in the electronic device 300 in the folded state that includes the first side member 313 and the second side member 323 not including conductive side portions, according to various embodiments. FIG. 10C is a conceptual diagram illustrating, in the shielded parallel plate model, an electric field mode of the electronic device 300 in the folded state that includes the first side member 313 and the second side member 323 including conductive side portions, according to various embodiments.

With reference to FIG. 10A, the first plate 310 may include the first side member 313 including conductive side portions. For example, the first side member 313 may include a first side portion 313*a*, and the first side member 313 may include a first corner portion 313*d* provided between the first side portion 313*a*, a third side portion 313*c*, and a second corner portion 313*e* provided between the first side portion 313*a* and a second side portion 313*b*. At least one of the first side portion 313*a*, the second side portion 313*b*, the third side portion 313*c*, the first corner portion 313*d*, and the second corner portion 313*e* may be formed of a conductive material. The first side portion 313*a* may include the first fragmentation portion 3161 and/or the second fragmentation portion 3162 formed of nonconductive material. The second side portion 313*b* may include a third fragmentation portion 3163 and a fourth fragmentation portion 3164. The third side portion 313*c* may include a fifth fragmentation portion 3165 and/or a sixth fragmentation portion 3166.

According to an embodiment, the second plate 320 may physically couple with a fourth side portion 323*a*, a fifth side portion 323*b*, and a sixth side portion 323*c*. The second plate 320 may physically couple with a third corner portion 323*d* provided between the fourth side portion 323*a* and the sixth side portion 323*c* and a fourth corner portion 323*e* provided between the fourth side portion 323*a* and the fifth side portion 323*b*. At least one of the fourth side portion 323*a*, the fifth side portion 323*b*, the sixth side portion 323*c*, the third corner portion 323*d*, and the fourth corner portion 323*e* may be formed of a conductive material. The fourth side portion 323*a* may include a first fragmentation portion 3261 and a second fragmentation portion 3262 formed of non-conductive material. The fifth side portion 323*b* may include a third fragmentation portion 3263 and a fourth fragmentation portion 3264. The sixth side portion 323*c* may include a fifth fragmentation portion 3265 and a sixth fragmentation portion 3266.

With reference to FIG. 10B, a resonance frequency 1 formed in the electronic device 300 in the folded state that includes the plurality of side portions (e.g., the first side portion 313*a*, the second side portion 313*b*, the third side portion 313*c*, the fourth side portion 323*a*, the fifth side portion 323*b*, and the sixth side portion 323*c*) is about 872 MHz and it can be seen to be low shifted when compared to the resonance frequency described with reference to FIG. 9B (e.g., 1121 graph).

With reference to FIG. 10C, the fourth side portion 323*a*, the fifth side portion 323*b*, the sixth side portion 323*c*, the third corner portion 323*d*, and the fourth corner portion 323*e* may not be grounded to the ground of the second plate 320. For example, an electric field mode of the second plate 320 in which the fourth side portion 323*a*, the fifth side portion 323*b*, the sixth side portion 323*c*, the third corner portion 323*d*, and the fourth corner portion 323*e* may not be electrically connected to the ground and may be substantially similar and/or the same as the first mode that is the electric field mode shown in the second plate 320 of the shielded parallel plate model 300 described with reference to FIG. 9C.

Figure 11A:
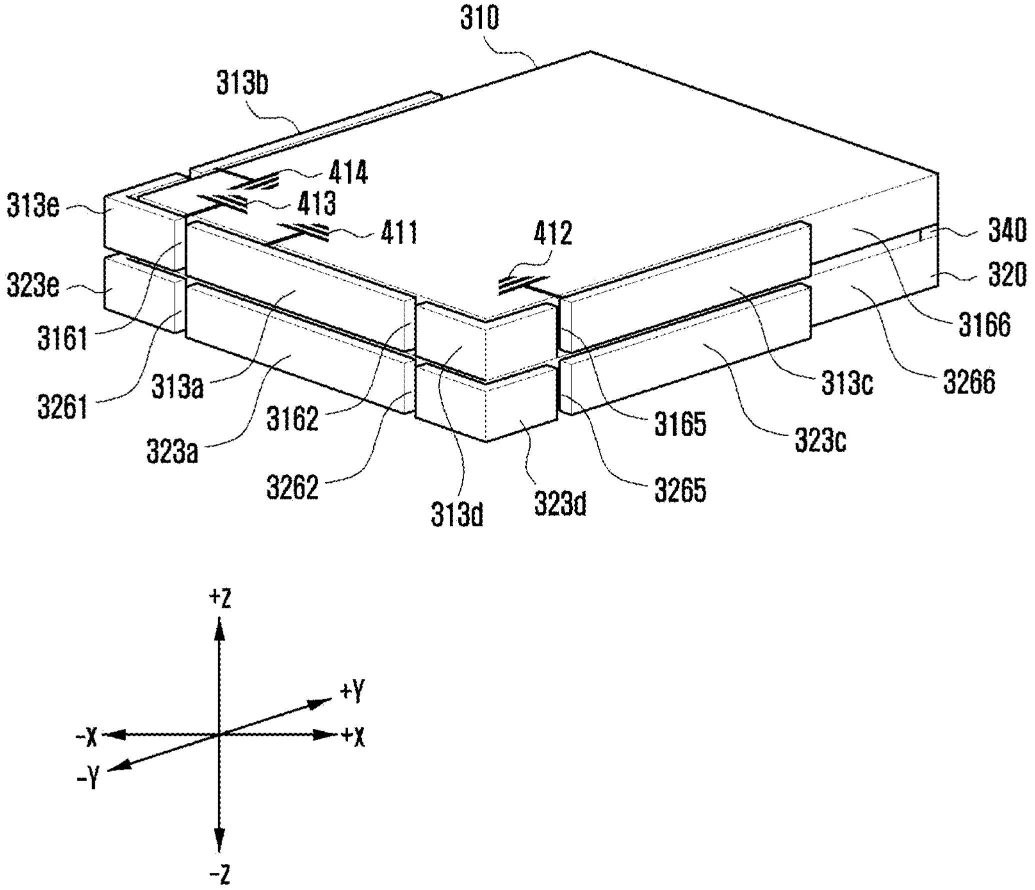
FIG. 11A is a conceptual diagram illustrating the shielded parallel plate model corresponding to the electronic device in the folded state in which conductive portions included in the side portions are grounded, according to various embodiments.
Figure 11B:
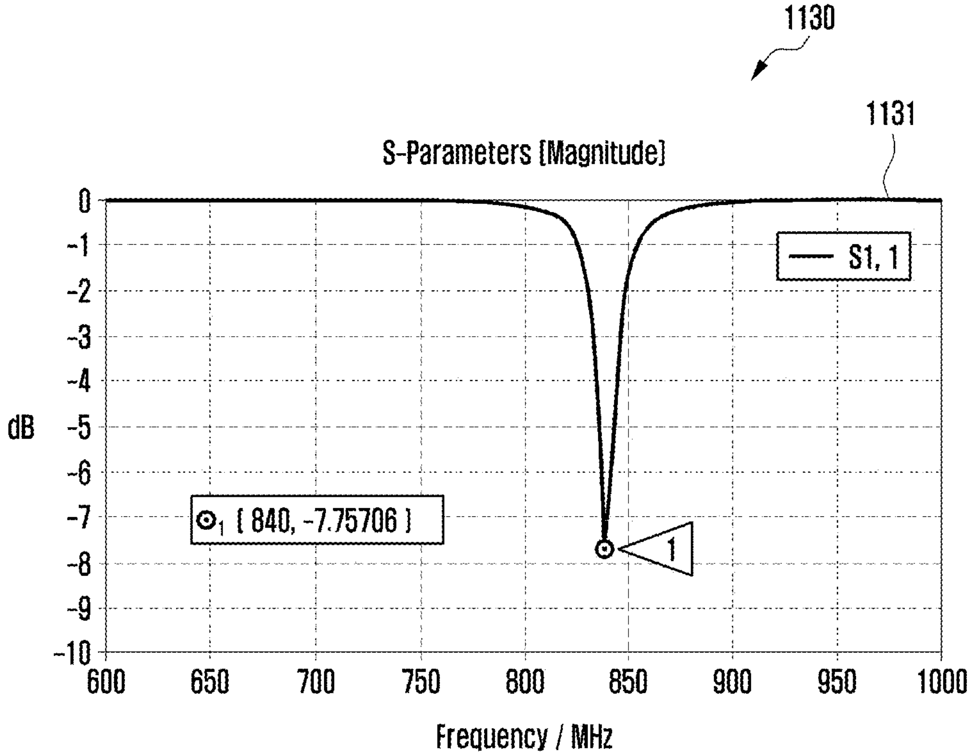
FIG. 11B is a graph showing a reflection coefficient of resonance frequency formed in the electronic device in the folded state in which conductive portions included in the side portions are grounded, according to various embodiments.
Figure 11C:
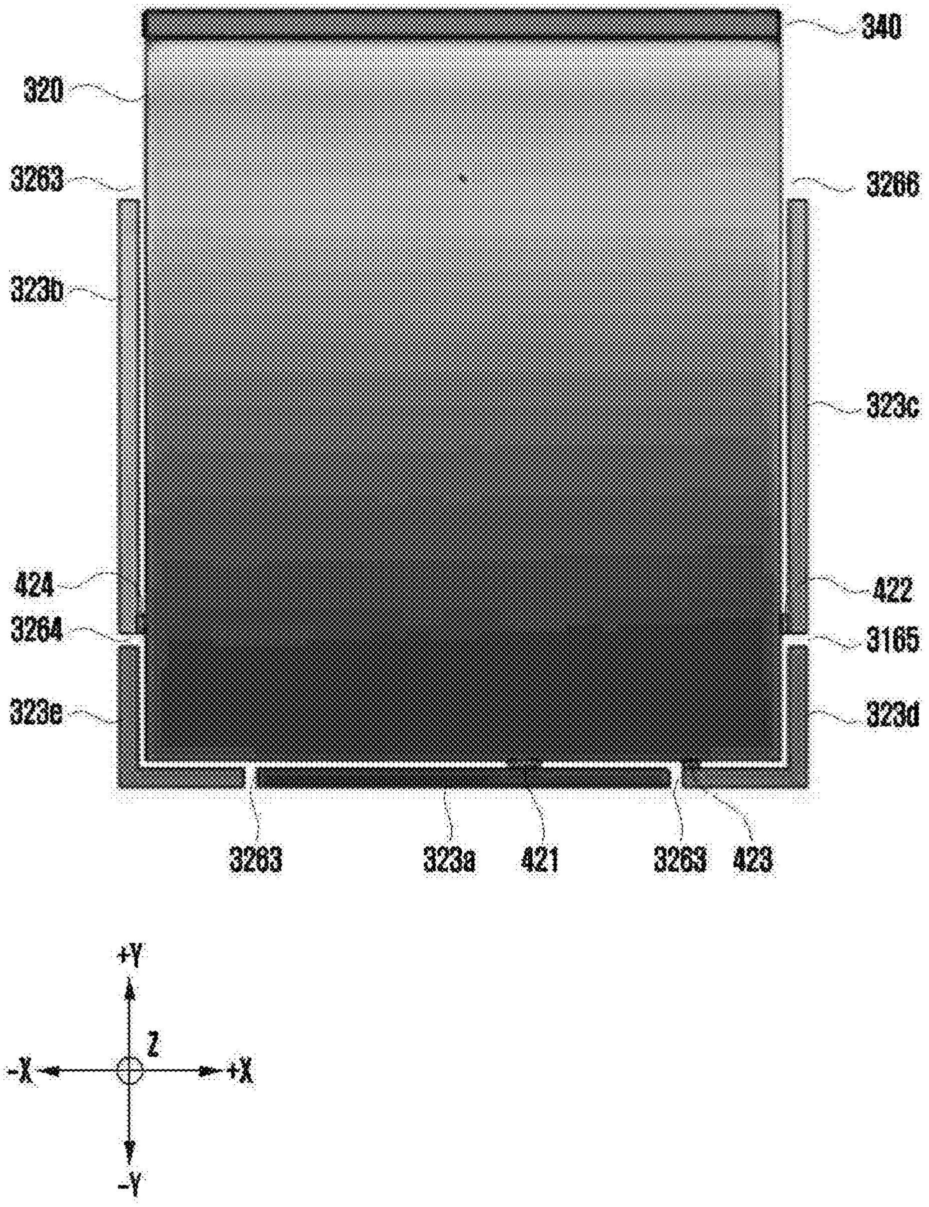
FIG. 11C is a conceptual diagram illustrating, in the shielded parallel plate model, an electric field mode of the electronic device in the folded state in which conductive portions included in the side surfaces are grounded, according to various embodiments.

FIG. 11A is a conceptual diagram illustrating the shielded parallel plate model corresponding to the electronic device 300 in the folded state in which the plurality of side portions 313*a* to 323*c* formed of conductive material are grounded, according to various embodiments. FIG. 11B is a graph 1130 showing a reflection coefficient (S1,1) 1131 of resonance frequency formed in the electronic device 300 in the folded state in which the plurality of side portions 313*a* to 323*c* formed of conductive material are grounded, according to various embodiments. FIG. 11C is a conceptual diagram illustrating, in the shielded parallel plate model, an electric field mode of the electronic device 300 in the folded state in which the plurality of side portions 313*a* to 323*c* formed of conductive material are grounded, according to various embodiments.

With reference to FIG. 11A, the first side surface 313*a* may be electrically connected to the ground 411 of the first plate 310. The second side surface 313*b* may be electrically connected to the ground 414 of the first plate 310. The third side surface 313*c* may be electrically connected to the ground 412 of the first plate 310. The second corner portion 313*e* may be electrically connected to the ground 413 of the first plate 310.

With reference to FIG. 11B, when the plurality of side portions 313*a* to 323*c* are grounded, a resonance frequency 1 formed in the electronic device 300 in the folded state may operate at a lower frequency of about 840 MHz that may be lower than the resonance frequencies described with reference to FIGS. 9B and 10B. For example, a position of the resonance frequency 1 of FIG. 11C on the graph 1130 may be low shifted compared to the position of the resonance frequency 1 of FIG. 9B and the position of the resonance frequency 1 of FIG. 10B. This may represent that, when the foldable electronic device 300 is in the folded state, grounding of the plurality of side portions 313*a* to 323*c* may affect the operating frequency band.

With reference to FIG. 11C, the fourth side portion 323*a*, the fifth side portion 323*b*, the sixth side portion 323*c*, the third corner portion 323*d*, and the fourth corner portion 323*e* may be electrically connected to the ground of the second plate 320. For example, the fourth side surface 323*a* may be electrically connected to the ground 421 of the second plate 320. The fifth side portion 323*b* may be electrically connected to the ground 424 of the second plate 320. The sixth side portion 323*c* may be electrically connected to the ground 422 of the second plate 320. The third corner portion 323*d* may be electrically connected to the ground 423 of the second plate 320. For example, the overall electric field mode of the second plate 320 that includes the fourth side portion 323*a*, the fifth side portion 323*b*, the sixth side portion 323*c*, the third corner portion 323*d*, and the fourth corner portion 323*e* may be substantially similar and/or the same as the first mode that is the electric mode of the second plate 300 as described with reference to FIG. 9C.

Figure 12A:
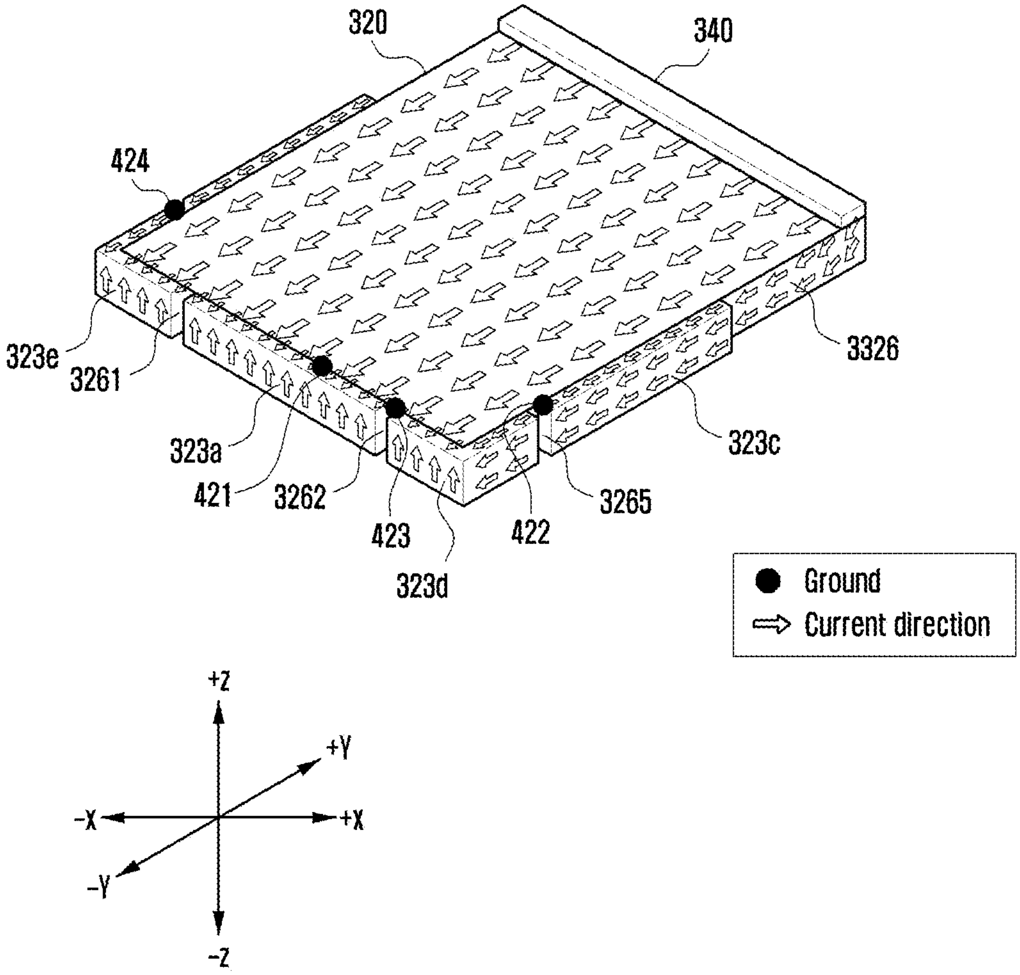
FIG. 12A is a conceptual diagram illustrating, in the shielded parallel plate model, the current distribution of the electronic device in the folded state in which conductive portions included in the side portions are grounded, according to various embodiments.
Figure 12B:
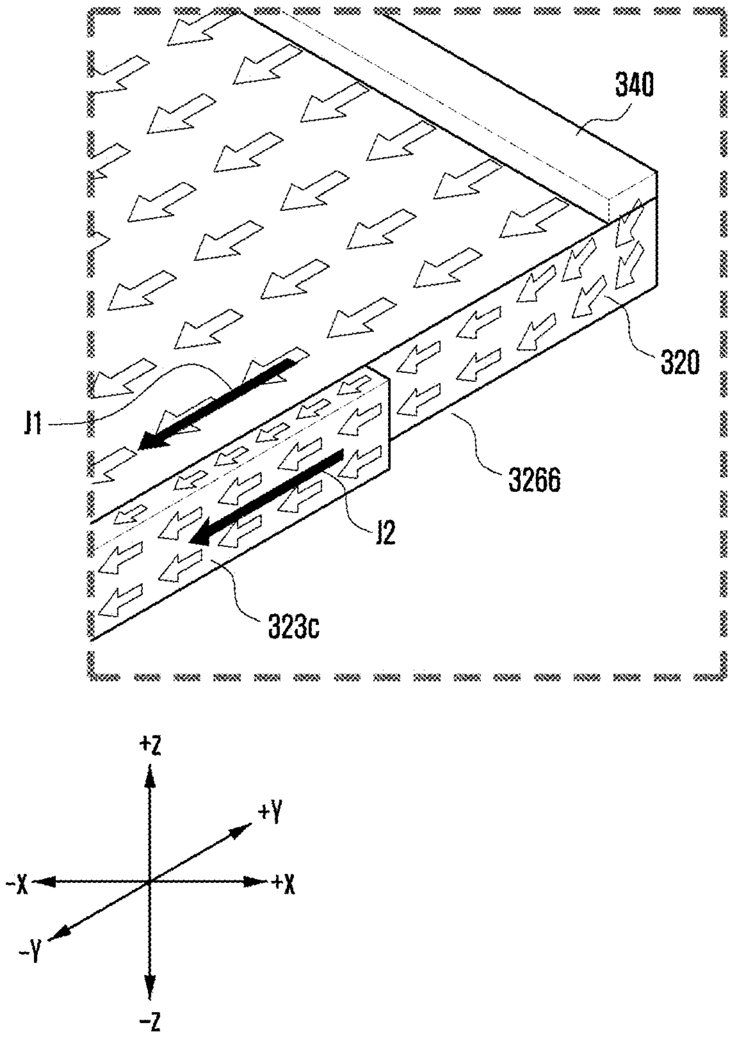
FIG. 12B is a conceptual diagram illustrating, in the shielded parallel plate model, the current distribution of the electronic device in the folded state in which conductive portions included in the side portions are grounded, according to various embodiments.

FIG. 12A is a conceptual diagram illustrating, in the shielded parallel plate model, the current distribution of the electronic device 300 in the folded state in which the plurality of side portions 313*a* to 323*c* formed of conductive material are grounded, according to various embodiments. FIG. 12B is a conceptual diagram illustrating, in the shielded parallel plate model, the current distribution of the electronic device 300 in the folded state in which the plurality of side portions 313*a* to 323*c* formed of conductive material are grounded, according to various embodiments.

With reference to FIG. 12A, the surface current formed on the surface of the second plate 320 based on the X-Y plane may be formed to flow from the hinge 340 into one side surface of the second plate 320 (e.g., fourth side portion 323*a* of second housing 320). In each of the fourth side portion 323*a*, the fifth side portion 323*b*, the sixth side portion 323*c*, the third corner portion 323*d*, and the fourth corner portion 323*e*, a direction of the surface current induced on the surface at a cavity parasitic resonance frequency may be substantially similar and/or the same as a direction of the surface current formed on the surface of the second plate 320.

With reference to FIG. 12B, a direction of the second surface current J2 induced on the surface at the cavity parasitic resonance frequency in the sixth side portion 323*c* may be substantially similar and/or the same as a direction of the first surface current J1 formed on the surface of the second plate 320.

Figure 13A:
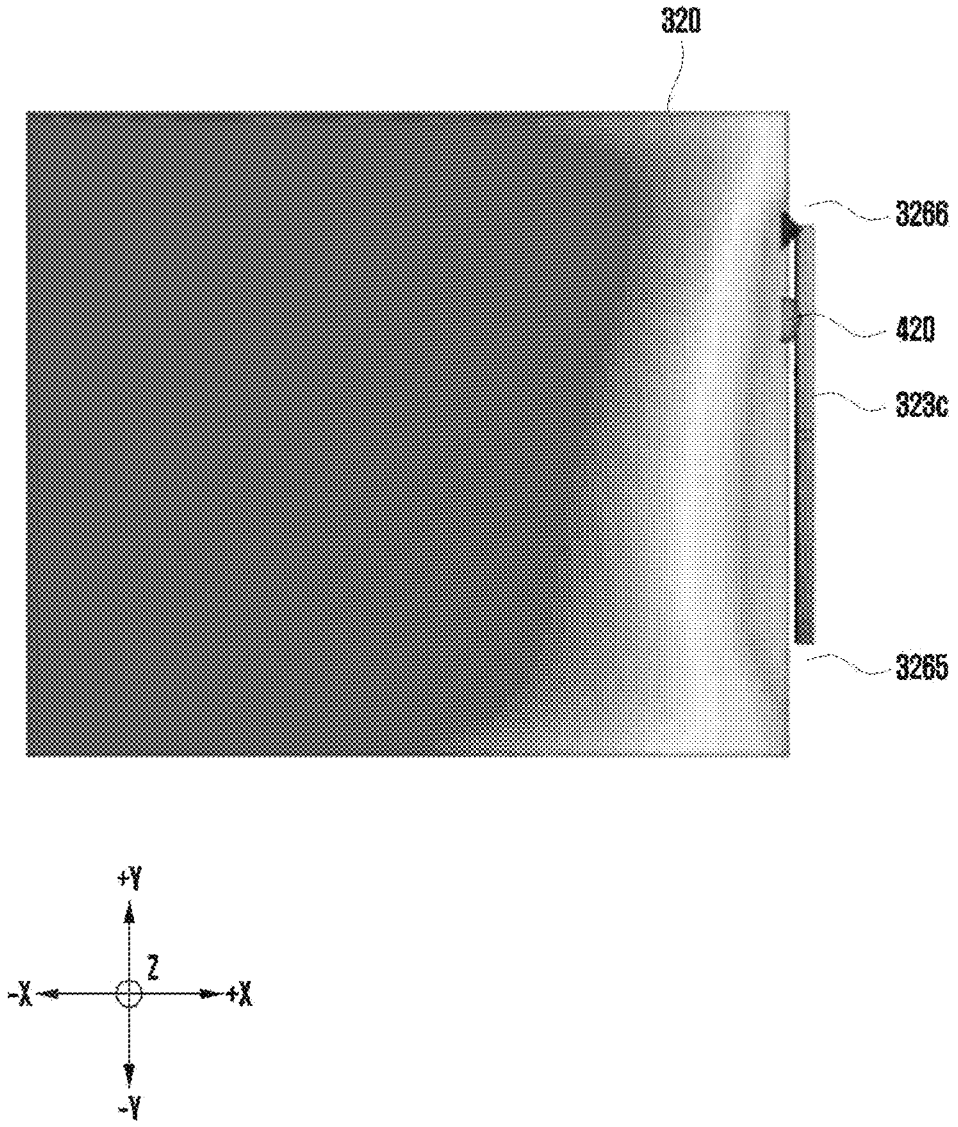
FIG. 13A is a conceptual diagram illustrating an electric field mode of the second housing and the sixth side surface of the electronic device in the shielded parallel plate model, according to various embodiments.
Figure 13B:
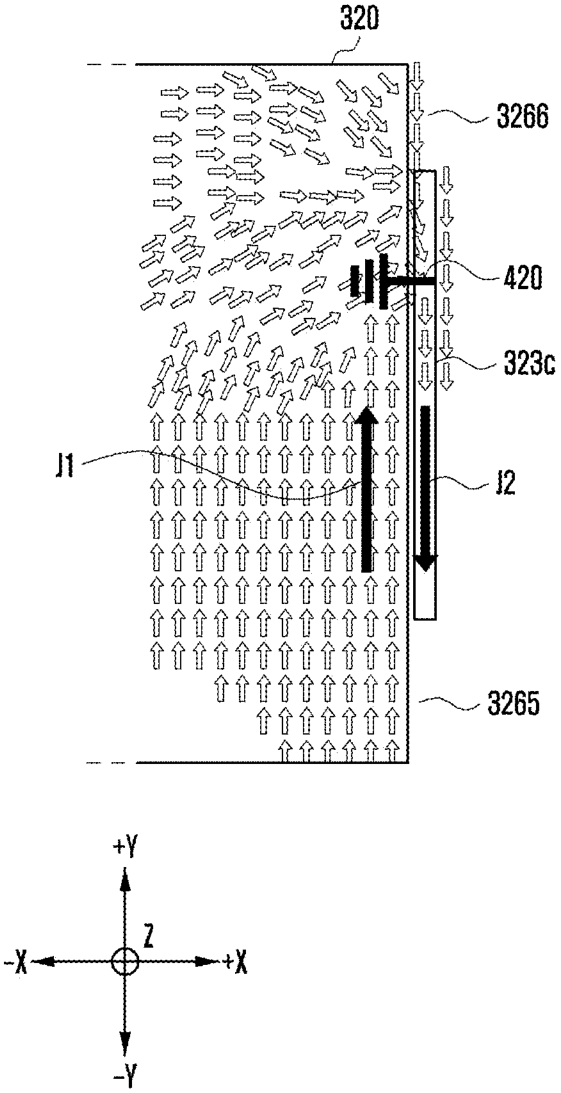
FIG. 13B is a conceptual diagram illustrating the surface current of the second housing and the surface current of the sixth side surface of the electronic device in the shielded parallel plate model, according to various embodiments.

FIG. 13A is a conceptual diagram illustrating an electric field mode of the second housing 320 and the sixth side portion 323*c* of the electronic device 300 in the shielded parallel plate model, according to various embodiments. FIG. 13B is a conceptual diagram illustrating the surface current of the second housing 320 and the surface current of the sixth side surface 323*c* of the electronic device 300 in the shielded parallel plate model, according to various embodiments.

With reference to FIG. 13A, in the shielded parallel plate model, the sixth side portion 323*c* may be grounded to the second plate 320 through a ground member 420. A second parasitic resonance having a frequency with a wavelength of about λ/4 may occur in the sixth side surface 323*c* grounded to the second plate 320 through the ground member 420. A mode of electric field by the second parasitic resonance formed in the grounded sixth side portion 323*c* may be referred to as a second mode.

With reference to FIG. 13B, in the shielded parallel plate model, a direction of the second surface current J2 induced on the surface at the frequency of the second parasitic resonance having the frequency with the wavelength of about λ/4, occurring in the sixth side portion 323*c* grounded to the second plate 320 through the ground member 420, may be opposite to a direction of the first surface current J1 induced on the surface of the second plate 320. In the electronic device 300 in the folded state, when the sixth side portion 323*c* is electrically connected to the ground of the second plate 320, the electric field corresponding to the first mode by the first surface current J1 induced on the surface of the second plate 320 and the electric field corresponding to the second mode by the second parasitic resonance formed by the second surface current J2 induced to the sixth side portion 323*c* electrically connected to the ground of the second plate 320 may be formed in the electronic device 300. That is, the electric field of the first mode and the electric field of the second mode that differ from each other may be formed in the electronic device 300. For example, the frequency of the first parasitic resonance may be referred to as a cavity resonance frequency or a parallel plate waveguide (PPW) resonance frequency. The frequency of the second parasitic resonance may be referred to as a line resonance frequency.

A phenomenon that the direction of the second surface current J2 induced on the surface of the sixth side surface 323*c* due to the parasitic resonance frequency with the wavelength of λ/4 and the direction of the first surface current J1 induced on the surface of the second plate 320 may be referred to as a reverse current effect. The present disclosure provides a structure capable of controlling the first parasitic resonance formed in the electronic device 300 in the folded state using the second parasitic resonance, according to the reverse current effect. That is, the present disclosure provides the electronic device 300 to improve antenna performance in a target band by shifting the frequency band of the first parasitic resonance using the second parasitic resonance.

Figure 14A:
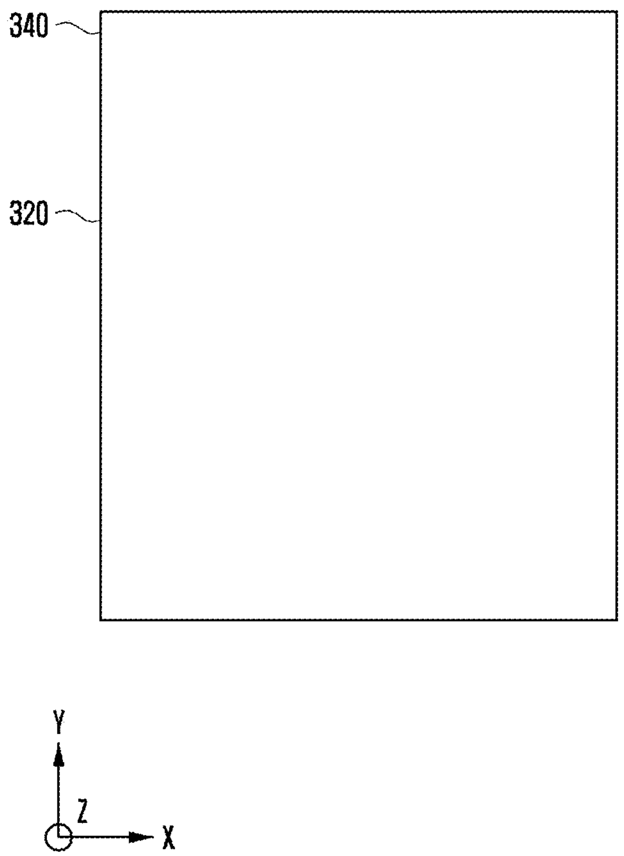
FIG. 14A is a top view of the shielded parallel plate model corresponding to the electronic device in which first parasitic resonance is formed, according to various embodiments.
Figure 14B:
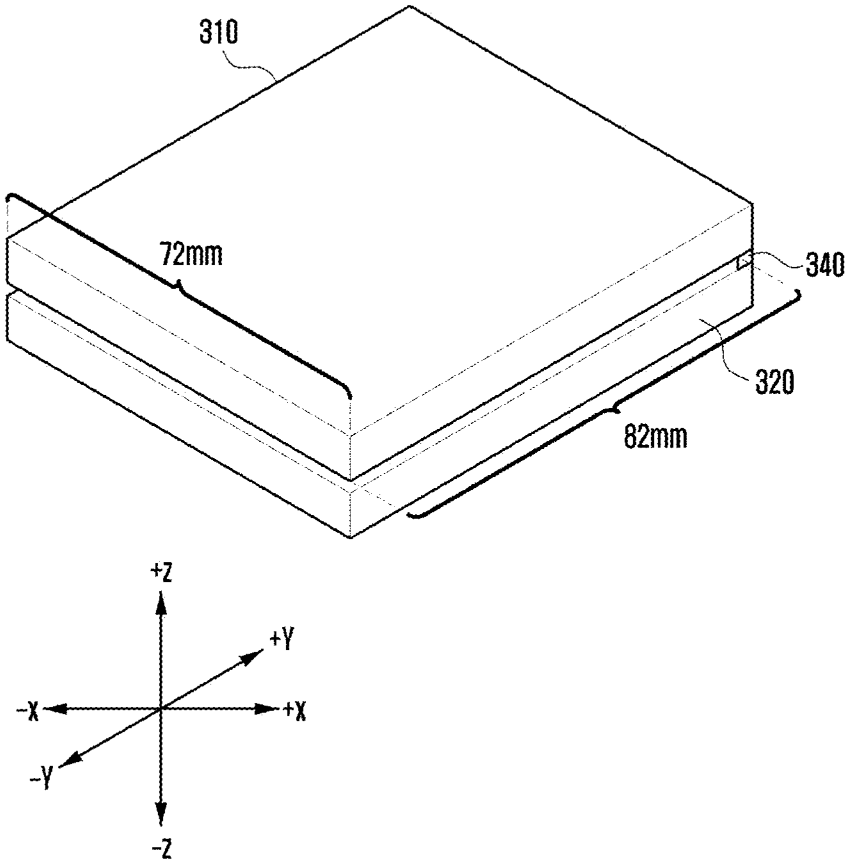
FIG. 14B is a perspective view of the shielded parallel plate model corresponding to the electronic device in which the first parasitic resonance is formed, according to various embodiments.
Figure 14C:
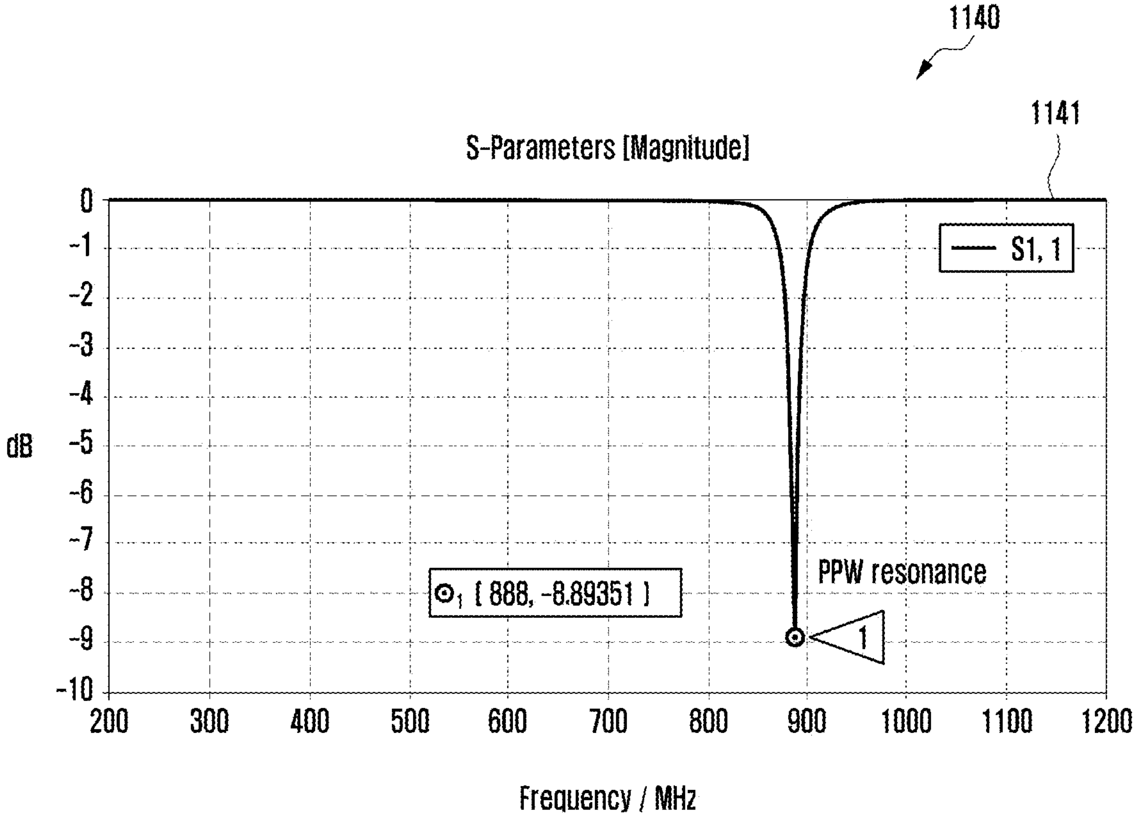
FIG. 14C is a graph showing a reflection coefficient of first parasitic resonance frequency of the electronic device in which the first parasitic resonance is formed, according to various embodiments.
Figure 14D:
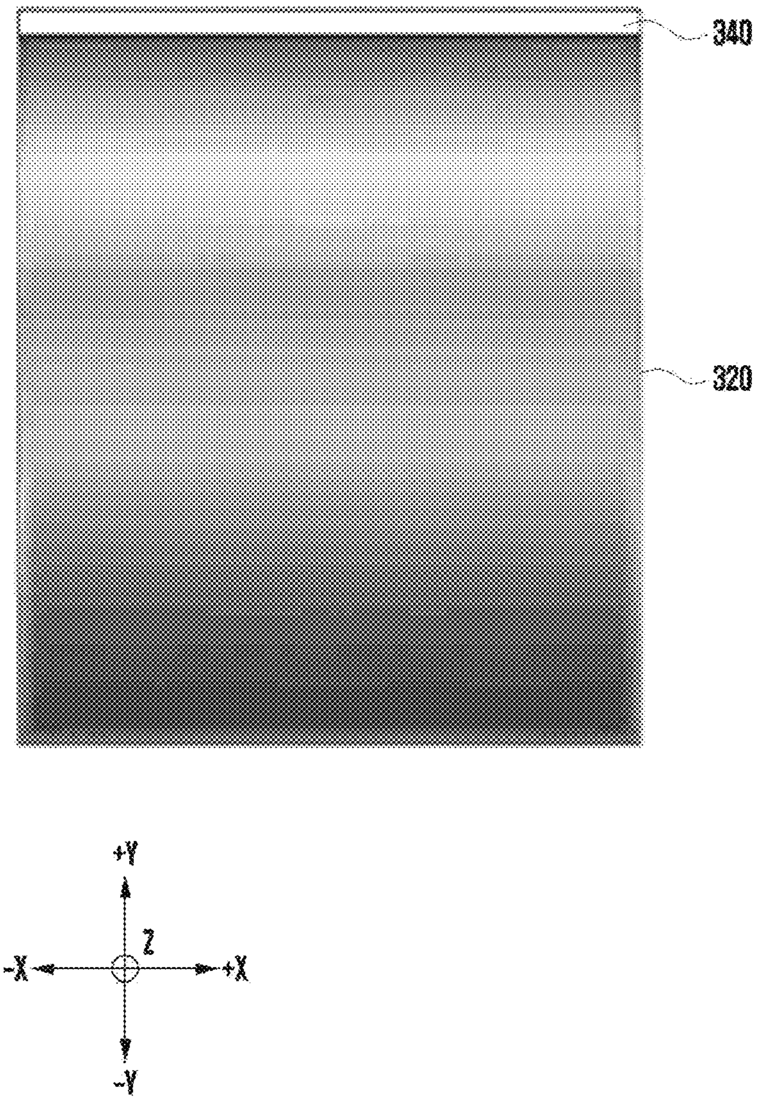
FIG. 14D is a conceptual diagram illustrating, in the shielded parallel plate model, an electric field mode of the electronic device in which the first parasitic resonance is formed, according to various embodiments.

FIG. 14A is a top view of the shielded parallel plate model corresponding to the electronic device 300 in which PPW resonance is formed, according to various embodiments. FIG. 14B is a perspective view of the shielded parallel plate model corresponding to the electronic device 300 in which the PPW resonance is formed, according to various embodiments. FIG. 14C is a graph 1140 showing a reflection coefficient 1141 of PPW resonance frequency of the electronic device 300 in which the PPW resonance is formed, according to various embodiments. FIG. 14D is a conceptual diagram illustrating, in the shielded parallel plate model, an electric field mode of the electronic device 300 in which the PPW resonance is formed, according to various embodiments.

With reference to FIGS. 14A and 14B, the shielded parallel plate model corresponding to the electronic device 300 in the folded state that does not include side portions or in which the side portions are not formed of conductive material may be the same as or similar to the shielded parallel plate model 300 of FIG. 5B, the shielded parallel plate model 300 of FIG. 8A, or the shielded parallel plate model 300 of FIG. 9A. According to various embodiments, a horizontal length of each of the first plate 310 and the second plate 320 may be about 72 millimeters (mm) based on the X-Y plane, for example. According to various embodiments, a vertical length of each of the first plate 310 and the second plate 320 may be about 82 mm based on the X-Y plane, for example.

With reference to FIG. 14C, a resonance frequency 1141 (1) formed in the electronic device 300 in the folded state that does not include side portions or in which the side portions are not formed of conductive material may be positioned at about −8.89351 dB at the frequency of about 888 MHz, for example.

With reference to FIG. 14D, in the case of an electric field mode illustrated in the shielded parallel plate model corresponding to the electronic device 300 in the folded state that does not include side portions or in which the side portions are not formed of conductive material, as shown in FIGS. 6A, 6B, and 9C, the electric field (E-Field) of the electronic device 300 in the folded state is proportional to potential and the potential is zero (0) at the hinge 340 to which the first plate 310 and the second plate 320 are grounded and magnitude of the electric field may be zero (0), accordingly. Alternatively, in the electronic device 300 in the folded state, since the potential increases as a distance away from the hinge 340 increases, the magnitude of the electric field may also increase. The first parasitic resonance may occur due to the first surface current J1 formed on the surface of the electronic device 300 in the folded state. The mode of the electric field of the electronic device 300 by the first parasitic resonance may be referred to as the first mode.

Figure 15A:
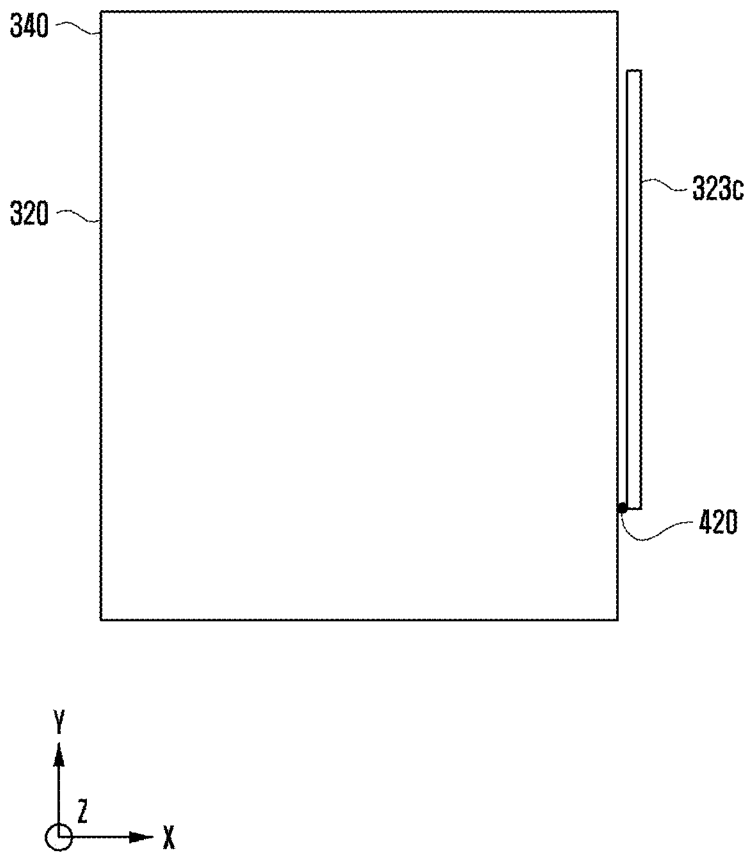
FIG. 15A is a top view of the shielded parallel plate model corresponding to the electronic device in which the first parasitic resonance and second parasitic resonance are formed, according to various embodiments.
Figure 15B:
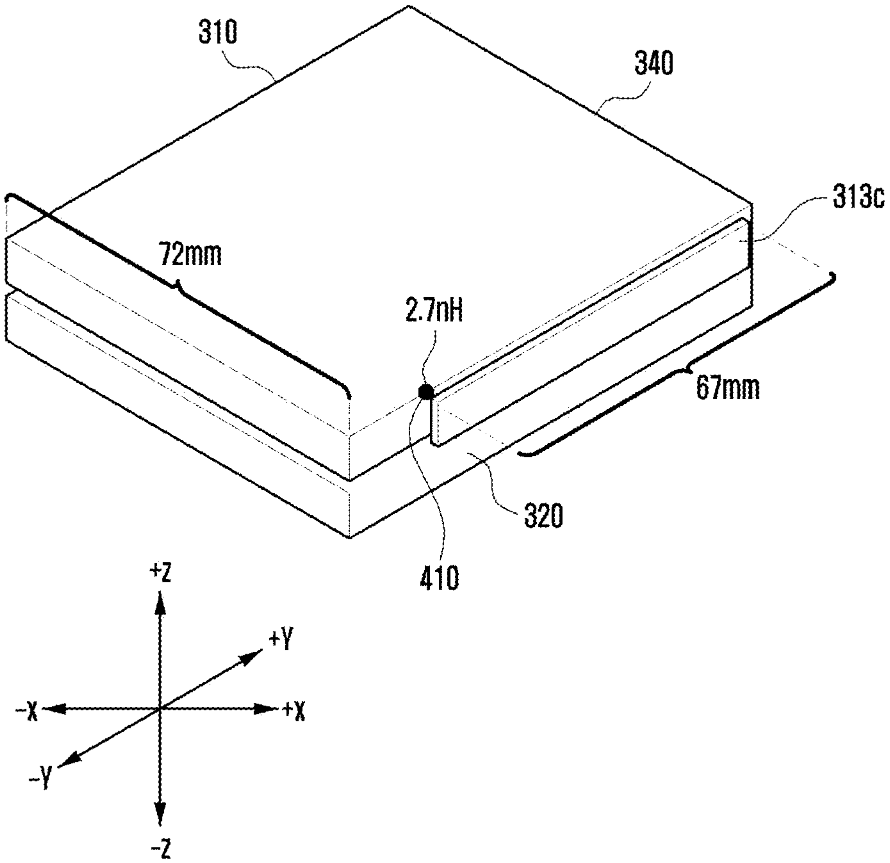
FIG. 15B is a perspective view of the shielded parallel plate model corresponding to the electronic device in which the first parasitic resonance and the second parasitic resonance are formed, according to various embodiments.
Figure 15C:
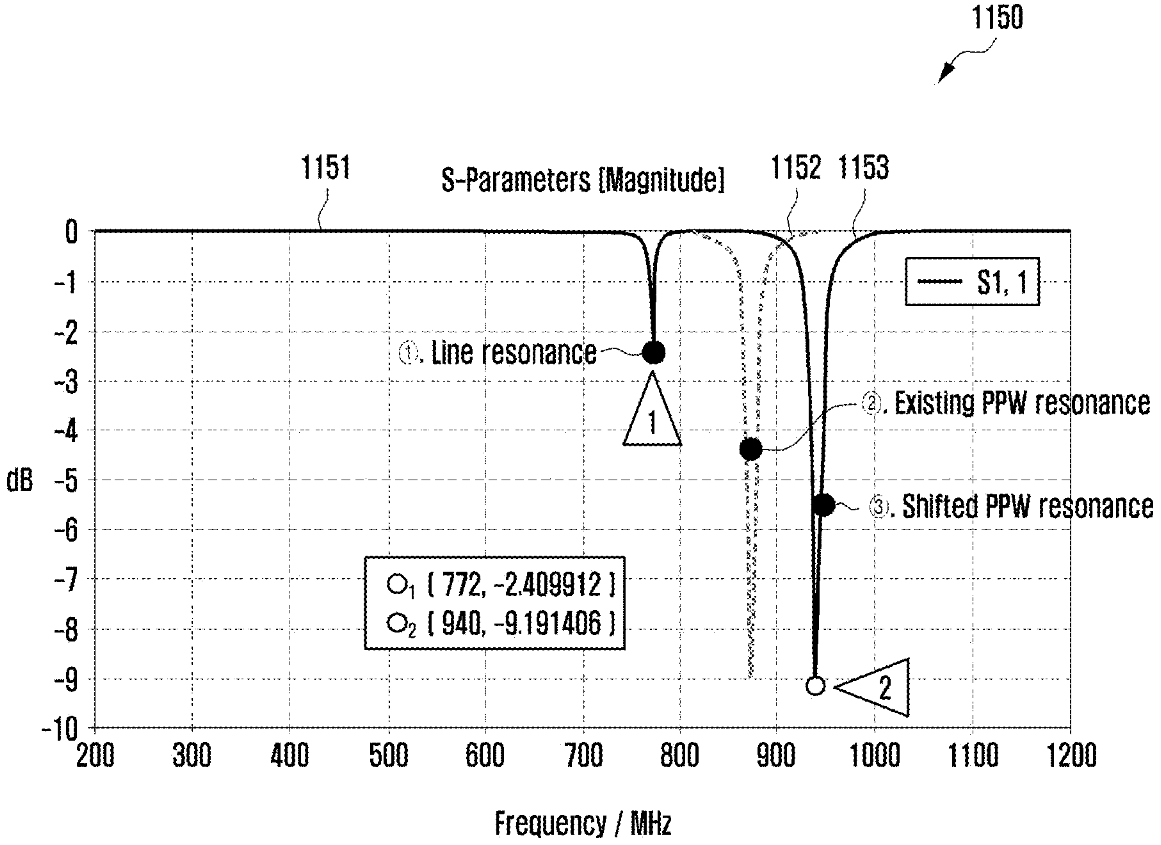
FIG. 15C is a graph showing a reflection coefficient of second resonance frequency and a reflection coefficient of first parasitic resonance frequency of the electronic device in which the first parasitic resonance and the second parasitic resonance are formed, according to various embodiments.
Figure 15D:
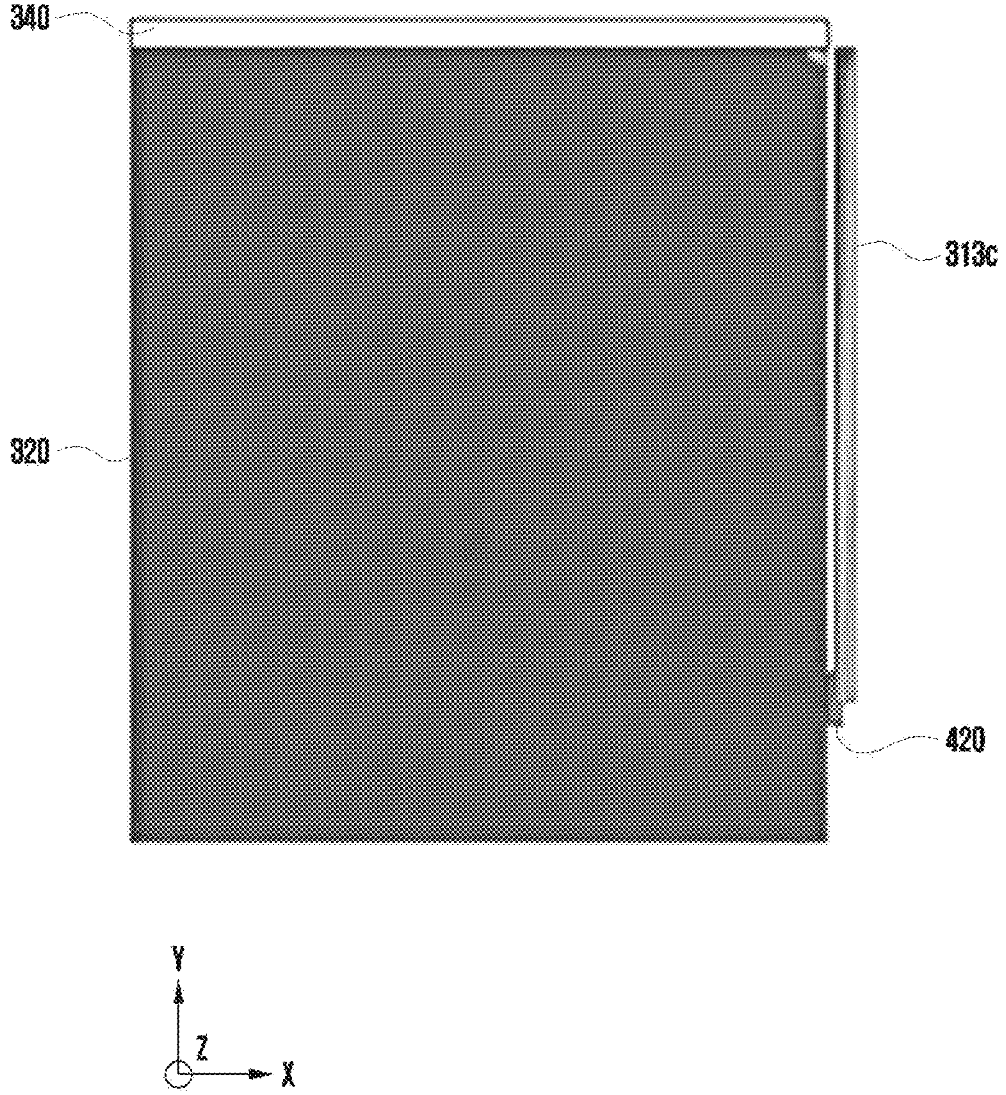
FIG. 15D is a conceptual diagram illustrating, in the shielded parallel plate model, an electric field mode of the electronic device in which the second parasitic resonance is formed, according to various embodiments.
Figure 15E:
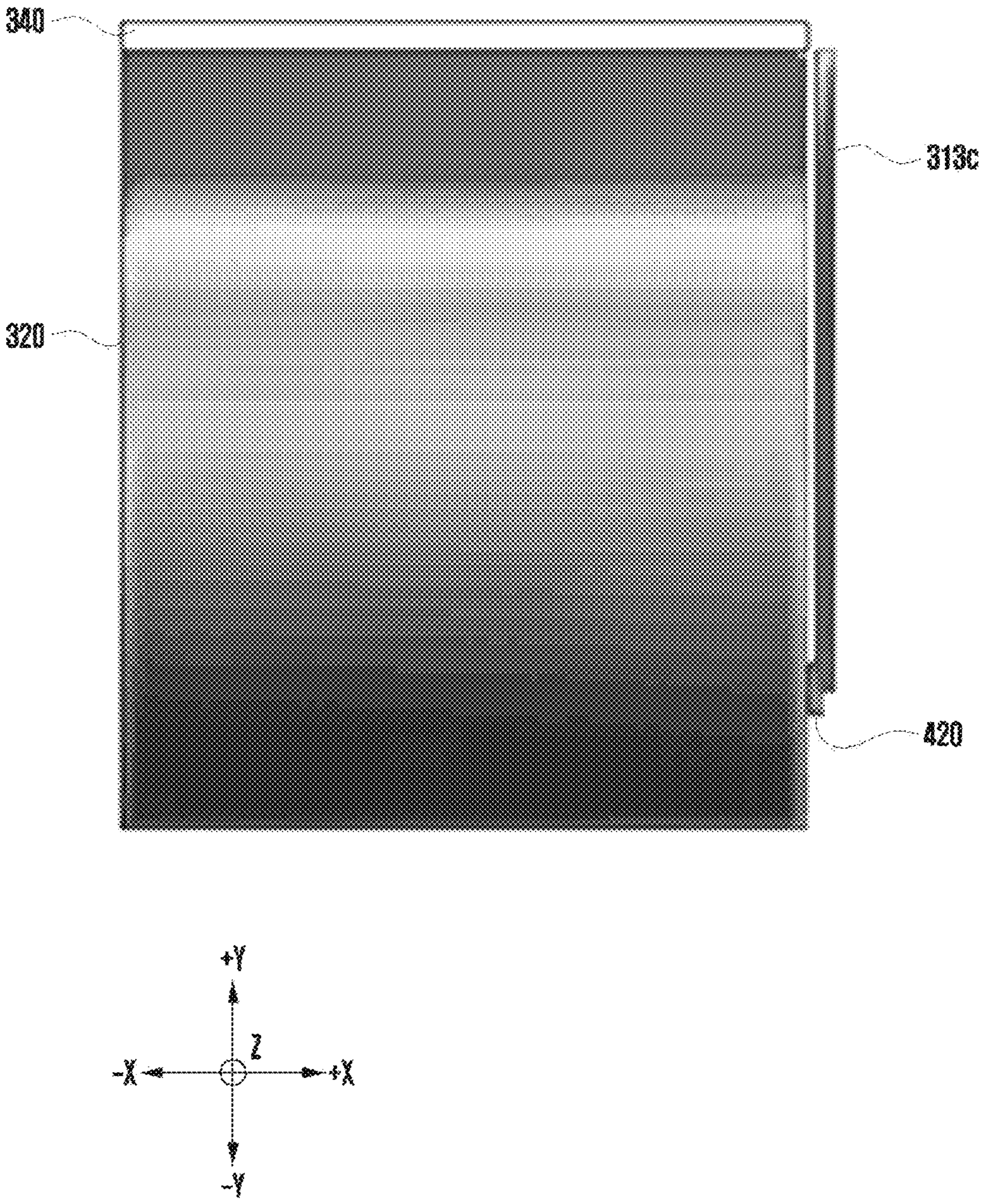
FIG. 15E is a conceptual diagram illustrating, in the shielded parallel plate model, an electric field mode of the electronic device in which the first parasitic resonance is formed, according to various embodiments.

FIG. 15A is a top view of the shielded parallel plate model corresponding to the electronic device 300 in which the first parasitic resonance and the second parasitic resonance are formed, according to various embodiments. FIG. 15B is a perspective view of the shielded parallel plate model corresponding to the electronic device 300 in which the first parasitic resonance and the second parasitic resonance are formed, according to various embodiments. FIG. 15C is a graph 1150 showing a reflection coefficient of line resonance frequency and a reflection coefficient of PPW resonance frequency of the electronic device 300 in which the first parasitic resonance and the second parasitic resonance are formed, according to various embodiments. FIG. 15D is a conceptual diagram illustrating, in the shielded parallel plate model, the second mode corresponding to electric field formed, according to the second parasitic resonance in the electronic device 300, according to various embodiments. FIG. 15E is a conceptual diagram illustrating, in the shielded parallel plate model, the first mode corresponding to electric field formed according to the first parasitic resonance in the electronic device 300, according to various embodiments.

With reference to FIG. 15A, in the shielded parallel plate model corresponding to the electronic device 300, according to an embodiment, the third side surface 313*c* may be grounded to the ground of the first plate 310 through a ground member 420.

With reference to FIG. 15B, based on the X-Y plane, according to various embodiments, a horizontal length of each of the first plate 310 and the second plate 320 may be about 72 mm, for example. Based on the X-Y plane, according to various embodiments, a vertical length of each of the first plate 310 and the second plate 320 may be about 82 mm, for example. Based on the X-Y plane, according to various embodiments, a horizontal length of the sixth side surface 323*c* may be about 67 mm, as an example. For example, the ground member 420 may be and/or may include an inductor having an inductance value of about 2.7 nanoHenry (nH).

With reference to FIG. 15C, the first parasitic resonance 1152 (existing PPW resonance (2)) formed by the first surface current J1 of the second housing 320 may be formed in the electronic device 300 in the folded state. The first parasitic resonance 1152 (existing PPW resonance (2)) and the second parasitic resonance 1151 (line resonance 1) by the second surface current J2 induced on the sixth side surface 323*c* grounded to the second plate 320 may be formed in the electronic device 300 in the folded state through the ground member 420. A frequency band of the frequency of the first parasitic resonance 1152 (existing PPW resonance (2)) may be shifted by the second parasitic resonance 1151 (line resonance (1)). For example, the frequency band of the first parasitic resonance 1153 (shifted PPW resonance (3)) may be about −9.1914061 dB at about 940 MHz. The shape in which the frequency band shifts may be referred to as a resonance-splitting phenomenon.

With reference to FIG. 15D, the second parasitic resonance may occur in the electronic device 300 in the folded state due to the second surface current J2 induced on the sixth side surface 323*c* grounded to the second plate 320 through the ground member 420. The mode of the electric field of the electronic device 300 by the second parasitic resonance may be referred to as the second mode.

With reference to FIG. 15E, the first parasitic resonance may occur due to the first surface current J1 formed on the surface of the electronic device 300 in the folded state. The mode of the electric field of the electronic device 300 by the first parasitic resonance may also be referred to as the first mode.

That is, the electric field of the first mode and the electric field of the second mode that differ from each other may be formed in the electronic device 300.

Figure 16A:
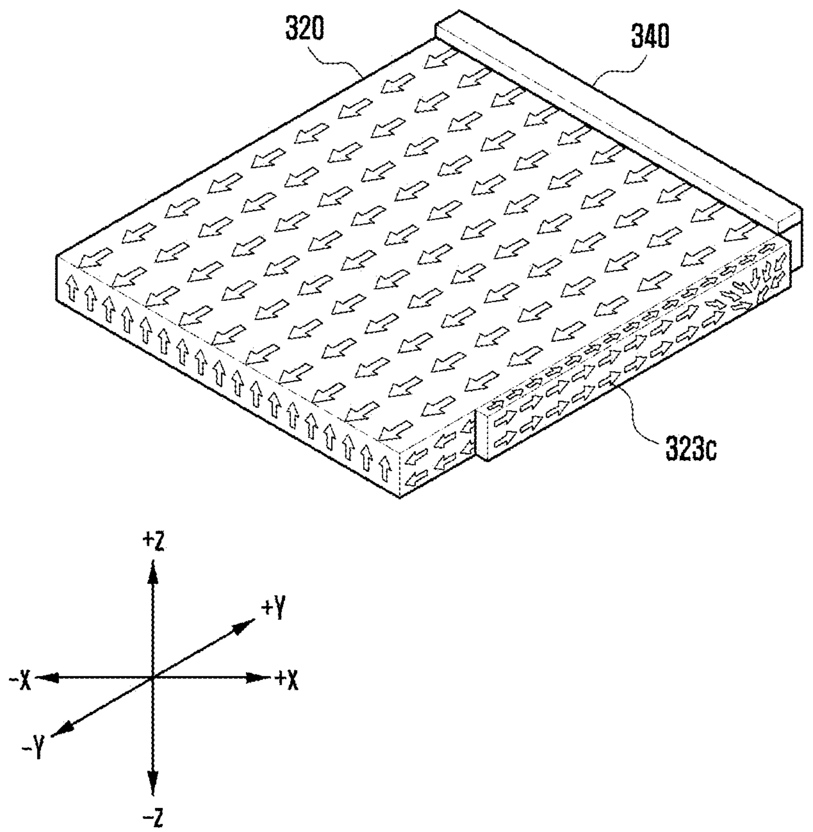
FIG. 16A is a conceptual diagram illustrating, in the shielded parallel plate model, the current distribution of the electronic device in which the first parasitic resonance and the second parasitic resonance are formed, according to various embodiments.
Figure 16B:
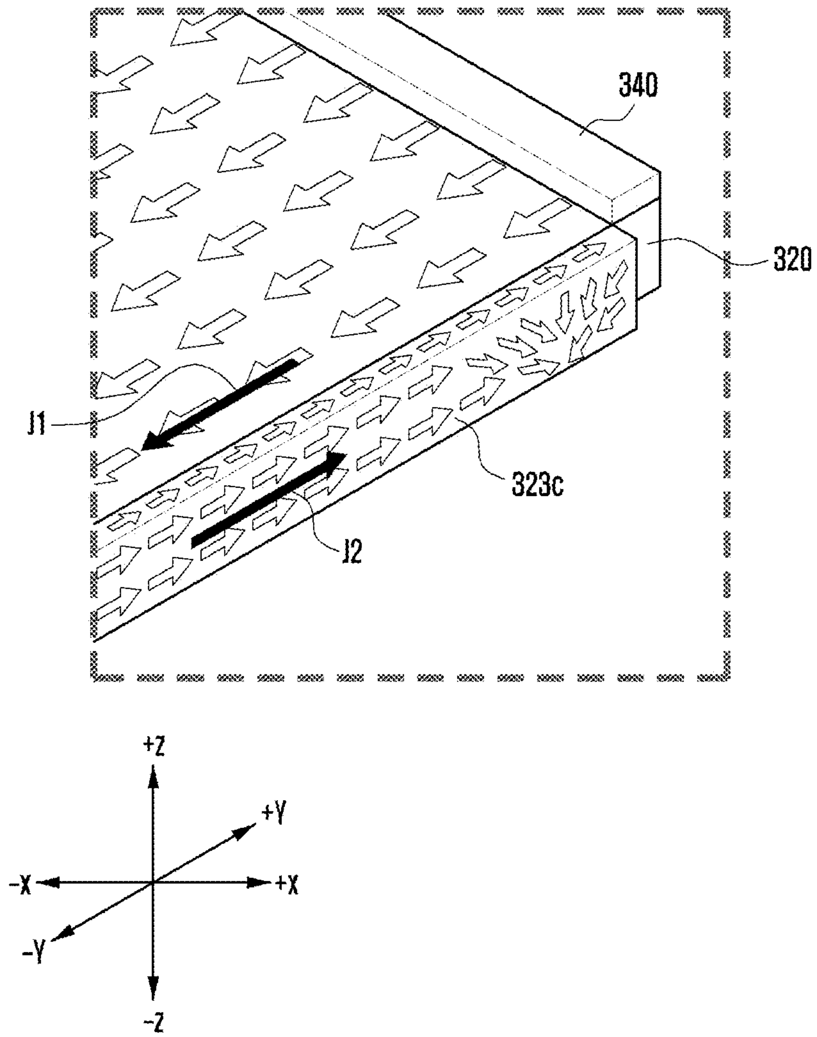
FIG. 16B is a conceptual diagram illustrating, in the shielded parallel plate model, the current distribution of the electronic device in which the first parasitic resonance and the second parasitic resonance are formed, according to various embodiments.

FIG. 16A is a conceptual diagram illustrating, in the shielded parallel plate model, the current distribution of the electronic device 300 in which the first parasitic resonance and the second parasitic resonance are formed, according to various embodiments. FIG. 16B is a conceptual diagram illustrating, in the shielded parallel plate model, the current distribution of the electronic device 300 in which the first parasitic resonance and the second parasitic resonance are formed, according to various embodiments.

With reference to FIGS. 16A and 16B, a direction of the second surface current J2 induced to the sixth side portion 323*c* that is grounded to the ground of the second plate 320 through the ground member 420 may be formed in a direction opposite to a direction of the second surface current J2 induced on the surface of the second plate 320 due to the grounding. For example, in the shielded parallel plate model corresponding to the electronic device 300, the first surface current J1 formed on the surface of the second plate 320 may be formed in the −Y-axis direction based on the X-Y plane. In the shielded parallel plate model, the second surface current J2 induced on the sixth side surface 323*c* grounded to the second plate 320 through the ground member 420 in the second plate 320 may be formed in the +Y-axis direction that is opposite to the direction of the first surface current J1.

In the shielded parallel plate model, since the second surface current J2 induced to the sixth side portion 323*c* grounded to the ground of the second plate 320 through the ground member 420 is formed in the direction opposite to the direction of the first surface current J1 induced on the surface of the second plate 320, a resonance-splitting phenomenon may occur between the frequency of the first parasitic resonance by the first surface current J1 formed on the surface of the second plate 320 and the frequency of the second parasitic resonance by the second surface current J2 induced to the sixth side portion 323*c* grounded to the ground of the second plate 320 through the ground member 420 in the shielded parallel plate model. For example, the resonance-splitting phenomenon may represent that, as shown in FIG. 15C, the frequency of the first parasitic resonance formed by the first surface current J1 formed on the surface of the second plate 320 shifts to a specific frequency band without maintaining the existing frequency band due to the effect of the second parasitic resonance formed by the second surface current J2 induced to the sixth side portion 323*c* grounded to the second plate 320.

Figure 17A:
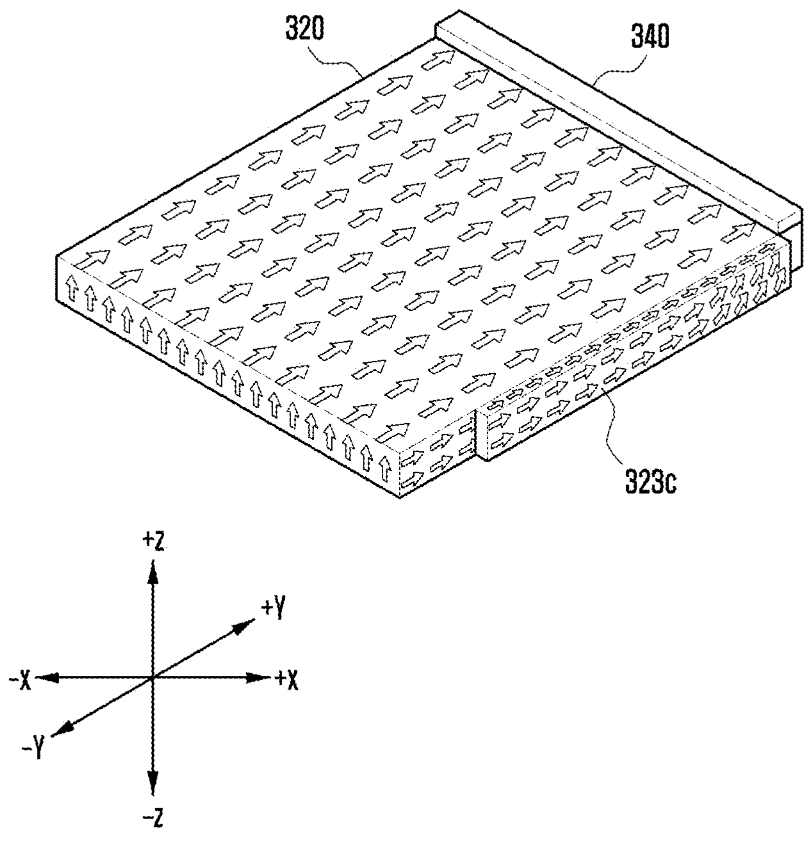
FIG. 17A is a conceptual diagram illustrating, in the shielded parallel plate model, the current distribution of the electronic device in which the first parasitic resonance is formed, according to various embodiments.
Figure 17B:
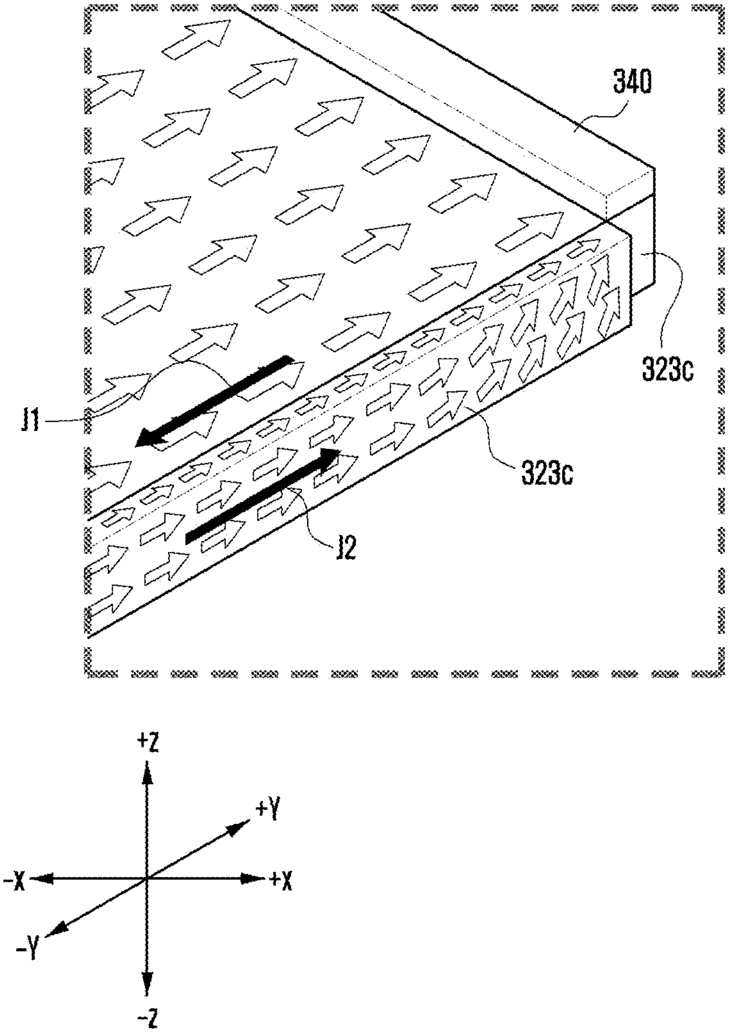
FIG. 17B is a conceptual diagram illustrating, in the shielded parallel plate model, the current distribution of the electronic device in which the first parasitic resonance is formed, according to various embodiments.

FIG. 17A is a conceptual diagram illustrating, in the shielded parallel plate model, the current distribution of the electronic device 300 in which the first parasitic resonance is formed, according to various embodiments. FIG. 17B is a conceptual diagram illustrating, in the shielded parallel plate model, the current distribution of the electronic device 300 in which the first parasitic resonance is formed, according to various embodiments.

With reference to FIGS. 17A and 17B, the direction of the second surface current J2 induced to the sixth side portion 323*c* not grounded to the ground of the second plate 320 may be formed in the same direction as the direction of the second surface current J2 induced on the surface of the second plate 320, which may be different from the direction of the second surface current J2 induced to the sixth side portion 323*c* grounded to the ground of the second plate 320 through the ground member 420 as shown in FIGS. 16A and 16B. For example, when the sixth side portion 323*c* is not grounded to the ground of the second plate 320, the resonance-splitting phenomenon may not occur.

Figure 18:
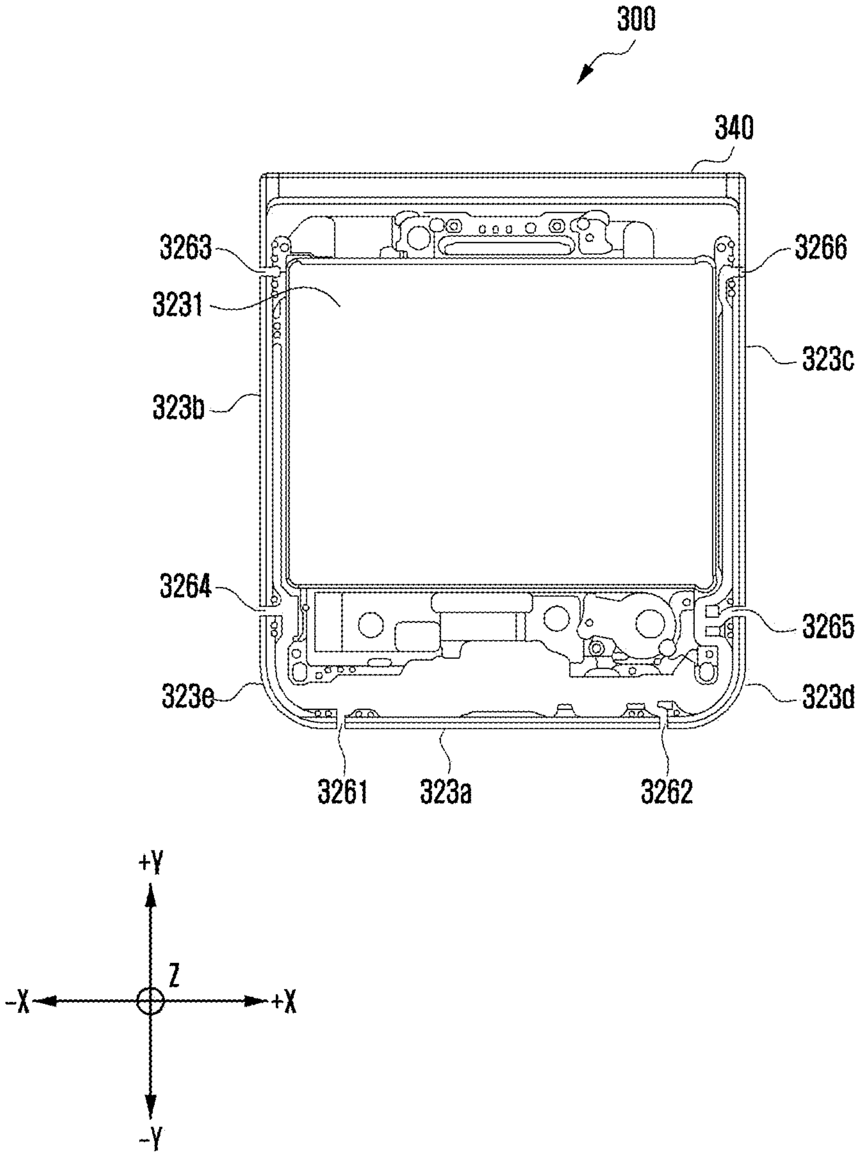
FIG. 18 is a conceptual diagram illustrating one surface of the electronic device, according to various embodiments.

FIG. 18 is a top view illustrating the electronic device 300, according to various embodiments.

With reference to FIG. 18, the second housing 320 of the electronic device 300 may include the second support member 3231, the plurality of side portions 323*a* to 323*c* formed of conductive material, and the plurality of corner portions 323*d* and 323*e*. For example, the fourth side portion 323*a* may be provided in the −Y-axis direction of the second housing 320 based on the X-Y plane. For example, the fourth side portion 323*a* may be provided to face the hinge structure 340 based on the X-axis in the second housing 320. For example, the fourth side portion 323*a* may include the first fragmentation portion 3261 and the second fragmentation portion 3262 formed of nonconductive material.

The fifth side portion 323*b* may be provided in the −X-axis direction of the second housing 320 based on the X-Y plane. The fifth side portion 323*b* may include the third fragmentation portion 3263 and the fourth fragmentation portion 3264 formed of nonconductive material. For example, the fifth side portion 323*b* may be electrically separated from the hinge structure 340 through the third fragmentation portion 3263.

The sixth side portion 323*c* may be provided in the +X-axis direction of the second housing 320, based on the X-Y plane. For example, the sixth side portion 323*c* may be provided to be symmetrical to the fifth side portion 323*b* based on the Y-axis in the second housing 320. The sixth side portion 323*c* may include the fifth fragmentation portion 3265 and the sixth fragmentation portion 3266 formed of nonconductive material. For example, the sixth side portion 323*c* may be electrically separated from the hinge structure 340 through the sixth fragmentation portion 3266.

The third corner portion 323*d* may be provided between the fourth side surface 323*a* and the sixth side surface 323*c*. The third corner portion 323*d* may be electrically separated from the fourth side portion 323*a* through the second fragmentation portion 3262. The third corner 323*d* may be electrically separated from the sixth side portion 323*c* through the fifth fragmentation portion 3265. The fourth corner portion 323*e* may be provided between the fourth side surface 323*a* and the fifth side surface 323*b*. The fourth corner portion 323*e* may be electrically separated from the fourth side portion 323*a* through the first fragmentation portion 3261. The fourth corner portion 323*e* may be electrically separated from the fifth side portion 323*b* through the fourth fragmentation portion 3264.

Figure 19A:
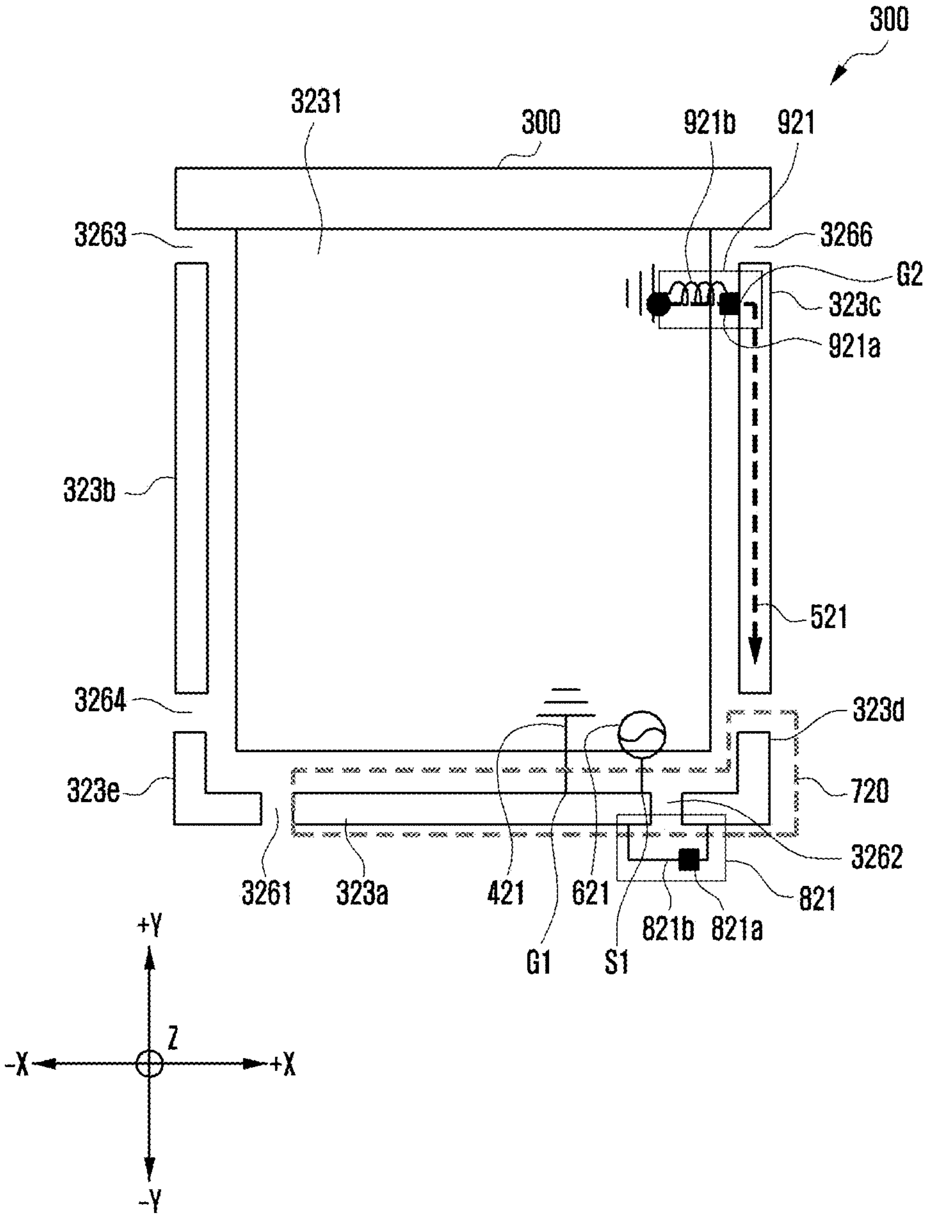
FIG. 19A is a conceptual diagram illustrating one surface of the electronic device, according to various embodiments.

FIG. 19A is a conceptual diagram illustrating the top surface of the electronic device 300 in a wireless communication system, according to various embodiments.

With reference to FIG. 19A, in an embodiment, in the second housing 320 of the electronic device 300, the fourth side surface 323*a* may be grounded to the second support member 3231 through a first ground member 421. For example, the first ground member 421 may electrically connect the fourth side surface 323*a* and the second support member 3231. For example, the first ground member 421 may electrically connect the fourth side portion 323*a* and the second support member 3231 through a PCB (e.g., second plate assembly 362).

The electronic device 300 may include the wireless communication module 192. The fourth side portion 323*a* may be electrically connected to the wireless communication module 192. In an embodiment, the fourth side portion 323*a* may be electrically connected to the third corner portion 323*d* through a first connecting portion 821 that includes a first switch 821*a* and a first conductive line 821*b*. One end of the first connecting portion 821 may be electrically connected to the fourth side portion 323*a*. The other end of the first connecting portion 821 may be electrically connected to the third corner portion 323*d*. For example, the first connecting portion 821 may be a logical connection as a connection line for connecting the fourth side portion 323*a* and the third corner portion 323*d*. For example, the first switch 821*a* and the first conductive line 821*b* may be formed in a PCB (e.g., second plate assembly 362). For example, the fourth side portion 323*a* and the third corner portion 323*d* may operate as a radiator 720. As another example, the fourth side portion 323*a* may operate as the radiator 720 along with the third corner portion 323*d* through the first switch 821*a*. As yet another example, the fourth side portion 323*a* may operate alone as the radiator 720 through the first switch 821*a*.

According to an embodiment, the sixth side portion 323*c* may be grounded to the second support member 3231 through a first matching circuit unit 921. For example, the first matching circuit unit 921 may include a second switch 921*a* and at least one first inductor 921*b*. As another example, the first matching circuit unit 921 may electrically connect the sixth side portion 323*c* and the second support member 3231. As yet another example, the first matching circuit unit 921 may electrically connect the sixth side portion 323*c* and the second support member 3231 through the PCB (e.g., second plate assembly 362). For example, one end of the first matching circuit unit 921 may be electrically connected to the sixth side portion 323*c*. The other end of the second ground member 422 may be electrically connected to the second support member 3231. Second parasitic resonance 521 may be formed in the first matching circuit unit 921 and the sixth side portion 323*c*.

In an embodiment, the first matching circuit unit 921 may be a tunable matching circuit unit that includes a plurality of inductors having various inductance values. For example, the number of first inductors 921*b* included in the first matching circuit unit 921 may be plural (e.g., a positive integer greater than one (1)). For example, the plurality of first inductors 921*b* may be connected in parallel to a second switch 921*a*. The second switch 921*a* may be selectively connected to one inductor among the plurality of first inductors 921*b*. For example, an inductance value of the first matching circuit unit 921 may be determined based on a frequency of a transmission signal of the electronic device 300. As another example, the inductance value of the first matching circuit unit 921 may have a sufficient size to operate close to open at the frequency of the transmission signal of the electronic device 300. For example, the inductance value of the first matching circuit unit 921 may be set to exceed a predetermined threshold so that the sixth side portion 323*c* does not electromagnetically couple with the radiator 720. That is, the electronic device 300 may control the second parasitic resonance frequency 521 while minimizing the effect on the radiator 720 through the first matching circuit unit 921. For example, the inductance value of the first matching circuit unit 921 may have various values, such as, but not limited to, about 39 nH, about 56 nH, or about 100 nH.

Figure 19B:
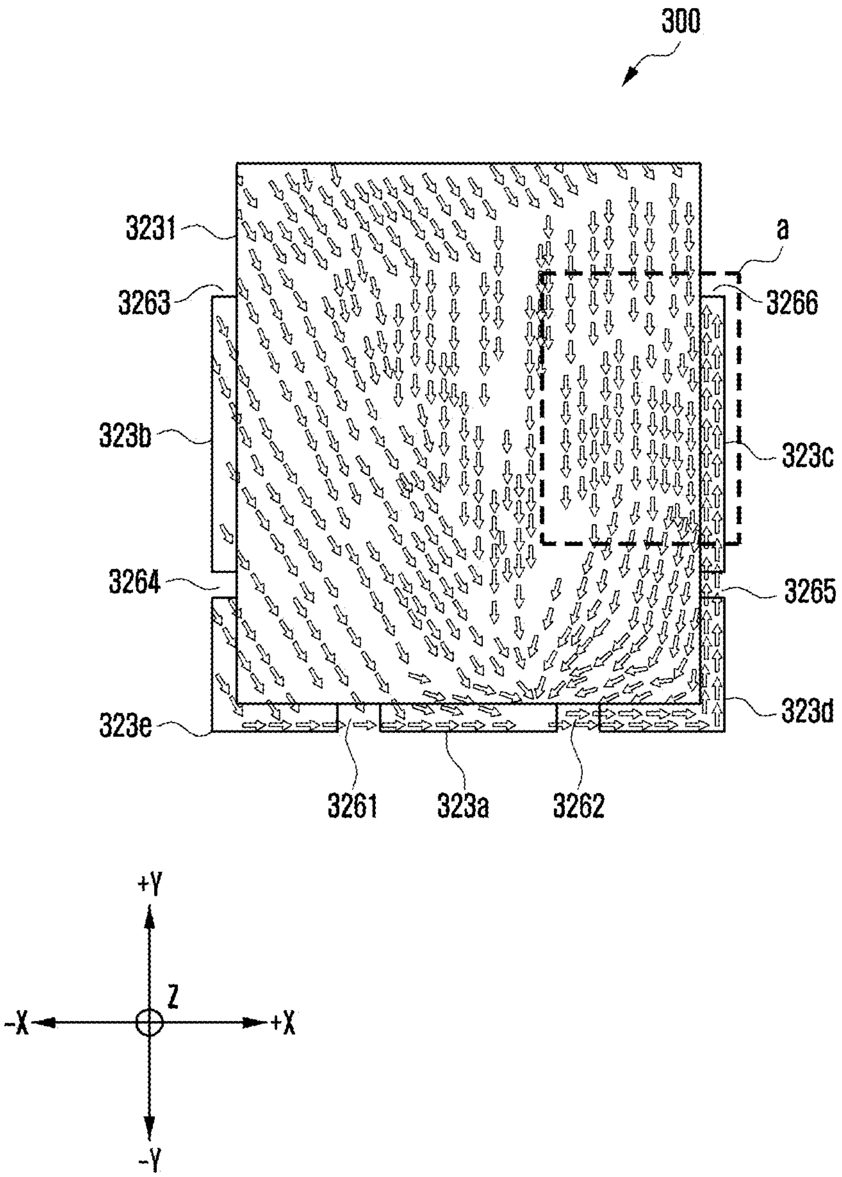
FIG. 19B is a conceptual diagram illustrating the distribution of the surface current of the electronic device, according to various embodiments.

FIG. 19B is a conceptual diagram illustrating the distribution of the surface current of the electronic device 300 in a wireless communication system, according to various embodiments.

With reference to FIG. 19B, in the electronic device 300 in the folded state, the current distribution formed on the surface of the second housing 320 may be formed from the hinge structure 340 toward the fourth side portion 323*a*. For example, in the electronic device 300, the current distribution formed on the surface of the second housing 320 may be formed from the hinge structure 340 toward a ground point of the fourth side portion 323*a* electrically connected to the second support member 3231. For example, in the electronic device 300, the current distribution formed on the surface of the second housing 320 may be formed from the hinge structure 340 toward the ground point at which the fourth side portion 323*a* and the first ground member 421 are connected.

In the electronic device 300, the electric field distribution of the sixth side portion 323*c* and a portion (a) of the second housing 320 adjacent to the sixth side portion 323*c* may be the same and/or may be similar in many respects to the electric field distribution described with reference to FIGS. 19C and 19D.

Figure 19C:
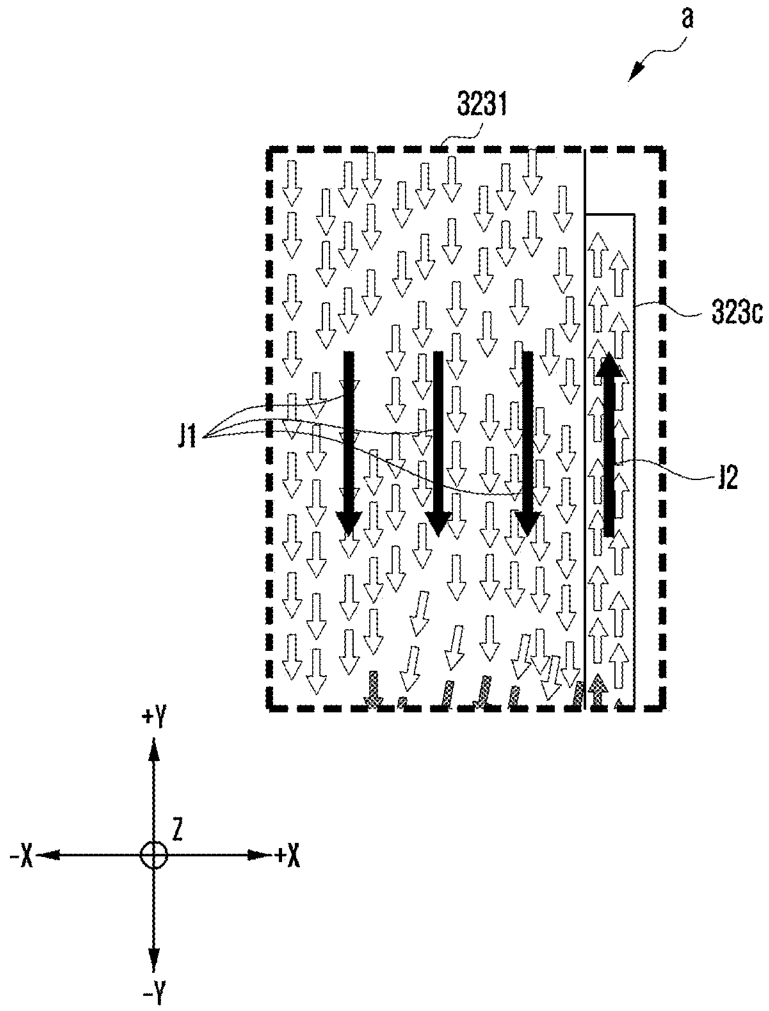
FIG. 19C is a conceptual diagram illustrating the distribution of the surface current on one surface of the electronic device, according to various embodiments.

FIG. 19C is a conceptual diagram illustrating distribution of the surface current of one surface of the electronic device 300, according to various embodiments.

Figure 19D:
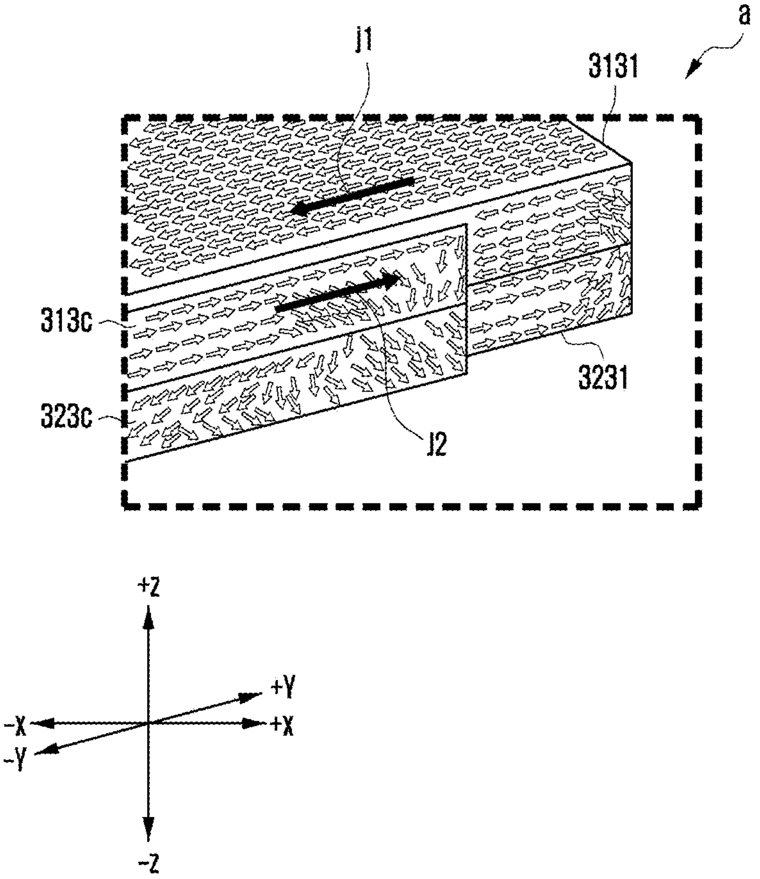
FIG. 19D is a conceptual diagram illustrating the distribution of the surface current on one side surface of the electronic device, according to various embodiments.

FIG. 19D is a conceptual diagram illustrating distribution of the surface current of one surface of the electronic device 300, according to various embodiments.

With reference to FIGS. 19C and 19D, a direction of the second surface current J2 induced to the sixth side portion 323*c* that is grounded to the second support member 3231 through the first matching circuit unit 921 may be formed in a direction opposite to a direction of the second surface current J2 induced on the surface (e.g., second rear cover 324) of the second housing 320 due to the grounding. For example, in the electronic device 300, the first surface current J1 formed on the surface of the second housing 320 may be formed in the −Y-axis direction based on the X-Y plane. In the second housing 320 of the electronic device 300, the second surface current J2 induced to the sixth side portion 323*c* grounded to the second support member 3231 through the first matching circuit unit 921 may be formed in the +Y-axis direction that is opposite to the direction of the first surface current J1.

In the electronic device 300, since the second surface current J2 induced to the sixth side portion 323*c* grounded to the second support member 3231 through the first matching circuit unit 921 is formed in the direction opposite to the direction of the first surface current J1 induced on the surface of the second housing 320, a resonance-splitting phenomenon may occur between the frequency of the first parasitic resonance by the first surface current J1 formed on the surface of the second plate 320 in the electronic device 300 and the frequency of the second parasitic resonance 521 by the second surface current J2 induced to the sixth side portion 323*c* grounded to the second support member 3231 of the second plate 320 through the second ground member 422. For example, the resonance-splitting phenomenon may represent that the frequency of the first parasitic resonance formed by the first surface current J1 formed on the surface of the second housing 320 shifts to a specific frequency band due to the effect of the second parasitic resonance 521 formed by the second surface current J2 induced to the sixth side portion 323*c* grounded to the second support member 3231.

Figure 20A:
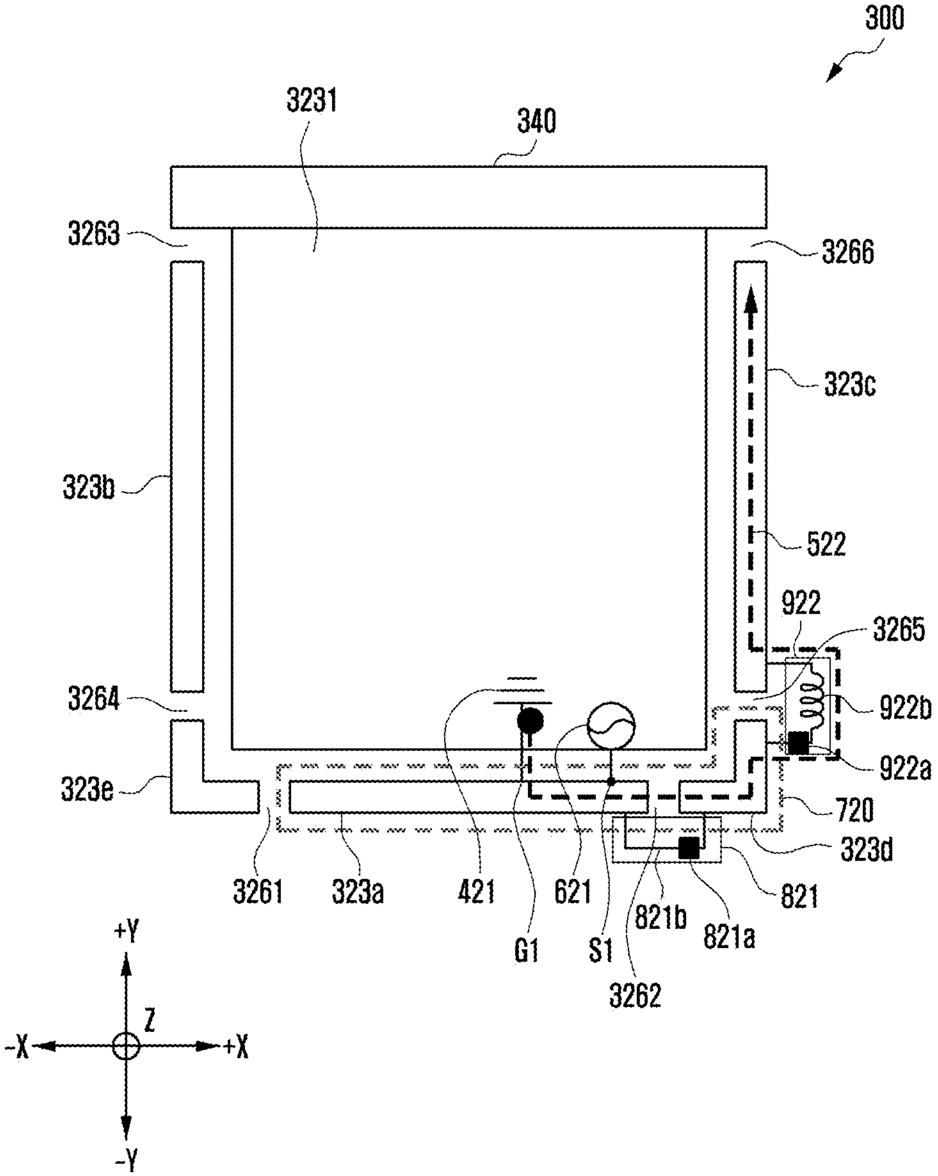
FIG. 20A is a conceptual diagram illustrating one surface of the electronic device, according to various embodiments.

In the electronic device 300, a portion in which the surface current is not displayed may be the ground. For example, the ground may be the ground included in a support member (e.g., first support member 3131 or second support member 3231), the ground included in a PCB (e.g., first plate assembly 361 or second plate assembly 362), or the ground included in a display (e.g., first display 330 or second display 400). FIG. 20A is a conceptual diagram illustrating a top view of the electronic device 300, according to various embodiments.

With reference to FIG. 20A, in the second housing 320 of the electronic device 300, the fourth side portion 323*a* may be grounded to the second support member 3231 through the first ground member 421. For example, the first ground member 421 may electrically connect the fourth side surface 323*a* and the second support member 3231. For example, the first ground member 421 may electrically connect the fourth side portion 323*a* and the second support member 3231 through the PCB (e.g., second plate assembly 362).

The electronic device 300 may include the wireless communication module 192. The fourth side portion 323*a* may be electrically connected to the wireless communication module 192. In an embodiment, the fourth side portion 323*a* may be electrically connected to the third corner portion 323*d* through the first connecting portion 821 that includes the first switch 821*a* and the first conductive line 821*b*. One end of the first connecting portion 821 may be electrically connected to the fourth side portion 323a. The other end of the first connecting portion 821 may be electrically connected to the third corner portion 323d. For example, the first connecting portion 821 may be a logical connection as a connection line for connecting the fourth side portion 323a and the third corner portion 323d. As another example, the first switch 821a and the first conductive line 821b may be formed in the PCB (e.g., second plate assembly 362). As yet another example, the fourth side portion 323a and the third corner portion 323d may operate as the radiator 720. For example, the fourth side portion 323a may operate as the radiator 720 along with the third corner portion 323d through the first switch 821a. As another example, the fourth side portion 323a may operate alone as the radiator 720 through the first switch 821a.

According to an embodiment, the sixth side portion 323c may be electrically connected to the third corner portion 323d through a second matching circuit unit 922. For example, the second matching circuit unit 922 may include a third switch 922a and at least one second inductor 922b. The second matching circuit unit 922 may electrically connect the sixth side portion 323c and the third corner portion 323d. For example, the second matching circuit unit 922 may electrically connect the sixth side portion 323c and the third corner portion 323d through the PCB (e.g., second plate assembly 362). As another example, one end of the second matching circuit unit 922 may be electrically connected to the sixth side portion 323c. The other end of the second matching circuit unit 922 may be electrically connected to the third corner portion 323d. The second parasitic resonance 522 may be formed from the first ground member 421 connected to the fourth side portion 323a to the third corner portion 323d, the second matching circuit unit 922, and the sixth side portion 323c.

In an embodiment, the second matching circuit unit 922 may be a tunable matching circuit unit that includes a plurality of inductors having various inductance values. For example, the number of second inductors 922b included in the second matching circuit unit 922 may be plural. For example, the plurality of second inductors 922b may be connected in parallel to the third switch 922a. The third switch 922a may be selectively connected to one inductor among the plurality of second inductors 922b.

For example, an inductance value of the second matching circuit unit 922 may be determined based on a frequency of a transmission signal of the electronic device 300. For example, the inductance value of the second matching circuit unit 922 may have a size sufficient to operate close to open at the frequency of the transmission signal of the electronic device 300. For example, the inductance value of the second matching circuit unit 922 may be set to exceed a predetermined threshold so that the sixth side portion 323c does not electromagnetically couple with the radiator 720. That is, the electronic device 300 may control the frequency of the second parasitic resonance 521 while minimizing the effect on the radiator 720 through the second matching circuit unit 922. For example, the inductance value of second matching circuit unit 922 may have various values, such as, but not limited to, about 39 nH, about 56 nH, or about 100 nH.

Figure 20B:
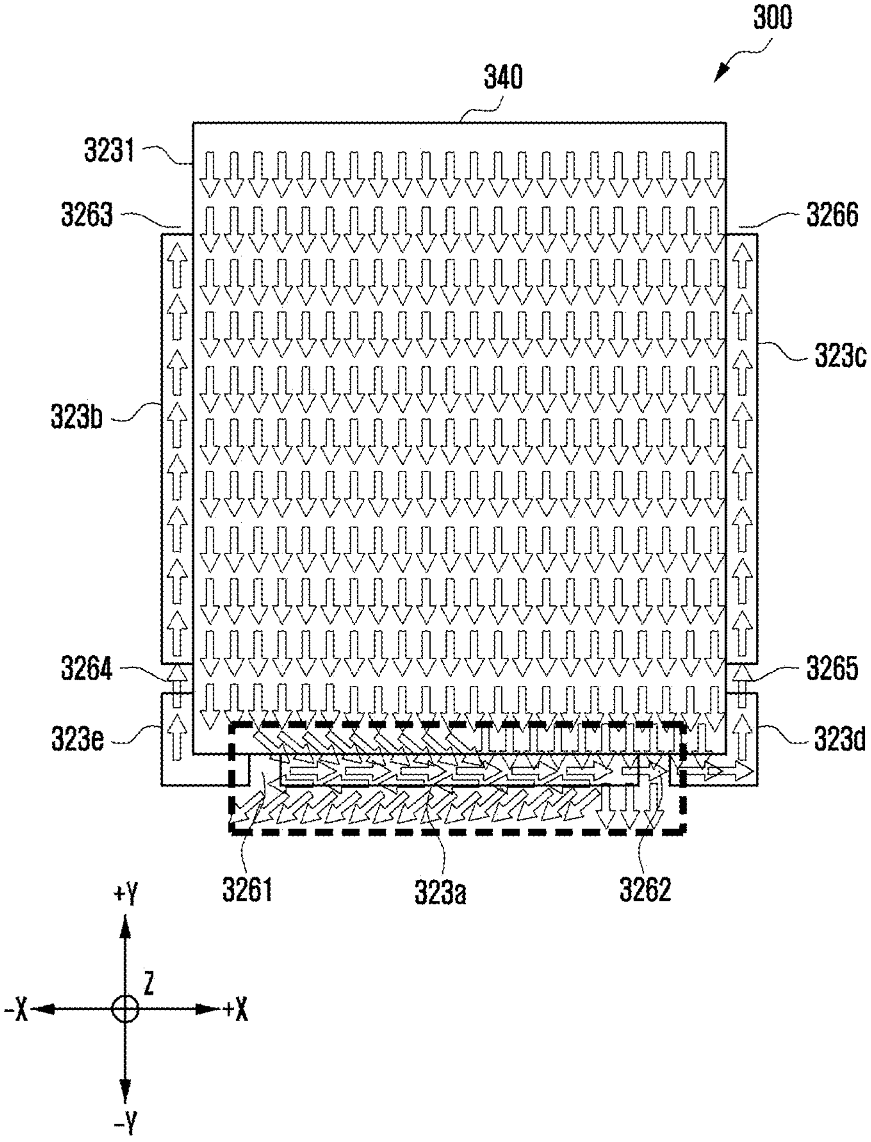
FIG. 20B is a conceptual diagram illustrating the distribution of the surface current on one surface of the electronic device, according to various embodiments.

FIG. 20B is a conceptual diagram illustrating the distribution of the surface current on one surface of the electronic device 300, according to various embodiments.

With reference to FIG. 20B, in the electronic device 300 in the folded state, the current distribution formed on the surface of the second housing 320 may be formed from the hinge structure 340 toward the fourth side portion 323a. For example, in the electronic device 300, the current distribution formed on the surface of the second housing 320 may be formed from the hinge structure 340 toward a ground point of the fourth side portion 323a. As another example, in the electronic device 300, the current distribution formed on the surface of the second housing 320 may be formed from the hinge structure 340 toward the ground point at which the fourth side portion 323a and the first ground member 421 are connected.

In the electronic device 300, the electric field distribution of the fourth side portion 323a and a portion (a) of the second housing 320 adjacent to the fourth side portion 323a may include and/or may be similar in many respects to the electric field distribution described with reference to FIG. 20C.

Figure 20C:
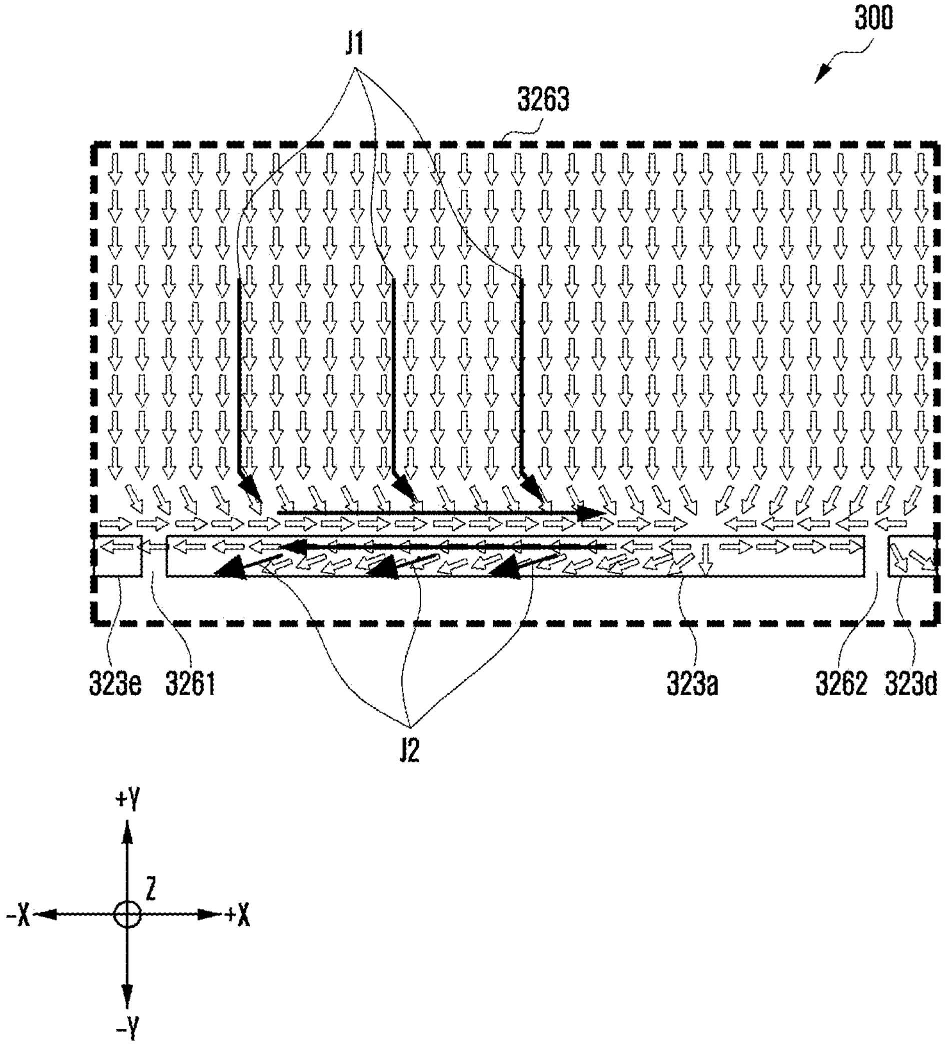
FIG. 20C is a conceptual diagram illustrating the distribution of the surface current on one surface of the electronic device, according to various embodiments.

FIG. 20C is a conceptual diagram illustrating the distribution of the surface current on one surface of the electronic device 300, according to various embodiments.

With reference to FIG. 20C, in the electronic device 300, the first surface current J1 formed on the surface of the second housing 320 may be formed in the −Y-axis direction based on the X-Y plane and may be formed in the +X-axis direction and the −X-axis direction toward the ground point in a portion adjacent to the ground point. In the electronic device 300, the second surface current J2 induced to the fourth side portion 323a grounded to the second support member 3231 of the second housing 320 through the first ground member 421 may be formed in the −X-axis direction and the +X-axis direction that are opposite to the direction of the first surface current J1 formed in the +X-axis direction and the −X-axis direction on the surface of the second housing 320 adjacent to the fourth side portion 323a.

Figure 20D:
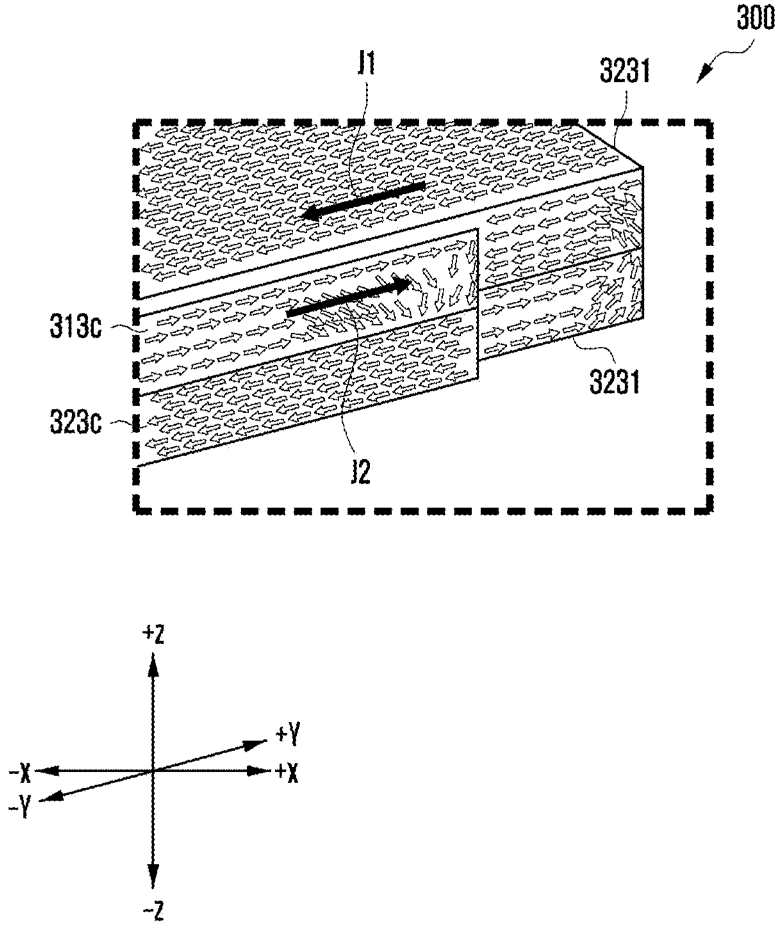
FIG. 20D is a conceptual diagram illustrating the distribution of the surface current on one side surface of the electronic device, according to various embodiments.

FIG. 20D is a conceptual diagram illustrating the distribution of the surface current on one side surface of the electronic device 300, according to various embodiments.

With reference to FIG. 20D, in the electronic device 300, the first surface current J1 formed on the surface of the second housing 320 may be formed in the −Y-axis direction based on the X-Y plane. In the electronic device 300, the second surface current J2 induced to the sixth side portion 323c electrically connected to the third corner portion 323d through the second matching circuit unit 922 may be formed in the +Y-axis direction that is opposite to the direction of the first surface current J1 formed on the surface of the second housing 320 based on the X-Y plane.

In the electronic device 300, since the second surface current J2 induced to the sixth side portion 323c grounded to the second support member 3231 of the second housing 320 through the second matching circuit unit 922 is formed in the direction opposite to the direction of the first surface current J1 formed on the surface of the second housing 320 based on the X-Y plane, the same or similar resonance-splitting phenomenon as or to the resonance-splitting phenomenon described through FIGS. 19A to 19D may occur between the first parasitic resonance by the first surface current J1 formed on the surface of the second housing 320 in the electronic device 300 and the second parasitic resonance 521 by the second surface current J2 induced to the sixth side portion 323c grounded to the second support member 3231 of the second housing 320 through the second matching circuit unit 922.

Figure 21:
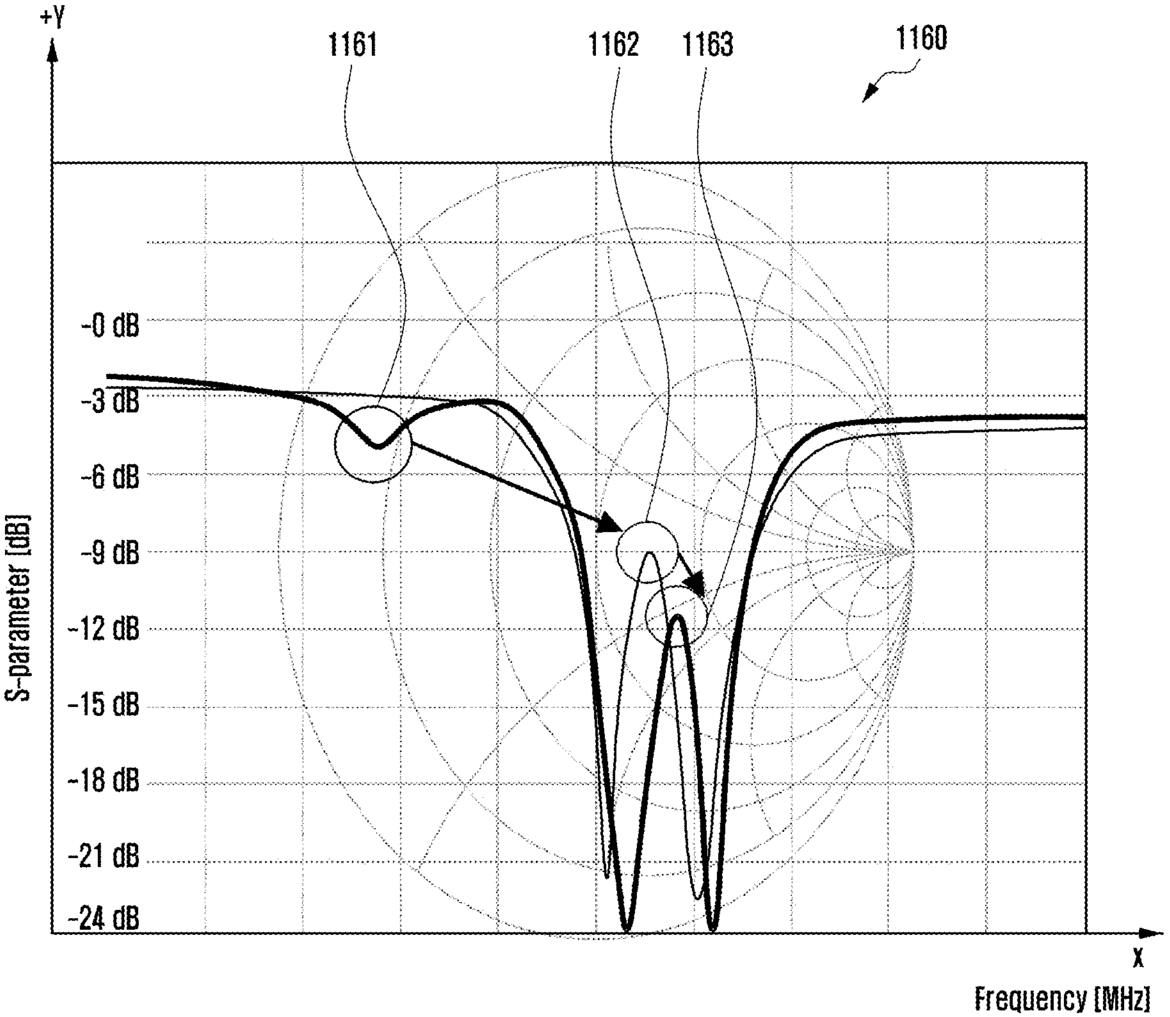
FIG. 21 is a graph showing that a frequency band of the first parasitic resonance shifts due to the second parasitic resonance formed in the electronic device, according to various embodiments.

FIG. 21 is a graph 1160 showing that a frequency band of the first parasitic resonance shifts due to the second parasitic resonance formed in the electronic device 300 in the folded state, according to various embodiments.

With reference to FIG. 21, in the electronic device 300, second parasitic resonance 1161 by the second surface current J2 induced to the sixth side portion 323*c* grounded to the second support member 3231 of the second housing 320 through the second matching circuit unit 922 may shift a frequency band of first parasitic resonance caused by the first surface current J1 induced on the surface of the electronic device 300 in the folded state from a first frequency band 1162 to a second frequency band 1163.

Figure 22:
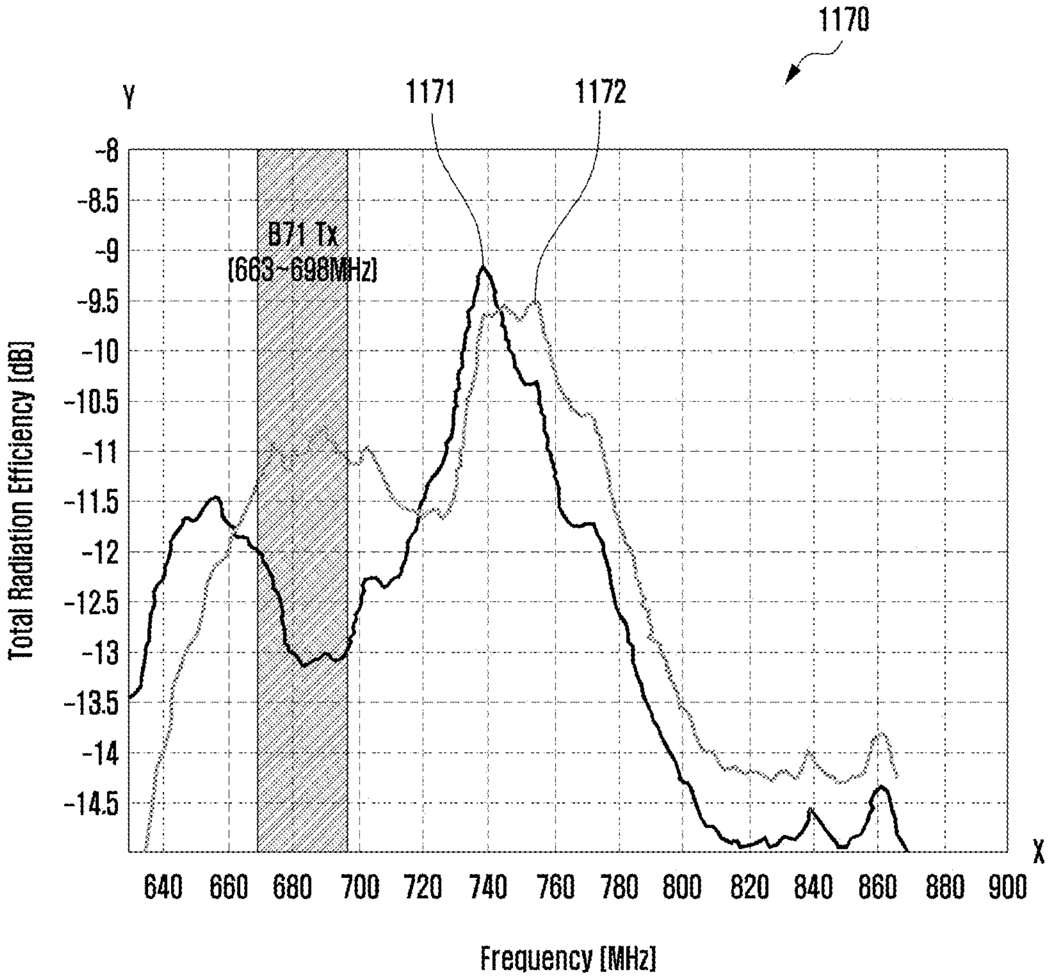
FIG. 22 is a graph showing efficiency of radiation performance according to a resonance-splitting phenomenon by the second parasitic resonance formed in the electronic device, according to various embodiments.

FIG. 22 is a graph 1170 showing efficiency of radiation performance according to a resonance-splitting phenomenon by the second parasitic resonance in the electronic device 300 in the folded state, according to various embodiments.

With reference to FIG. 22, in the electronic device 300 in the folded state, a first radiation graph 1171 by the first parasitic resonance may be changed to a second radiation graph 1172 due to the resonance-splitting phenomenon by the second parasitic resonance. For example, the electronic device 300 in the folded state may improve radiation performance of an antenna including a radiator by shifting the first parasitic resonance through the resonance-splitting phenomenon, according to the second parasitic resonance.

Figure 23:
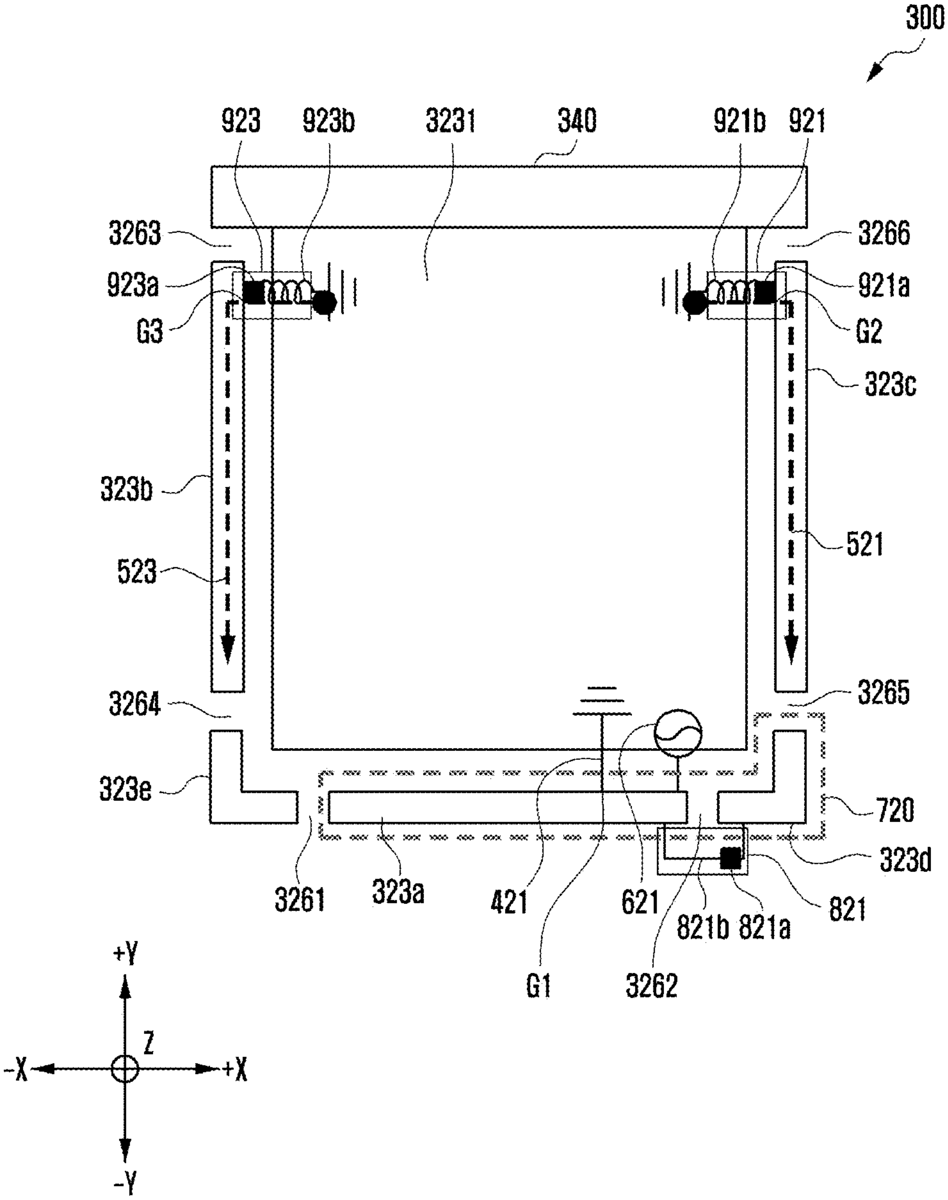
FIG. 23 is a conceptual diagram illustrating one surface of the electronic device, according to various embodiments.

FIG. 23 is a conceptual diagram illustrating the top surface of the electronic device 300, according to various embodiments.

With reference to FIG. 23, in the electronic device 300, the fourth side portion 323*a* may be grounded to the second support member 3231 through the first ground member 421. For example, the first ground member 421 may electrically connect the fourth side portion 323*a* and the second support member 3231. For example, the first ground member 421 may electrically connect the fourth side portion 323*a* and the second support member 3231 through the PCB (e.g., second plate assembly 362).

The electronic device 300 may include a wireless communication circuit (e.g., wireless communication module 192 of FIG. 1). The fourth side portion 323*a* may be electrically connected to the wireless communication circuit through a first feed 621. The fourth side portion 323*a* and the third corner portion 323*d* may operate as the radiator 720.

In an embodiment, the sixth side portion 323*c* may be grounded to the second support member 3231 through the first matching circuit unit 921. For example, the first matching circuit unit 921 may include the second switch 921*a* and at least one first inductor 921*b*. For example, the first matching circuit unit 921 may electrically connect the sixth side portion 323*c* and the second support member 3231. For example, the first matching circuit unit 921 may electrically connect the sixth side portion 323*c* and the second support member 3231 through the PCB (e.g., second plate assembly 362). For example, one end of the first matching circuit unit 921 may be electrically connected to the sixth side portion 323*c*. The other end of the first matching circuit unit 921 may be electrically connected to the second support member 3231. The second parasitic resonance 521 may be formed in the first matching circuit unit 921 and the sixth side portion 323*c*. In an embodiment, the fifth side surface 323*b* may be grounded to the second support member 3231 through a third matching circuit unit 923. For example, the third matching circuit unit 923 may include a fourth switch 923*a* and at least one third inductor 923*b*. For example, the third matching circuit unit 923 may electrically connect the fifth side portion 323*b* and the second support member 3231. One end of the third matching circuit unit 923 may be electrically connected to the fifth side surface 323*b*. For example, the third matching circuit unit 923 may be electrically connected to the fifth side portion 323*b* and the second support member 3231 through the PCB (e.g., second plate assembly 362). For example, one end of the third matching circuit unit 923 may be electrically connected to the fifth side portion 323*b*. The other end of the third matching circuit unit 923 may be electrically connected to the second support member 3231. Third parasitic resonance 523 may be formed in the third matching circuit unit 923 and the fifth side portion 323*b*. For example, the third matching circuit unit 923 may be provided to be substantially symmetrical to the first matching circuit unit 921 based on the Y-axis.

Figure 24:
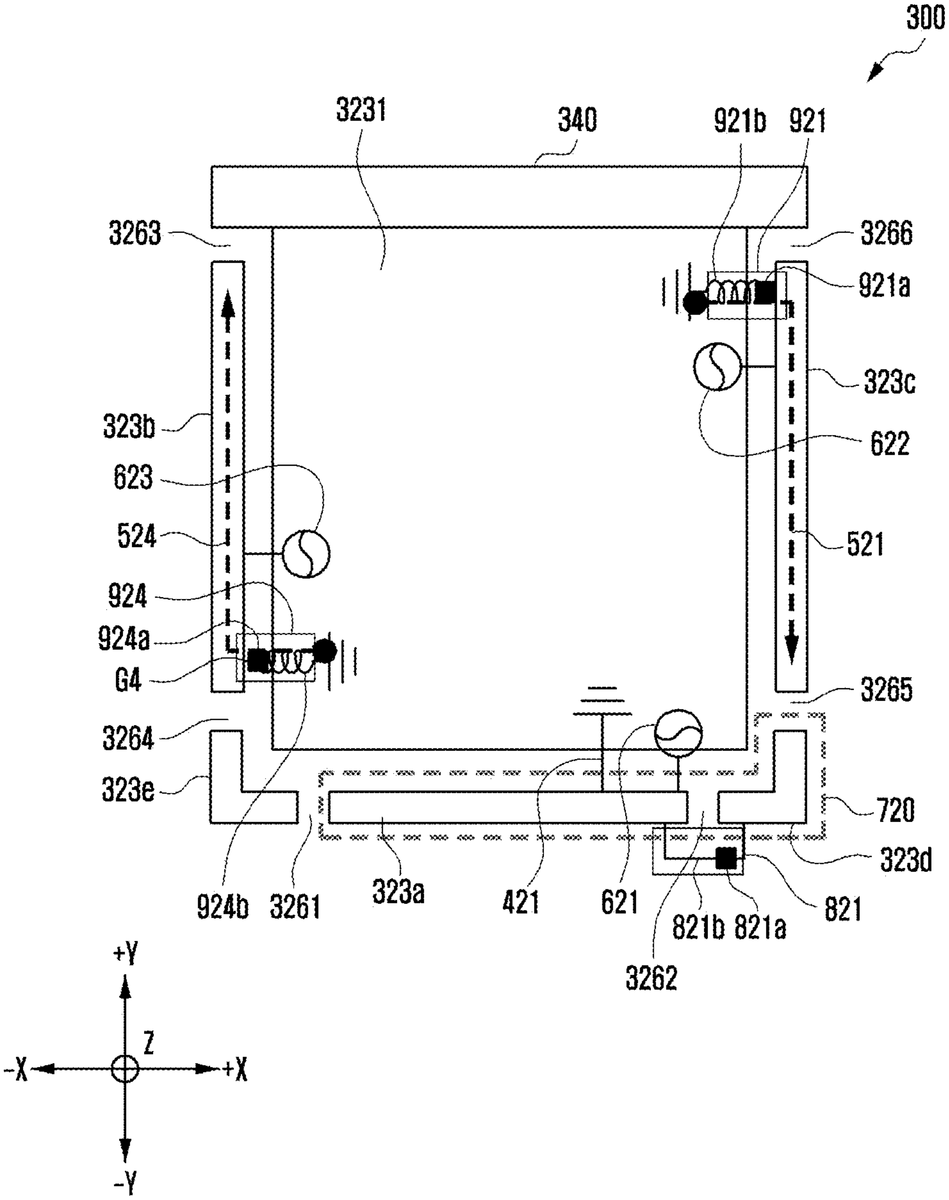
FIG. 24 is a conceptual diagram illustrating one surface of the electronic device, according to various embodiments.

FIG. 24 is a conceptual diagram illustrating one surface of the electronic device 300, according to various embodiments.

With reference to FIG. 24, in the electronic device 300, the fourth side portion 323*a* may be grounded to the second support member 3231 through the first ground member 421. For example, the first ground member 421 may electrically connect the fourth side portion 323*a* and the second support member 3231. As another example, the first ground member 421 may electrically connect the fourth side portion 323*a* and the second support member 3231 through the PCB (e.g., second plate assembly 362).

The electronic device 300 may include the wireless communication circuit (e.g., wireless communication module 192 of FIG. 1). The fourth side portion 323*a* may be electrically connected to the wireless communication circuit through the first feed 621. The fourth side portion 323*a* may be electrically connected to the first corner portion 313*d* through the first connecting portion 821 that includes the first switch 821*a* and the first conductive line 821*b*. For example, one end of the first connecting portion 821 may be electrically connected to the fourth side surface 323*a*. The other end of the first connecting portion 821 may be electrically connected to the third corner portion 323*d*. As another example, the first connecting portion 821 may be a logical connection as a connection line for connecting the fourth side portion 323*a* and the third corner portion 323*d*. For example, the first switch 821*a* and the first conductive line 821*b* may be formed in the PCB (e.g., second plate assembly 362). The fourth side portion 323*a* and the third corner portion 323*d* may operate as a radiator 720.

In an embodiment, the sixth side portion 323*c* may be grounded to the second support member 3231 through the first matching circuit unit 921. For example, the first matching circuit unit 921 may include the second switch 921*a* and at least one first inductor 921*b*. As another example, the first matching circuit unit 921 may electrically connect the sixth side portion 323*c* and the second support member 3231. One end of the first matching circuit unit 921 may be electrically connected to the sixth side portion 323*c*. The other end of the first matching circuit unit 921 may be electrically connected to the second support member 3231. The second parasitic resonance 521 may be formed in the first matching circuit unit 921 and the sixth side portion 323*c*. In an embodiment, the fifth side portion 323*b* may be grounded to the second support member 3231 through a fourth matching circuit unit 924. For example, the fourth matching circuit unit 924 may include a fifth switch 924*a* and at least one fourth inductor 924*b*. As another example, the fourth matching circuit unit 924 may electrically connect the fifth side portion 323*b* and the second support member 3231. One end of the fourth matching circuit unit 924 may be electrically connected to the fifth side surface 323*b*. The other end of the fourth matching circuit unit 924 may be electrically connected to the second support member 3231. Fourth parasitic resonance 524 may be formed in the fourth matching circuit unit 924 and the fifth side portion 323*b*. For example, the fourth matching circuit unit 924 may be provided to be substantially symmetrical to the first matching circuit unit 921 based on the X-axis and the Y-axis.

According to an embodiment, the fifth side portion 323*b* and the sixth side portion 323*c* may operate as additional radiators. For example, the electronic device 300 may further include a second feed 622 and a third feed 623. The sixth side portion 323*c* may be electrically connected to the wireless communication circuit through the second feed 622. The fifth side portion 323*b* may be electrically connected to the wireless communication circuit through the third feed 623.

Figure 25:
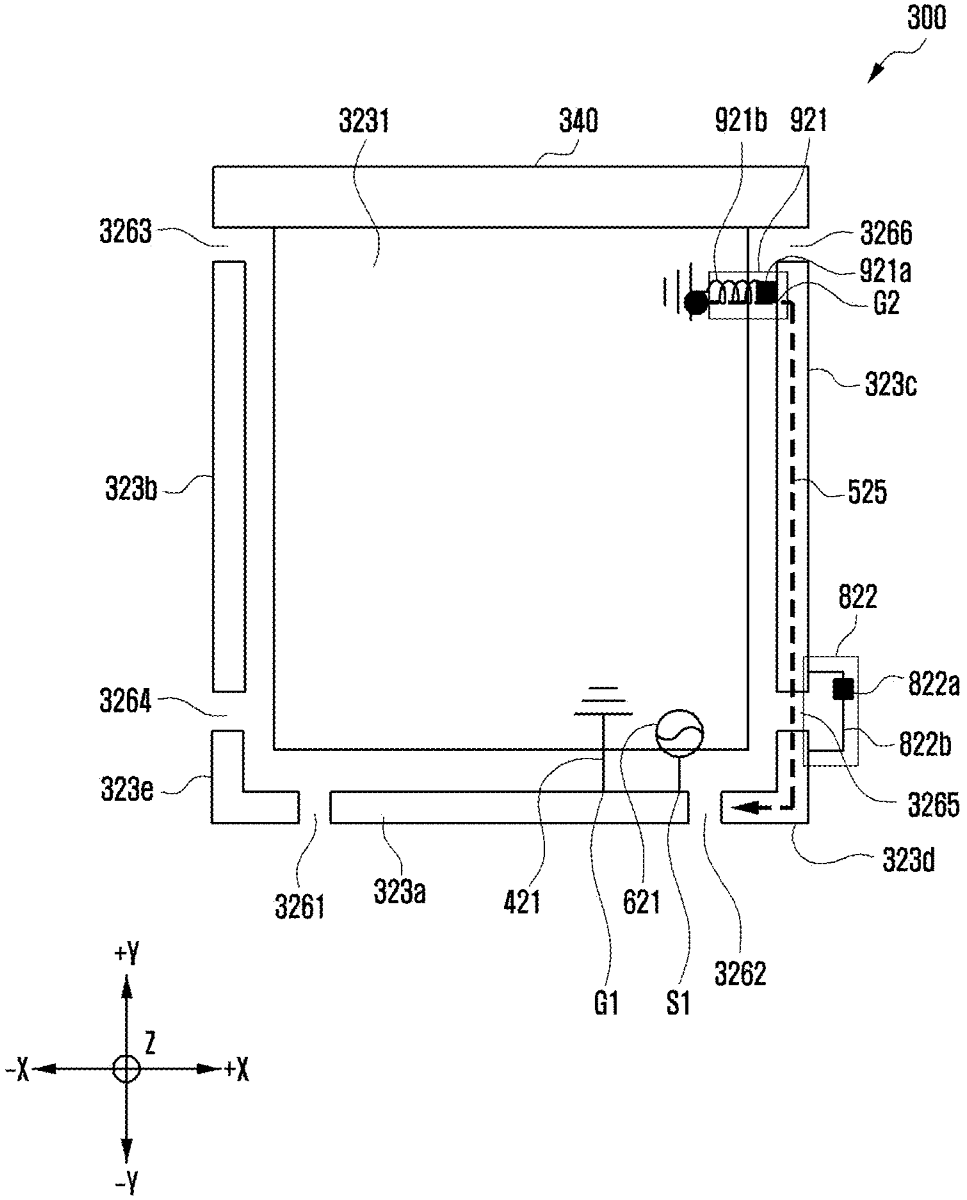
FIG. 25 is a conceptual diagram illustrating one surface of the electronic device, according to various embodiments.

FIG. 25 is a conceptual diagram illustrating one surface of the electronic device 300, according to various embodiments.

With reference to FIG. 25, in the electronic device 300, the fourth side portion 323*a* may be grounded to the second support member 3231 through the first ground member 421. For example, the first ground member 421 may electrically connect the fourth side portion 323*a* and the second support member 3231. As another example, the first ground member 421 may electrically connect the fourth side portion 323*a* and the second support member 3231 through the PCB (e.g., second plate assembly 362).

The electronic device 300 may include the wireless communication circuit (e.g., wireless communication module 192 of FIG. 1). The fourth side portion 323*a* may be electrically connected to the wireless communication circuit through the first feed 621.

In an embodiment, the sixth side portion 323*c* may be grounded to the second support member 3231 through the first matching circuit unit 921. For example, the first matching circuit unit 921 may electrically connect the sixth side portion 323*c* and the second support member 3231. One end of the first matching circuit unit 921 may be electrically connected to the sixth side portion 323*c*. One end of the first matching circuit unit 921 may be electrically connected to the sixth side portion 323*c*. The other end of the first matching circuit unit 921 may be electrically connected to the second support member 3231.

In an embodiment, the sixth side portion 323*c* may be electrically connected to the third corner portion 323*d* through a second connecting portion 822. One end of the second connecting portion 822 may be electrically connected to the sixth side portion 323*c*. The other end of the second connecting portion 822 may be electrically connected to the third corner portion 323*d*. The second connecting portion 822 may include a sixth switch 822*a* and a second conductive line 822*b*. For example, the sixth switch 822*a* may be turned on when the electronic device 300 is in the folded state and the sixth switch 822*a* may be turned off when the electronic device 300 is in the unfolded state.

Fifth parasitic resonance 525 may be formed in the first matching circuit unit 921, the sixth side portion 323*c*, the second connecting portion 822, and the third corner portion 323*d*.

Figure 26:
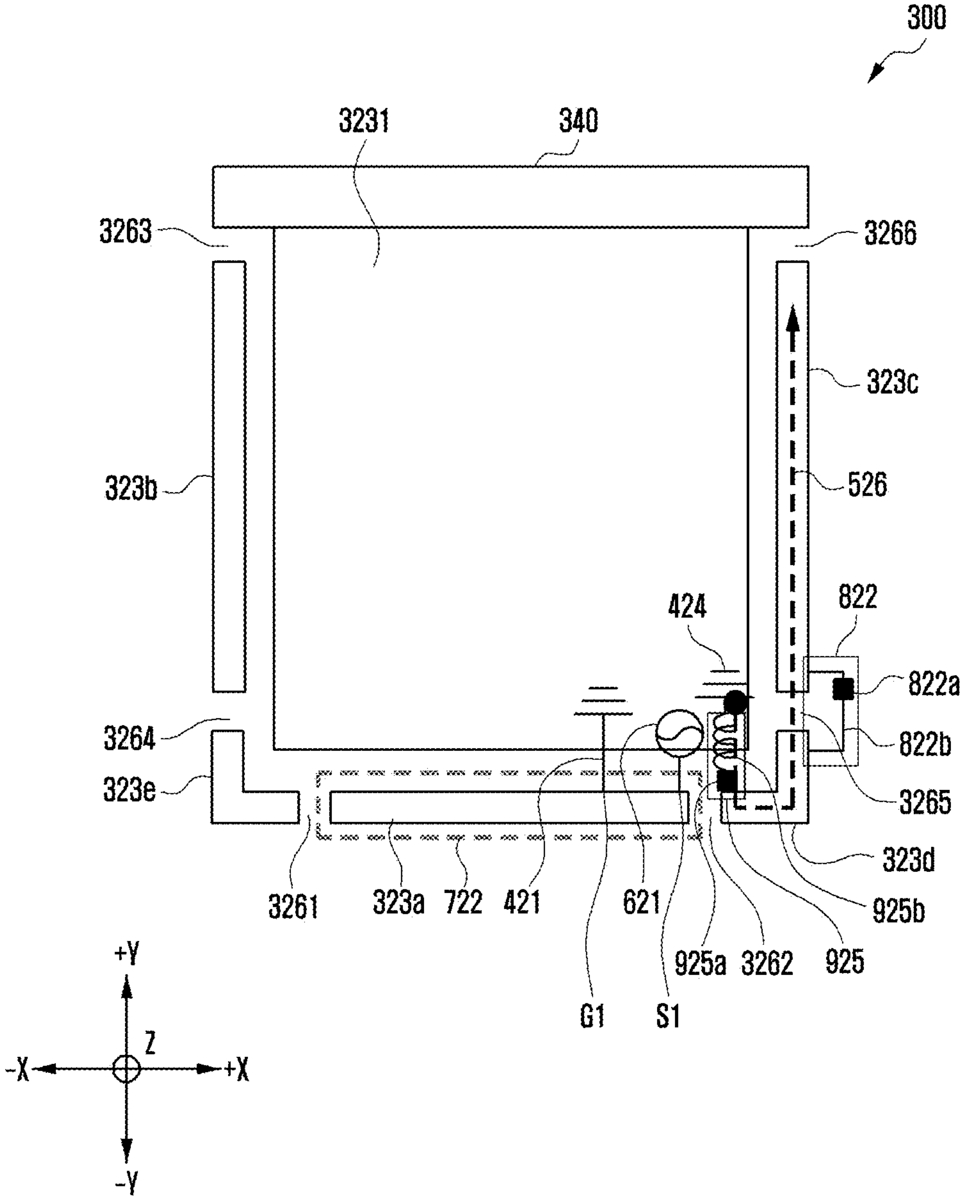
FIG. 26 is a conceptual diagram illustrating one surface of the electronic device, according to various embodiments.

FIG. 26 is a conceptual diagram illustrating one surface of the electronic device 300, according to various embodiments.

With reference to FIG. 26, in the electronic device 300, the fourth side portion 323*a* may be grounded to the second support member 3231 through the first ground member 421. For example, the first ground member 421 may electrically connect the fourth side surface 323*a* and the second support member 3231.

The electronic device 300 may include the wireless communication circuit (e.g., wireless communication module 192 of FIG. 1). The fourth side portion 323*a* may be electrically connected to the wireless communication circuit through the first feed 621. The fourth side portion 323*a* may operate as the radiator 722.

In an embodiment, the third corner portion 323*d* may be grounded to the second support member 3231 through a fifth matching circuit unit 925. For example, the fifth matching circuit unit 925 may electrically connect the first corner portion 313*d* and the second support member 3231. The fifth matching circuit unit 925 may include a seventh switch 925*a* and at least one fifth inductor 925*b*. For example, the seventh switch 925*a* may be turned on when the electronic device 300 is in the folded state and the seventh switch 925*a* may be turned off when the electronic device 300 is in the unfolded state. For example, the fifth matching circuit unit 925 may electrically connect the fourth side portion 323*a* and the second support member 3231 through the PCB (e.g., second plate assembly 362). For example, one end of the fifth matching circuit unit 925 may be electrically connected to the first corner portion 313*d*. The other end of the fifth matching circuit unit 925 may be electrically connected to the second support member 3231.

In an embodiment, the sixth side portion 323*c* may be electrically connected to the third corner portion 323*d* through the second connecting portion 822. The second connecting portion 822 may include the sixth switch 822*a* and the second conductive line 822*b*. For example, the sixth switch 822*a* may be turned on when the electronic device 300 is in the folded state and the sixth switch 822*a* may be turned off when the electronic device 300 is in the unfolded state. One end of the second connecting portion 822 may be electrically connected to the sixth side surface 323*c*. The other end of the second connecting portion 822 may be electrically connected to the third corner portion 323*d*.

Sixth parasitic resonance 526 may be formed in the fifth matching circuit unit 925, the third corner portion 323*d*, the second connecting portion 822, and the sixth side portion 323*c*. For example, a length of frequency of the fifth parasitic resonance 525 may be about λ/4.

Figure 27:
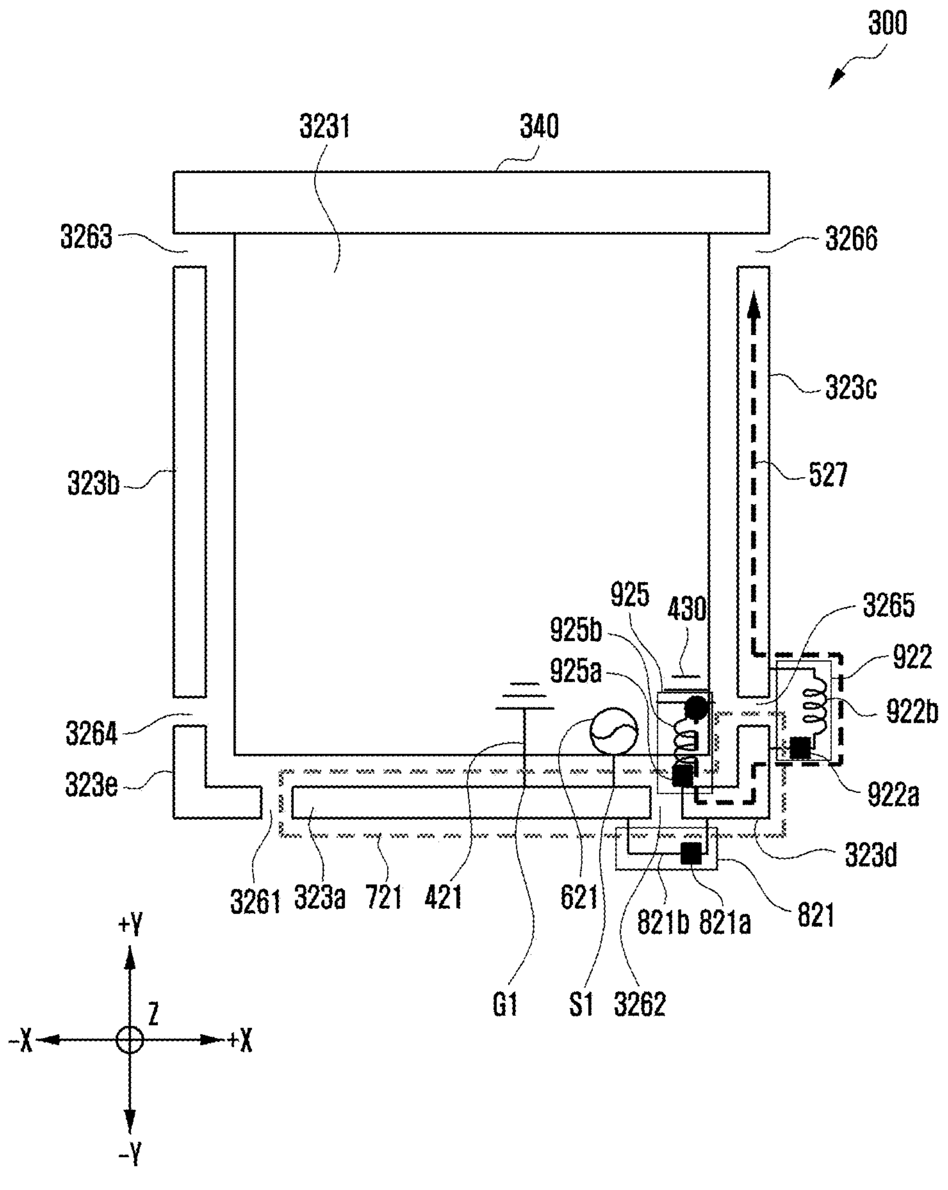
FIG. 27 is a conceptual diagram illustrating one surface of the electronic device, according to various embodiments.

FIG. 27 is a conceptual diagram illustrating one surface of the electronic device 300, according to various embodiments.

With reference to FIG. 27, in the electronic device 300, the fourth side portion 323*a* may be grounded to the second support member 3231 through the first ground member 421. For example, the first ground member 421 may electrically connect the fourth side surface 323*a* and the second support member 3231.

The electronic device 300 may include the wireless communication circuit (e.g., wireless communication module 192 of FIG. 1). The fourth side portion 323*a* may be electrically connected to the wireless communication circuit through the first feed 621. The fourth side portion 323*a* may be electrically connected to the first corner portion 313*d* through the first connecting portion 821. For example, the first connecting portion 821 may include the first switch 821*a* and the first conductive line 821*b*. The first switch 821*a* may be turned on when the electronic device 300 is in the folded state and the first switch 821*a* may be turned off when the electronic device 300 is in the unfolded state. One end of the first connecting portion 821 may be electrically connected to the fourth side portion 323*a*. The other end of the first connecting portion 821 may be electrically connected to the first corner portion 313*d*. The fourth side portion 323*a* and the first corner portion 313*d* may operate as the radiator 721.

In an embodiment, the sixth side portion 323_c_ may be electrically connected to the third corner portion 323_d_ through the second matching circuit unit 922. The second matching circuit unit 922 may include the third switch 922_a_ and at least one second inductor 922_b_. For example, the third switch 922_a_ may be turned on when the electronic device 300 is in the folded state and the third switch 922_a_ may be turned off when the electronic device 300 is in the unfolded state. One end of the second matching circuit unit 922 may be electrically connected to the sixth side portion 323_c_. The other end of the second matching circuit unit 922 may be electrically connected to the third corner portion 323_d_.

In an embodiment, the third corner portion 323_d_ may be electrically connected to the second support member 3231 through a fifth matching circuit unit 925. For example, the fifth matching circuit unit 925 may include the seventh switch 925_a_ and at least one fifth inductor 925_b_. The third corner portion 323_d_ may be grounded to the second support member 3231 through the fifth matching circuit unit 925. One end of the fifth matching circuit unit 925 may be electrically connected to the third corner portion 323_d_. The other end of the fifth matching circuit unit 925 may be electrically connected to the second support member 3231.

Seventh parasitic resonance 527 may be formed in the fifth matching circuit unit 925, the third corner portion 323_d_, the second matching circuit unit 922, and the sixth side portion 323_c_.

Figure 28:
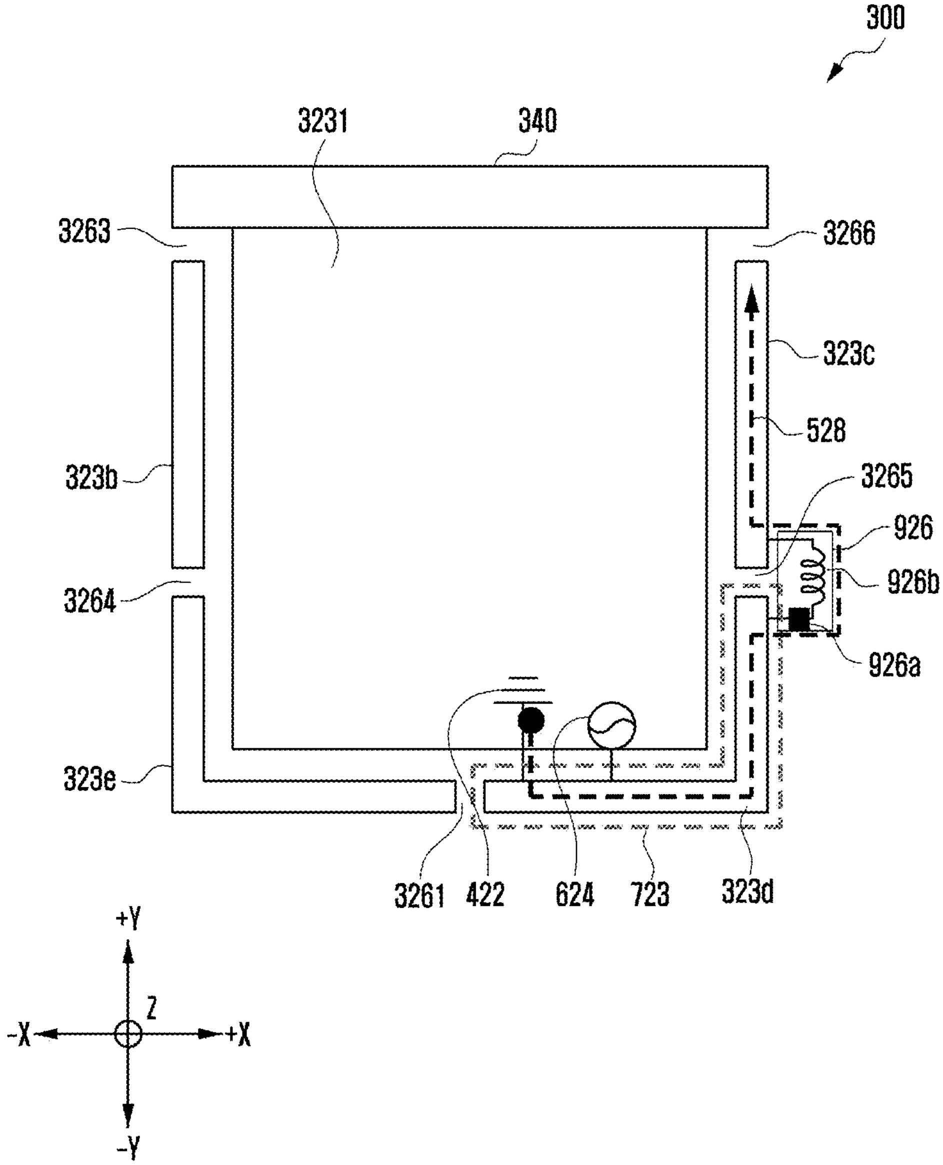
FIG. 28 is a conceptual diagram illustrating one surface of the electronic device, according to various embodiments.

FIG. 28 is a conceptual diagram illustrating one surface of the electronic device 300, according to various embodiments.

With reference to FIG. 28, the second housing 320 of the electronic device 300 may include the second support member 3231, the fifth side portion 323_b_, the sixth side portion 323_c_, the fourth corner portion 323_e_, and the third corner portion 323_d_. The fifth side portion 323_b_ and the sixth side portion 323_c_ may be provided to be substantially symmetrical with respect to each other based on the Y-axis on X-Y plane. The third corner portion 323_d_ and the fourth corner portion 323_e_ may be provided to be substantially symmetrical with respect to each other based on the Y-axis on the X-Y plane. Each of the fifth side portion 323_b_, the sixth side portion 323_c_, the fourth corner portion 323_e_, and the third corner portion 323_d_ may be formed of conductive material and/or nonconductive material.

The second housing 320 may include the first fragmentation portion 3261, the third fragmentation portion 3263, the fourth fragmentation portion 3264, the fifth fragmentation portion 3265, and the sixth fragmentation portion 3266. For example, the first fragmentation portion 3261 may be provided between the fourth corner portion 323_e_ and the third corner portion 323_d_. The fourth corner portion 323_e_ and the third corner portion 323_d_ may be electrically separated from each other through the first fragmentation portion 3261. The third fragmentation portion 3263 may be provided between the fifth side portion 323_b_ and the hinge structure 340. The fifth side portion 323_b_ and the hinge structure 340 may be electrically separated through the third fragmentation portion 3263. The fourth fragmentation portion 3264 may be provided between the fifth side portion 323_b_ and the fourth side portion 323_a_. The fifth side portion 323_b_ and the fourth side portion 323_a_ may be electrically separated through the fourth fragmentation portion 3264. The fifth fragmentation portion 3265 may be provided between the sixth side portion 323_c_ and the first corner portion 313_d_. The sixth side portion 323_c_ and the first corner portion 313_d_ may be electrically separated through the fifth fragmentation portion 3265. The sixth fragmentation portion 3266 may be provided between the sixth side portion 323_c_ and the hinge structure 340. The sixth side portion 323_c_ and the hinge structure 340 may be electrically separated through the sixth fragmentation portion 3266.

In an embodiment, in the electronic device 300, the third corner portion 323_d_ may be grounded to the second support member 3231 through the second ground member 422. For example, the second ground member 422 may electrically connect the third corner portion 323_d_ and the second support member 3231. For example, the second ground member 422 may electrically connect the third corner portion 323_d_ and the second support member 3231 through the PCB (e.g., second plate assembly 362).

The electronic device 300 may include the wireless communication circuit (e.g., wireless communication module 192 of FIG. 1). The third corner portion 323_d_ may be electrically connected to the wireless communication circuit through a fourth feeding part 624. The third corner portion 323_d_ may operate as the radiator 723.

In an embodiment, the sixth side portion 323_c_ may be electrically connected to the third corner portion 323_d_ through a sixth matching circuit unit 926. For example, the sixth matching circuit unit 926 may include a seventh switch 926_a_ and at least one sixth inductor 926_b_. As another example, the seventh switch 926_a_ may be turned on when the electronic device 300 is in the folded state and the seventh switch 926_a_ may be turned off when the electronic device 300 is in the unfolded state. One end of the sixth matching circuit unit 926 may be electrically connected to the sixth side portion 323_c_. The other end of the sixth matching circuit unit 926 may be electrically connected to the third corner portion 323_d_.

Eighth parasitic resonance 528 may be formed in the second ground member 422, the third corner portion 323_d_, the sixth matching circuit unit 926, and the sixth side portion 323_c_.

Figure 29A:
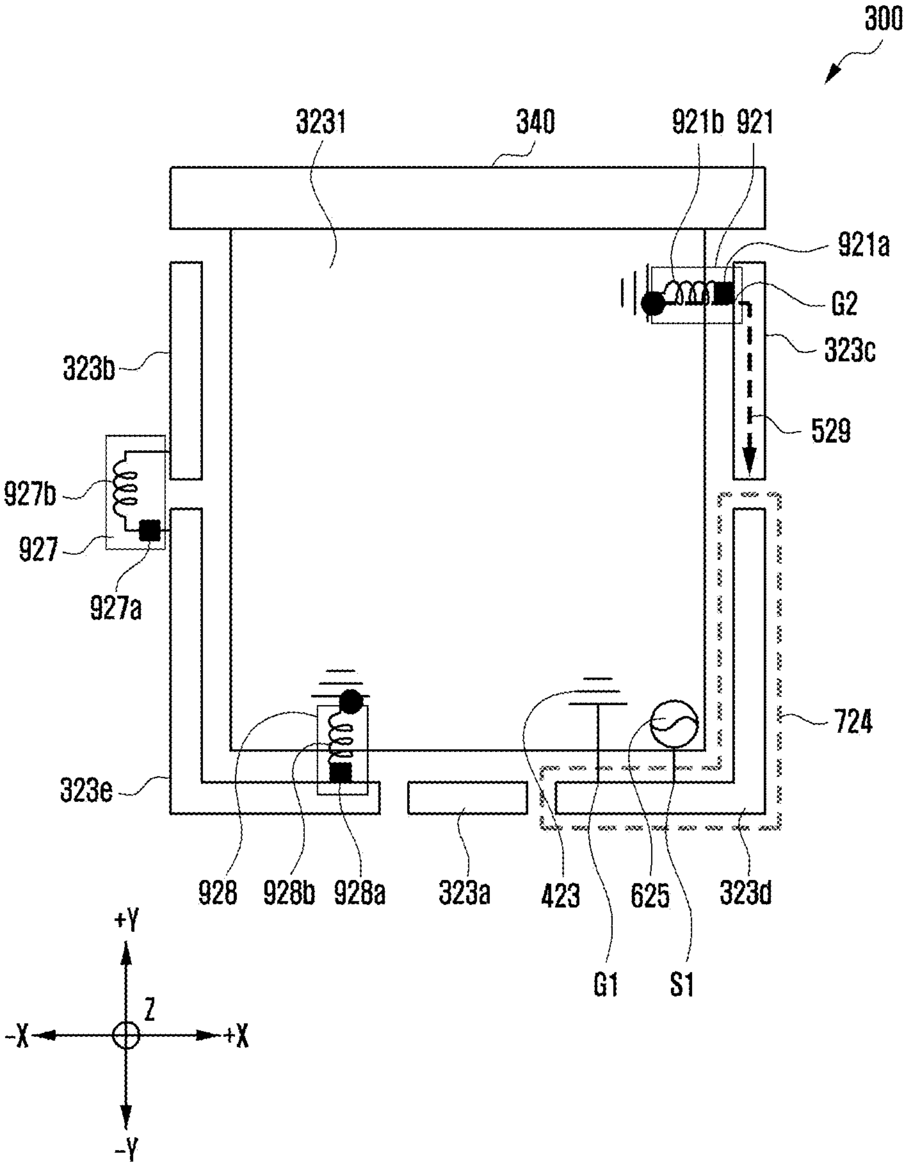
FIG. 29A is a conceptual diagram illustrating one surface of the electronic device, according to various embodiments.

FIG. 29A is a conceptual diagram illustrating one surface of the electronic device 300, according to various embodiments.

With reference to FIG. 29A, the second housing 320 may include the second support member 3231, the fourth side portion 323_a_ provided in the −Y-axis direction based on the X-Y plane, the fifth side portion 323_b_ provided in the −X-axis direction of the second housing 320, the sixth side portion 323_c_ provided in the +X-axis direction of the second housing 320, the fourth corner portion 323_e_ provided between the fourth side portion 323_a_ and the fifth side portion 323_b_, and the third corner portion 323_d_ provided between the fourth side portion 323_a_ and the sixth side portion 323_c_. Each of the fourth side portion 323_a_, the fifth side portion 323_b_, the sixth side portion 323_c_, the third corner portion 323_d_, and the fourth corner portion 323_e_ may be formed of conductive material.

In an embodiment, in the electronic device 300, the third corner portion 323_d_ may be grounded to the second support member 3231 through the third ground member 423. For example, the third ground member 423 may electrically connect the third corner portion 323_d_ and the second support member 3231. For example, the third ground member 423 may electrically connect the third corner portion 323_d_ and the second support member 3231 through the PCB (e.g., second plate assembly 362). The electronic device 300 may include the wireless communication circuit (e.g., wireless communication module 192 of FIG. 1). The third corner portion 323_d_ may be electrically connected to the wireless communication circuit through a fifth feed 625. The third corner portion 323_d_ may operate as the radiator 724.

In an embodiment, the sixth side portion 323*c* may be electrically connected to the second support member 3231 through the first matching circuit unit 921. A ninth parasitic resonance 529 may be formed in the first matching circuit unit 921 and the sixth side portion 323*c*.

In an embodiment, the fifth side portion 323*b* may be electrically connected to the fourth corner portion 323*e* through a seventh matching circuit unit 927. The seventh matching circuit unit 927 may include an eighth switch 927*a* and at least one seventh inductor 927*b*. For example, the eighth switch 927*a* may be turned on when the electronic device 300 is in the folded state and the eighth switch 927*a* may be turned off when the electronic device 300 is in the unfolded state. One end of the seventh matching circuit unit 927 may be electrically connected to the fifth side portion 323*b*. The other end of the seventh matching circuit unit 927 may be electrically connected to the fourth corner portion 323*e*.

In an embodiment, the fourth corner portion 323*e* may be grounded to the second support member 3231 through an eighth matching circuit unit 928. For example, the eighth ground member 928 may electrically connect the fourth corner portion 323*e* and the second support member 3231. For example, the eighth matching circuit unit 928 may electrically connect the fourth corner portion 323*e* and the second support member 3231 through the PCB (e.g., second plate assembly 362). The eighth matching circuit unit 928 may include a ninth switch 928*a* and at least one eighth inductor 928*b*. For example, the ninth switch 928*a* may be turned on when the electronic device 300 is in the folded state and turned off when the electronic device 300 is in the unfolded state. One end of the eighth matching circuit unit 928 may be electrically connected to the fourth corner portion 323*e*. The other end of the eighth matching circuit unit 928 may be electrically connected to the second support member 3231.

Figure 29B:
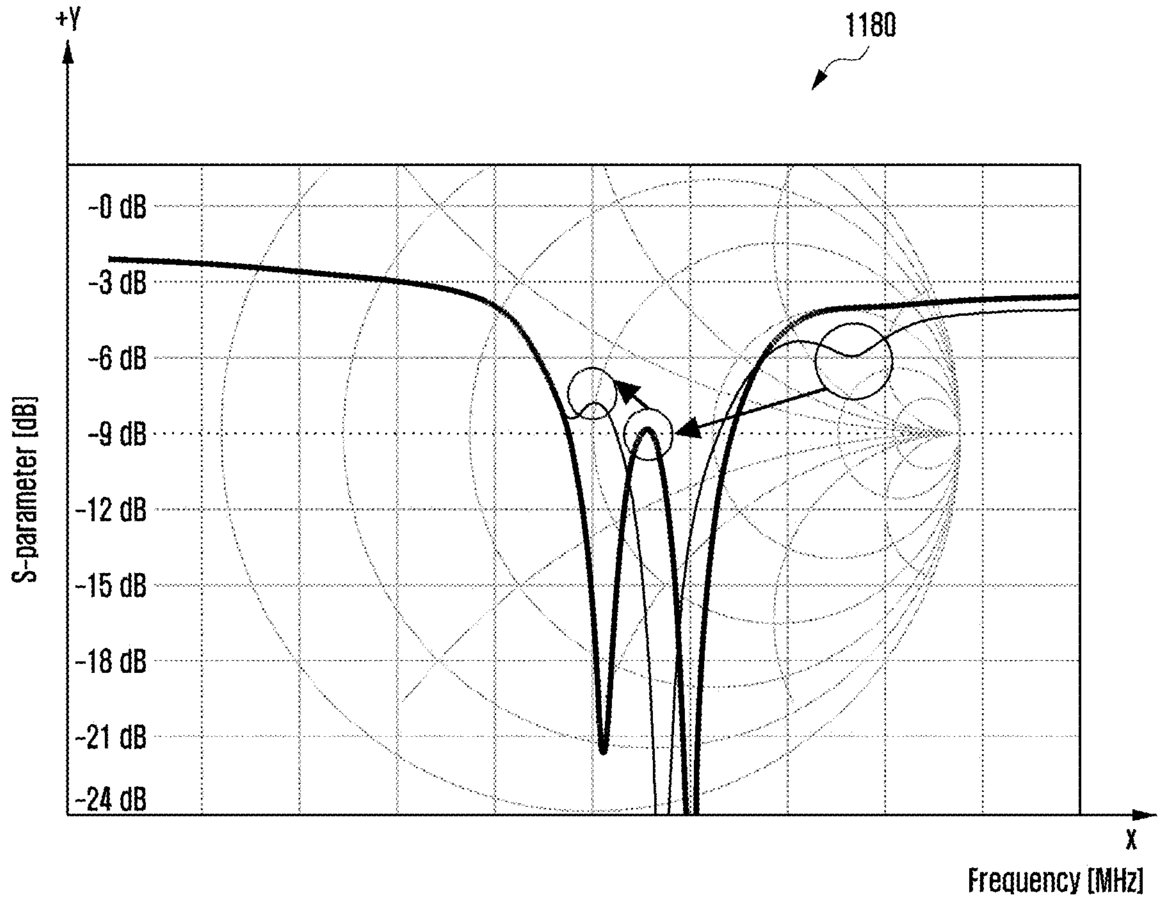
FIG. 29B is a graph showing shift of the frequency band of the first parasitic resonance according to the second parasitic resonance formed in the electronic device, according to various embodiments.

FIG. 29B is a graph 1180 showing shift of the frequency band of the first parasitic resonance according to the second parasitic resonance formed in the electronic device 300, according to various embodiments.

With reference to FIG. 29B, in a graph 1180, when a frequency of the second parasitic resonance is in a higher frequency band than a frequency of the first parasitic resonance, the second parasitic resonance may restore radiation performance of the antenna included in the radiator 700 by shifting the frequency of the first parasitic resonance to the left.

Figure 30A:
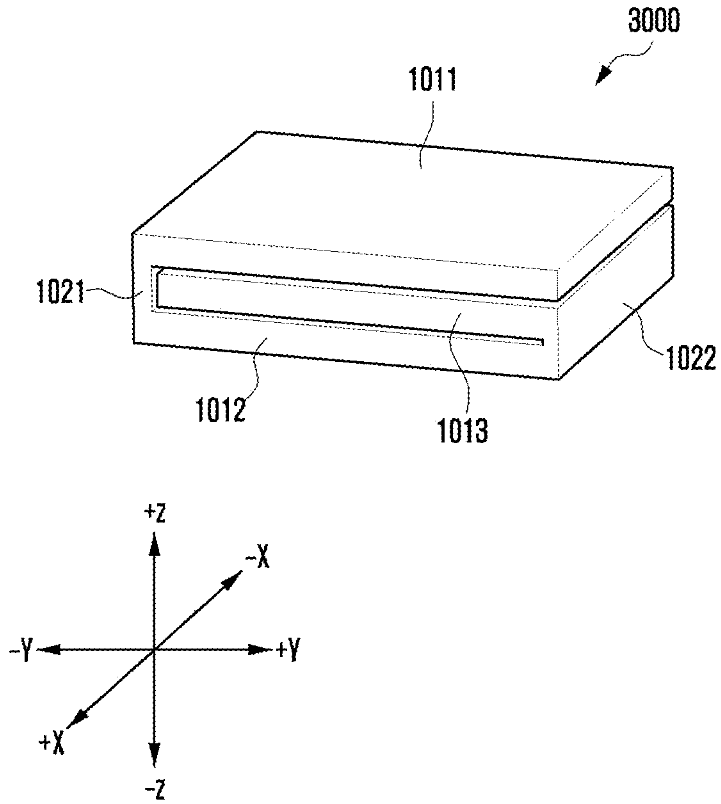
FIG. 30A is a conceptual diagram illustrating the electronic device, according to various embodiments.

FIG. 30A is a conceptual diagram illustrating an electronic device 3000, according to various embodiments.

Figure 30B:
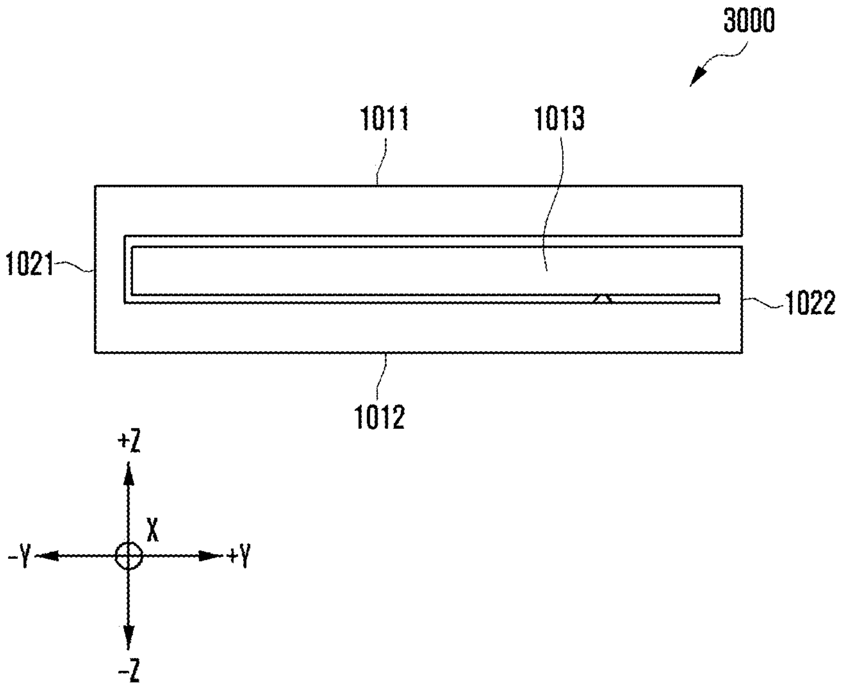
FIG. 30B is a conceptual diagram illustrating one side surface of the electronic device, according to various embodiments.

FIG. 30B is a conceptual diagram illustrating one side surface of the electronic device 3000, according to various embodiments.

With reference to FIGS. 30A and 30B, the electronic device 3000 may include and/or may be similar in many respects to the electronic device 101 of FIG. 1 and the electronic device 300 of FIGS. 2A to 29B, and may include additional features not mentioned above. For example, the electronic device 3000 may be a G-type multi-foldable terminal. For example, the electronic device 3000 may include a first housing 1011, a first hinge structure 1021 configured to couple with one side surface of the first housing 1011, a second housing 1012 configured to couple with one side surface of the first hinge structure 1021, a second hinge structure 1022 configured to couple with one side surface of the second housing 1012, and a third housing 1013 configured to couple with one side surface of the second hinge structure 1022.

For example, the second housing 1012 and the third housing 1013 may be folded so that the respective first surfaces face each other using the second hinge structure 1022 as the central axis. The first housing 1011 may be folded so that the first surface of the first housing 1011 faces the second surface of the third housing 1013 using the first hinge structure 1021 as the central axis.

Figure 30C:
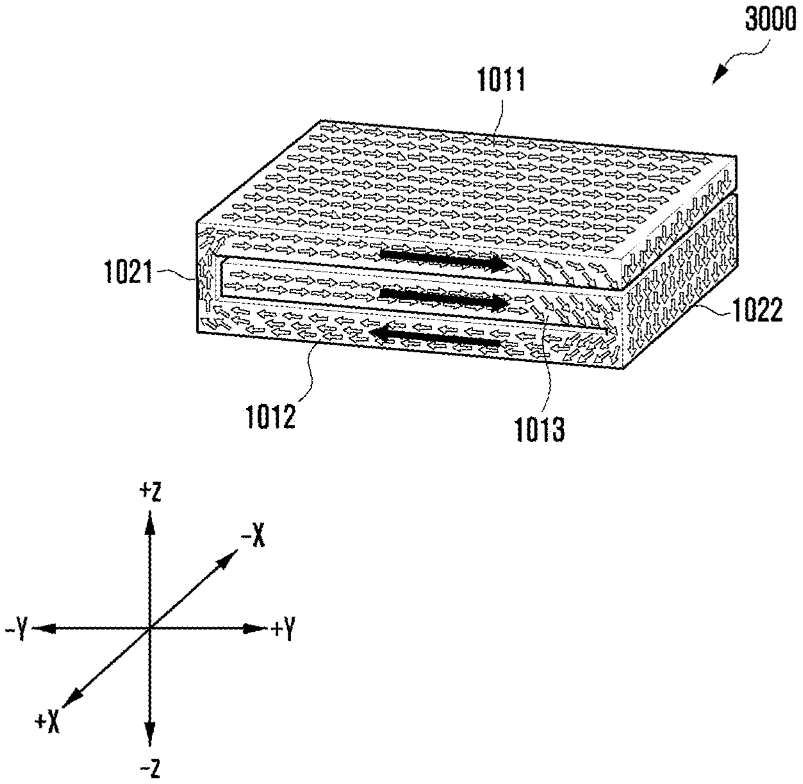
FIG. 30C is a conceptual diagram illustrating distribution of the surface current of the electronic device, according to various embodiments.

FIG. 30C is a conceptual diagram illustrating distribution of the surface current of the electronic device 3000, according to various embodiments.

With reference to FIG. 30C, when the first surface of the second housing 1012 and the first surface of the third housing 1013 are folded to face each other using the second hinge structure 1022 as the central axis and the first surface of the first housing 1011 and the second surface of the third housing 1013 are folded to face each other using the first hinge structure 1021 as the central axis, the first housing 1011, the first hinge structure 1021, the second housing 1012, the second hinge structure 1022, and the third housing 1013 may be electrically coupled.

For example, in the electronic device 3000 in the folded state, the surface current may flow from one side surface of the third housing 1013 into the second hinge structure 1022, from the second hinge structure 1022 into the one side surface of the second housing 1012, from one side surface of the second housing 1012 into the first hinge structure 1021, and from the first hinge structure 1021 into one side surface of the first housing 1011.

The electronic device 3000 may be and/or may include a foldable terminal having conductive side surfaces or metal frames (e.g., first side surface 313*a*, second side surface 313*b*, third side surface 313*c*, first corner 313*d*, second corner 313*e*, fourth side surface 323*a*, fifth side surface 323*b*, sixth side surface 323*c*, third corner 323*d*, and fourth corner 323*e*). For example, each of the first housing 1011, the second housing 1012, and the third housing 1013 may include conductive side surfaces. At least one of the conductive side surfaces may be grounded to at least one support member of the first housing 1011, the second housing 1012, or the third housing 1013. When the electronic device 3000 is in the folded state, the surface current may be electromagnetically induced on at least one of the conductive side surfaces as a portion of at least one of the first housing 1011, the second housing 1012, and the third housing 1013. A direction of the surface current induced on at least one conductive side surface may be the same as a direction of the surface current induced to the first housing 1011 or a direction of the surface current induced to at least one of the second housing 1012 and the third housing 1013. The surface current induced on the surface of the electronic device 3000 in the folded state may cause the first parasitic resonance. The first parasitic resonance may be referred to as PPW resonance.

In the electronic device 3000 in the folded state, when at least one of the conductive side surfaces is grounded to at least one support member of the first housing 1011, the second housing 1012, or the third housing 1013, the direction of the surface current (e.g., first surface current J1) induced on the surface of the electronic device 3000 and the direction of the surface current (e.g., second surface current J2) induced on the grounded at least one conductive side surface may be opposite to each other. The second surface current J2 induced on the grounded at least one conductive side surface may cause the second parasitic resonance. The second parasitic resonance may shift the frequency band of the first parasitic resonance. For example, the second parasitic resonance may cause the resonance-splitting phenomenon with respect to the first parasitic resonance.

Figure 30D:
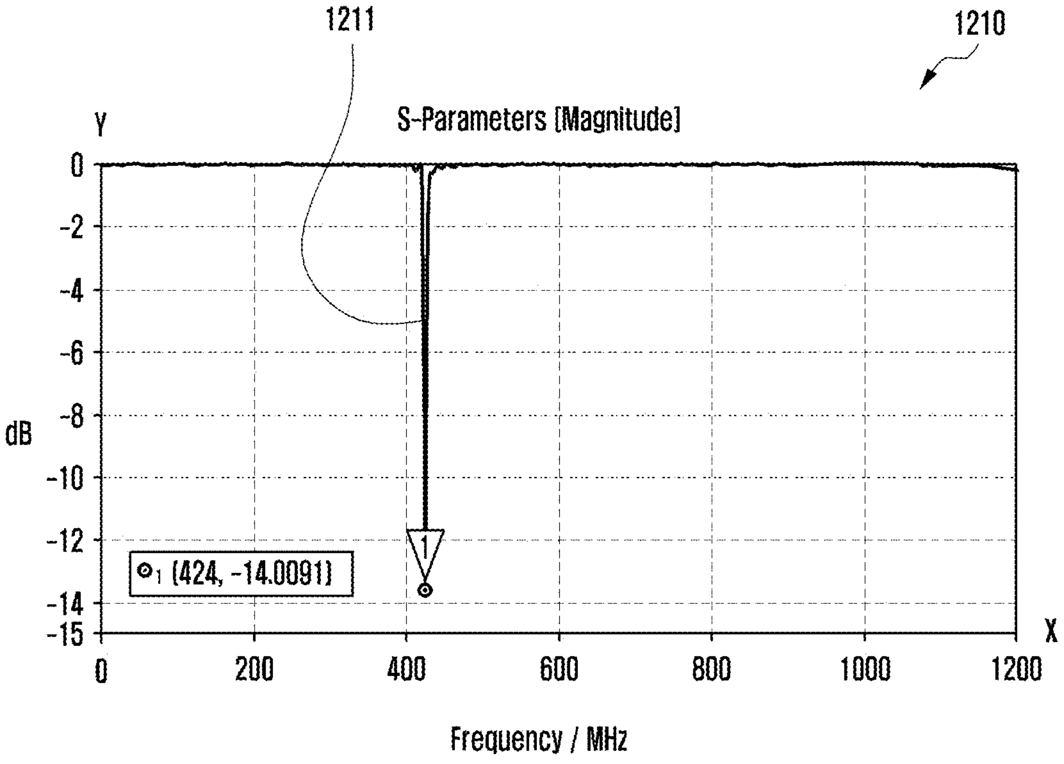
FIG. 30D is a graph showing a frequency of parasitic resonance formed in the electronic device in a folded state, according to various embodiments.

FIG. 30D is a graph 1210 showing a first frequency 1211 of the first parasitic resonance formed by the surface current induced on the surface of the electronic device 3000 in the folded state, according to various embodiments.

With reference to FIG. 30D, the X-axis may represent a frequency band (MHz) and the Y-axis may represent a reflection coefficient (dB) of a mode of electric field formed in the electronic device 3000 in the folded state. A first graph 1211 may represent a frequency of the first parasitic resonance formed by the surface current induced on the surface of the electronic device 3000 in the folded state. In the electronic device 3000 in the folded state, according to the present disclosure, when at least one of the conductive side surfaces is grounded to at least one support member of the first housing 1011, the second housing 1012, or the third housing 1013, the frequency band of the first parasitic resonance may shift according to the resonance-splitting phenomenon. For example, the first graph 1211 may shift to a frequency band that does not overlap a frequency band of a transmission signal from a radiator of the electronic device 3000. Therefore, communication performance and efficiency of the electronic device 3000 may be improved.

Figure 31A:
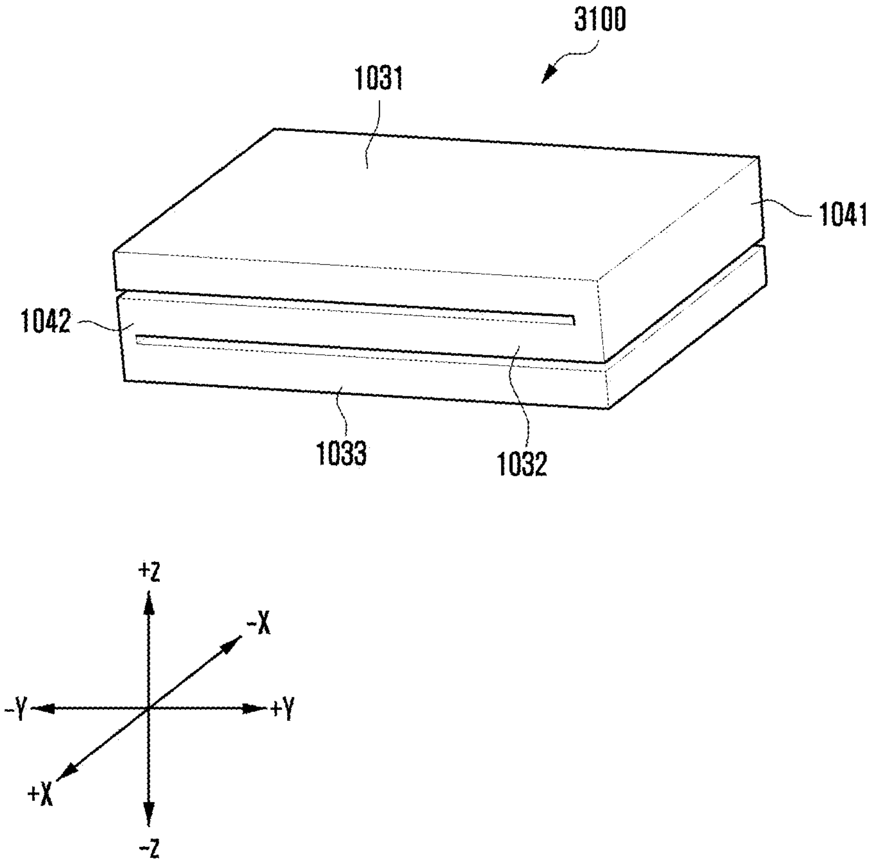
FIG. 31A is a conceptual diagram illustrating the electronic device, according to various embodiments.

FIG. 31A is a conceptual diagram illustrating the electronic device 3100, according to various embodiments.

Figure 31B:
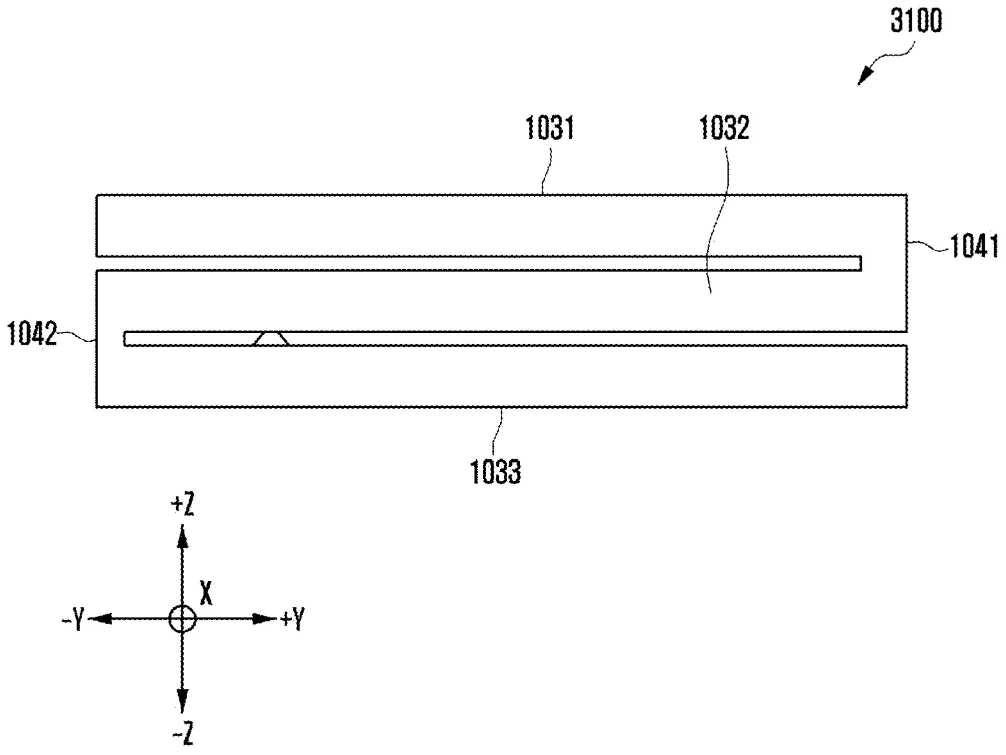
FIG. 31B is a conceptual diagram illustrating one side surface of the electronic device, according to various embodiments.

FIG. 31B is a conceptual diagram illustrating one side surface of the electronic device 3100, according to various embodiments.

With reference to FIGS. 31A and 31B, the electronic device 3100 may include and/or may be similar in many respects to the electronic device 101 of FIG. 1 and the electronic device 300 of FIGS. 2A to 29B, and may include additional features not mentioned above. For example, the electronic device 3100 may be a Z-type multi-foldable terminal. For example, the electronic device 3100 may include a first housing 1031, a first hinge structure 1041 configured to couple with one side surface of the first housing 1031, a second housing 1032 configured to couple with one side surface of the first hinge structure 1041, a second hinge structure 1042 configured to couple with one side surface of the second housing 1032, and a third housing 1033 configured to couple with one side surface of the second hinge structure 1042.

The first housing 1031 and the second housing 1032 may be folded so that the respective first surfaces face each other using the first hinge structure 1041 as the central axis. The second housing 1032 and the third housing 1033 may be folded so that the respective second surfaces face each other using the second hinge structure 1042 as the central axis.

Figure 31C:
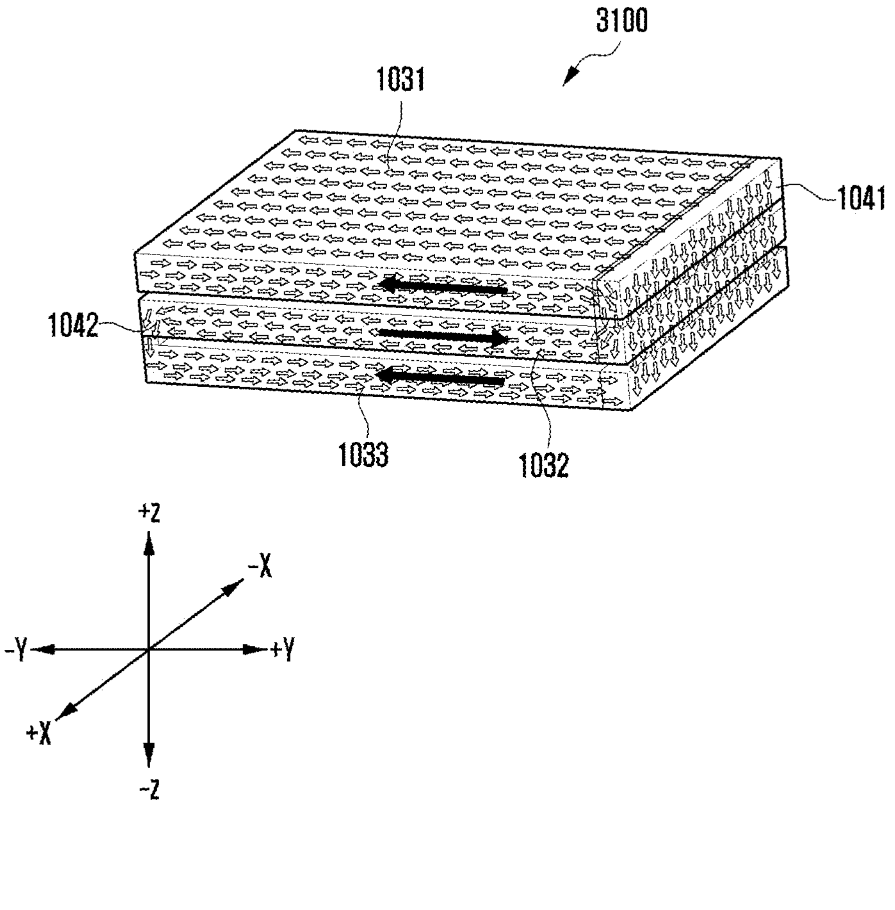
FIG. 31C is a conceptual diagram illustrating distribution of the surface current of the electronic device, according to various embodiments.

FIG. 31C is a conceptual diagram illustrating distribution of surface current induced on the surface of the electronic device 3100, according to various embodiments.

With reference to FIG. 31C, when the first surface of the first housing 1031 and the second surface of the second housing 1032 are folded to face each other using the first hinge structure 1041 as the central axis and the second surface of the second housing 1032 and the second surface of the third housing 1033 are folded to face each other based on the second hinge structure 1042, the first housing 1031, the first hinge structure 1041, the second housing 1032, the second hinge structure 1042, and the third housing 1033 may be electromagnetically coupled.

The surface current (e.g., first surface current J1) induced on the surface of the electronic device 3100 in the folded state may flow from one side surface of the third housing 1033 into the second hinge structure 1042, from the second hinge structure 1042 into one side surface of the second housing 1032, from one side surface of the second housing 1032 into the first hinge structure 1041, and from the first hinge structure 1041 into one side surface of the first housing 1031.

The electronic device 3100 may be a foldable terminal having conductive side surfaces or metal frames (e.g., first side surface 313*a*, second side surface 313*b*, third side surface 313*c*, first corner 313*d*, second corner 313*e*, fourth side surface 323*a*, fifth side surface 323*b*, sixth side surface 323*c*, third corner 323*d*, and fourth corner 323*e*). For example, each of the first housing 1031, the second housing 1032, and the third housing 1033 may include conductive side surfaces. At least one of the conductive side surfaces may be grounded to at least one support member of the first housing 1031, the second housing 1032, or the third housing 1033. The surface current may be induced on at least one of the conductive side surfaces as a portion of the first housing 1031, the second housing 1032, or the third housing 1033. A direction of the surface current induced on at least one of the conductive side surfaces may be the same as a direction of the surface current induced to the first housing 1031 or a direction of the surface current induced to at least one of the second housing 1032 and the third housing 1033. The surface current induced on the surface of the electronic device 3100 in the folded state may cause the first parasitic resonance. The first parasitic resonance may be referred to as PPW resonance.

In the electronic device 3100 in the folded state, when at least one of the conductive side surfaces is grounded to at least one support member of the first housing 1031, the second housing 1032, or the third housing 1033, the direction of the surface current (e.g., first surface current J1) induced on the surface of the electronic device 3100 and the direction of the surface current (e.g., second surface current J2) induced on the grounded at least one conductive side surface may be opposite to each other. The surface current (e.g., second surface current J2) induced on the grounded at least one conductive side surface may cause the second parasitic resonance. The second parasitic resonance may shift the frequency band of the first parasitic resonance. For example, the second parasitic resonance may cause the resonance-splitting phenomenon with respect to the first parasitic resonance.

Figure 31D:
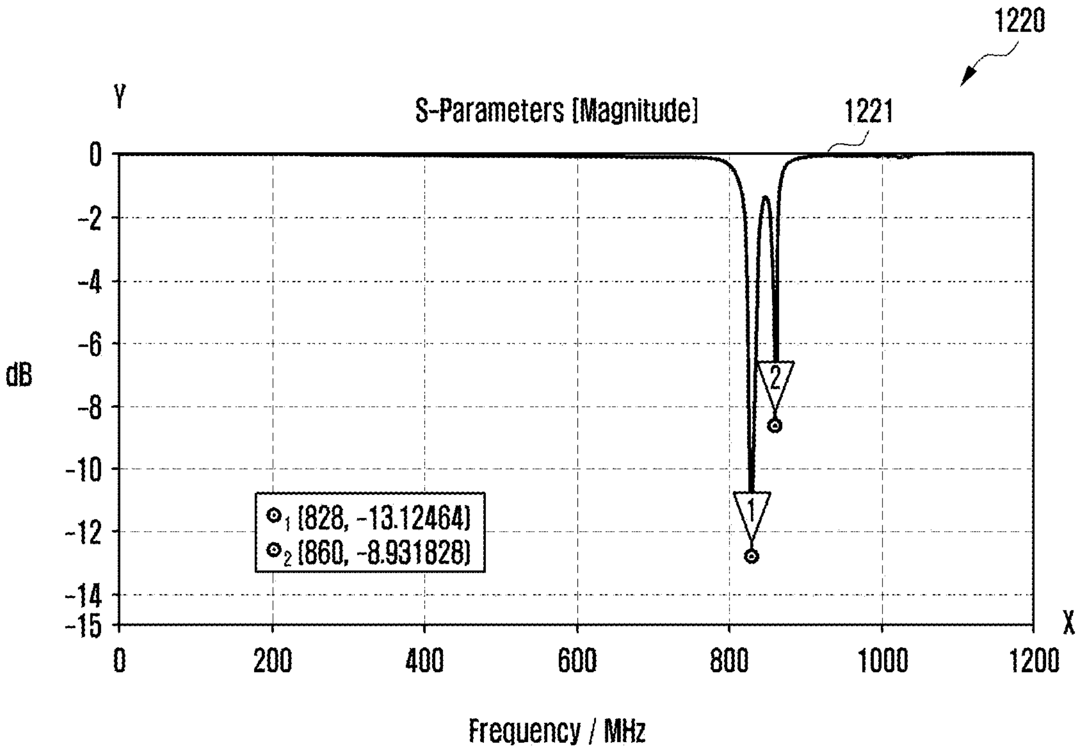
FIG. 31D is a graph showing a frequency of parasitic resonance formed in the electronic device in the folded state, according to various embodiments.

FIG. 31D is a graph 1220 showing a frequency of the first parasitic resonance formed by the surface current of the electronic device 3100 in the folded state, according to various embodiments.

With reference to FIG. 31D, the X-axis may represent a frequency band (MHz) and the Y-axis may represent a reflection coefficient (dB) of a mode of electric field formed in the electronic device 3100 in the folded state. A first graph 1221 represents a frequency of the first parasitic resonance formed by the surface current induced on the surface of the Z-type foldable terminal 3100 in the folded state. In the electronic device 3100 in the folded state, according to the present disclosure, when at least one of the conductive side surfaces is grounded to at least one support member of the first housing 1031, the second housing 1032, or the third housing 1033, the frequency band of the first parasitic resonance may shift according to the resonance-splitting phenomenon. For example, the first graph 1211 may shift to a frequency band that does not overlap a frequency band of a transmission signal from the radiator of the electronic device 3100. Therefore, communication performance and efficiency of the electronic device 3100 may be improved.

Figure 32A:
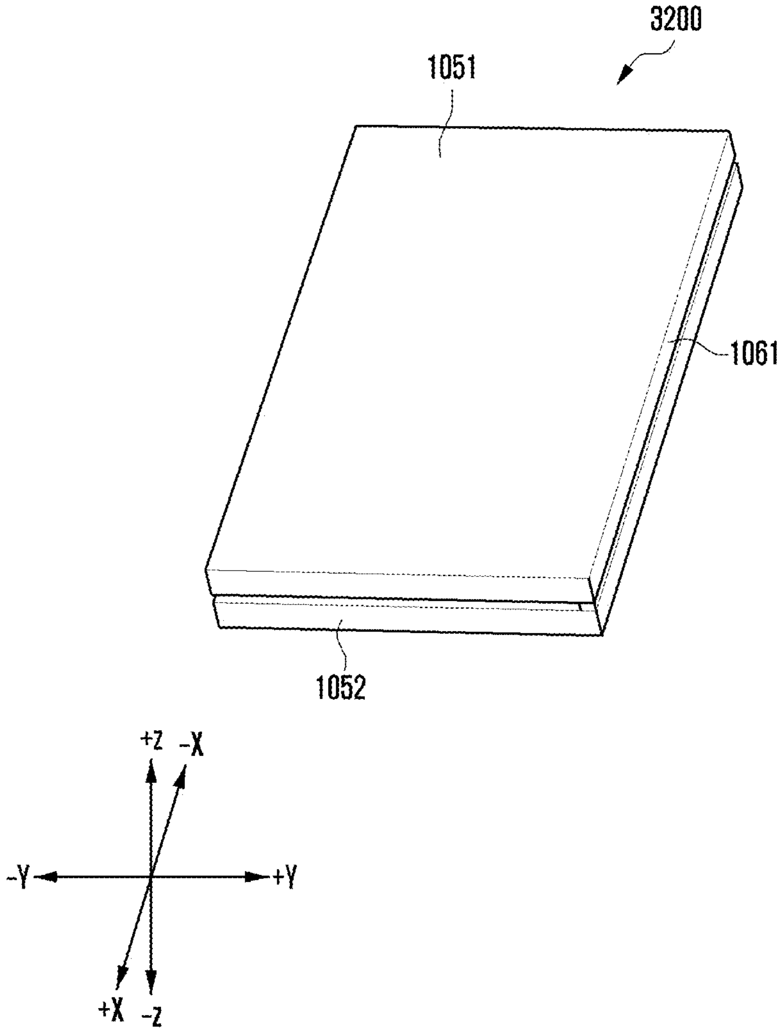
FIG. 32A is a conceptual diagram illustrating the electronic device, according to various embodiments.

FIG. 32A is a conceptual diagram illustrating the electronic device 3200, according to various embodiments.

Figure 32B:
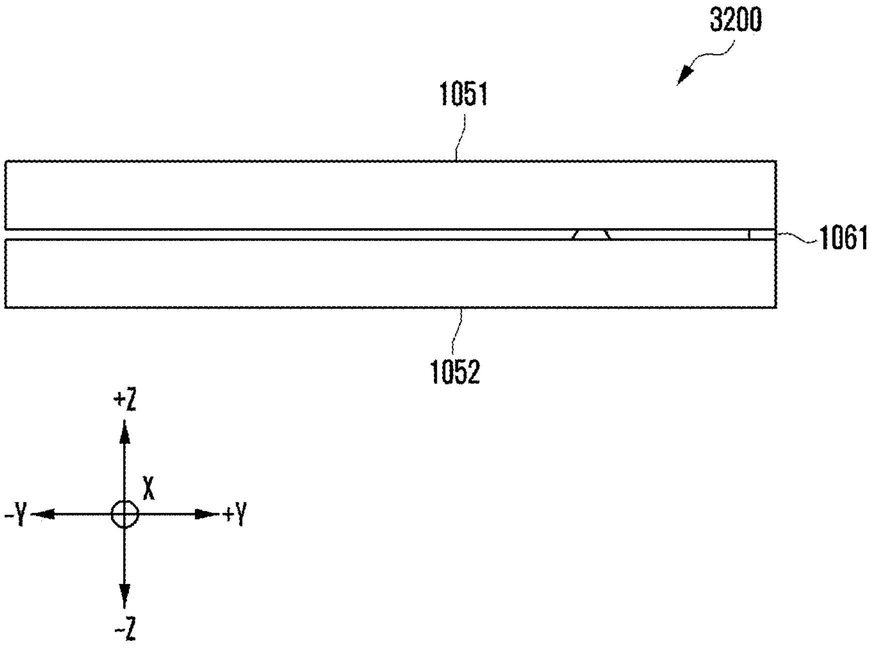
FIG. 32B is a conceptual diagram illustrating one side surface of the electronic device, according to various embodiments.

FIG. 32B is a conceptual diagram illustrating one side surface of the electronic device 3200, according to various embodiments.

With reference to FIGS. 32A and 32B, the electronic device 3200 may include and/or may be similar in many respects to the electronic device 101 of FIG. 1 and the electronic device 300 of FIGS. 2A to 29B, and may include additional features not mentioned above. For example, the electronic device 3200 may be a wide foldable terminal. The electronic device 3200 may include a first housing 1051, a hinge structure 1061 configured to couple with one side surface of the first housing 1051, and a second housing 1052 configured to couple with one side surface of the hinge structure 1061. In the electronic device 3200 based on the X-Y plane, the hinge structure 1061 may be aligned in the X-axis direction. Therefore, the first housing 1051 or the second housing 1052 may be folded in the Y-axis direction using the hinge structure 1061 aligned in the X-axis direction as the central axis. For example, the electronic device 3200 may be folded so that the first surface of the first housing 1051 and the second surface of the second housing 1052 face each other using the hinge structure 1061 as the central axis.

Figure 32C:
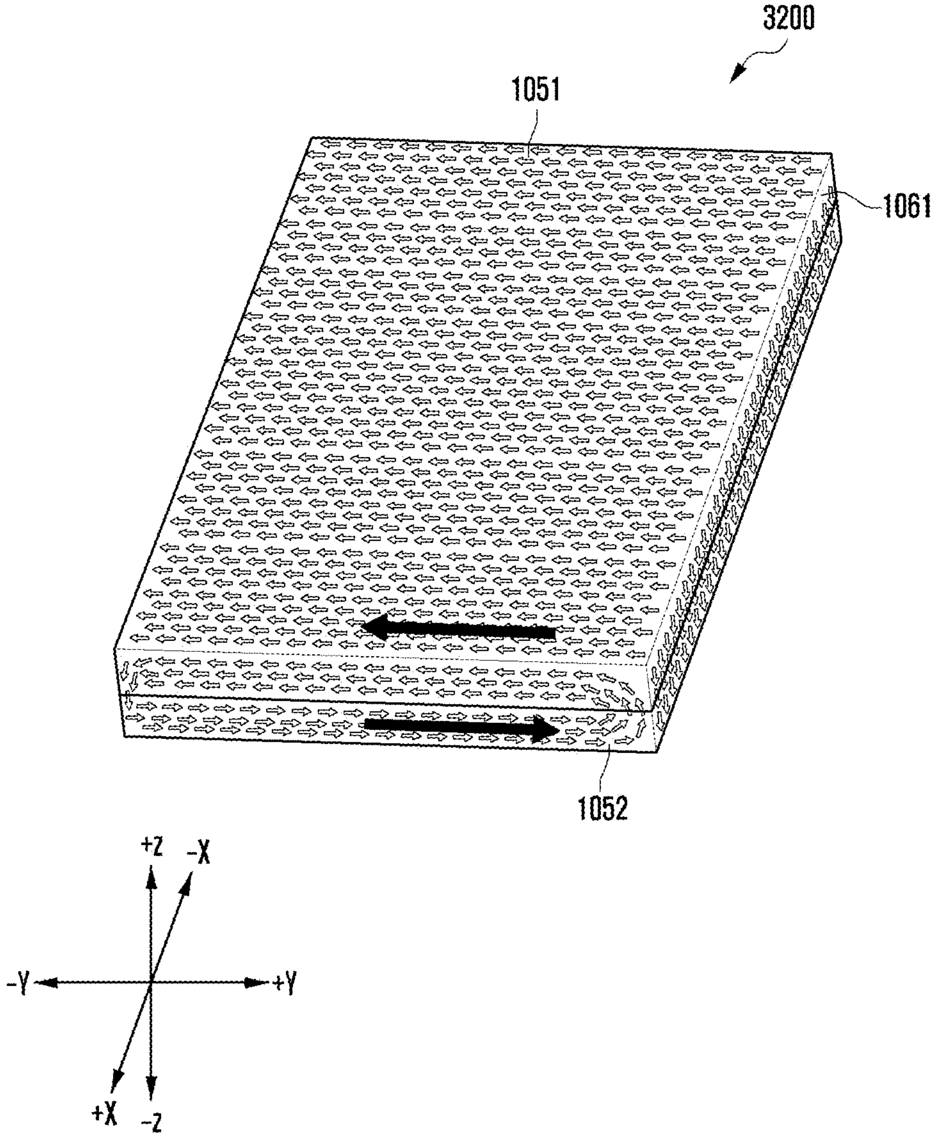
FIG. 32C is a conceptual diagram illustrating distribution of the surface current of the electronic device, according to various embodiments.

FIG. 32C is a conceptual diagram illustrating distribution of the surface current induced on the surface of the electronic device 3200 in the folded state, according to various embodiments.

With reference to FIG. 32C, in the electronic device 3200, when the first surface of the first housing 1051 and the first surface of the second housing 1052 are folded to face each other using the hinge structure 1061 as the central axis, the first housing 1051, the hinge structure 1061, and the second housing 1052 may be electrically coupled.

For example, the first housing 1051, the hinge structure 1061, and the second housing 1052 of the electronic device 3200 in the folded state may become equivalent to the form of a shielded parallel plate. Since the electric field (E-Field) of the electronic device 3200 in the folded state is proportional to potential, the potential may be zero (0) in the hinge structure 1061 to which the first housing 1051 and the second housing 1052 are grounded and magnitude of the electric field may be zero (0) accordingly. Alternatively, in the electronic device 3200 in the folded state, since the potential increases as a distance away from the hinge structure 1061 increases, the magnitude of the electric field may also increase.

The surface current induced on the surface of the electronic device 3200 in the folded state may flow from the hinge structure 1061 into one side surface of the first housing 1051, from one side surface of the first housing 1051 into the other side surface of the first housing 1051, from the other side surface of the first housing 1051 into the other side surface of the second housing 1052, from the other side surface of the second housing 1052 into the one side surface of the second housing 1052, and from one side surface of the second housing 1052 back into the hinge structure 1061 in a circulative manner.

In an embodiment, the electronic device 3200 may be and/or may include a foldable terminal having conductive side surfaces or metal frames (e.g., first side surface 313*a*, second side surface 313*b*, third side surface 313*c*, first corner 313*d*, second corner 313*e*, fourth side surface 323*a*, fifth side surface 323*b*, sixth side surface 323*c*, third corner 323*d*, and fourth corner 323*e*). For example, each of the first housing 1051 and the second housing 1052 may include conductive side surfaces. The surface current may be induced on at least one of the conductive side surfaces as a portion of at least one of the first housing 1051 and the second housing 1052. A direction of the surface current induced on at least one of the conductive side surfaces may be the same as a direction of the surface current induced to the first housing 1051 or a direction of the surface current induced to the second housing 1052. The surface current induced to the first housing 1051 or the second housing 1052 may cause the first parasitic resonance. At least one of the conductive side surfaces may be grounded to at least one support member of the first housing 1051 or the second housing 1052. When at least one of the conductive side surfaces is grounded to at least one support member of the first housing 1051 or the second housing 1052, the surface current (e.g., second surface current J2) that flows in a direction opposite to that of the surface current (e.g., first surface current J1) induced to the first housing 1051 or the second housing 1052 may be induced on the surface of the grounded conductive side. The surface current induced on the surface of the grounded conductive side surface may cause the second parasitic resonance. The second parasitic resonance may shift the frequency band of the first parasitic resonance. For example, the resonance-splitting phenomenon may occur between a frequency of the second parasitic resonance and a frequency of the first parasitic resonance.

Figure 32D:
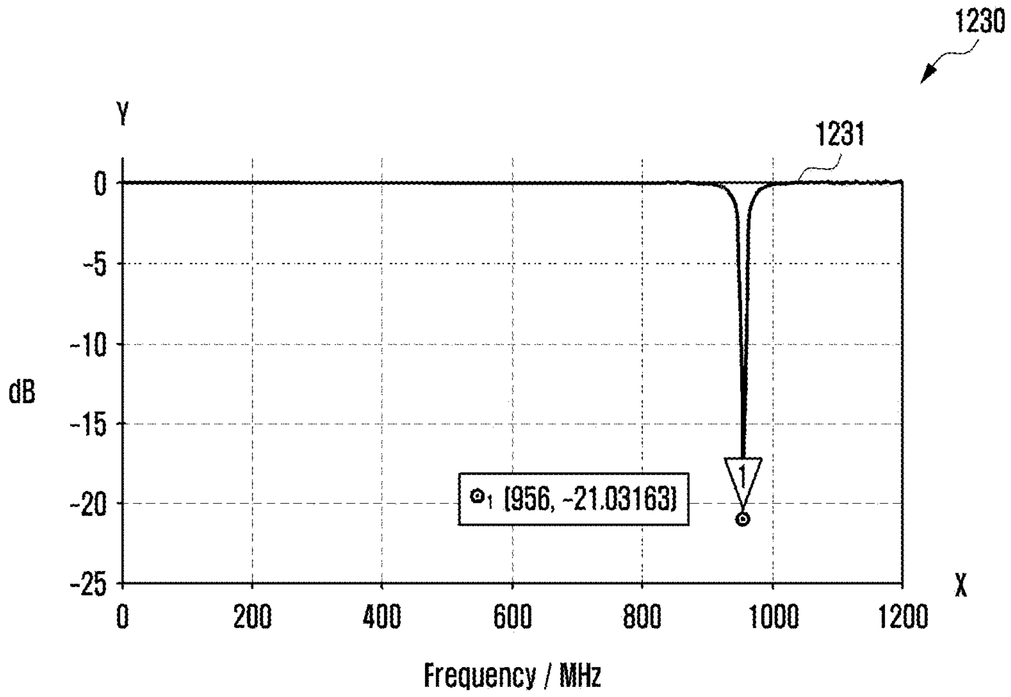
FIG. 32D is a graph showing a frequency of parasitic resonance formed in the electronic device in the folded state, according to various embodiments.

FIG. 32D is a graph 1230 showing a frequency 1231 of the first parasitic resonance formed by the surface current induced on the surface of the electronic device 3200 in the folded state, according to various embodiments.

With reference to FIG. 32D, the X-axis may represent a frequency band (MHz) and the Y-axis may represent a reflection coefficient (dB) of a mode of electric field formed in the electronic device 3200 in the folded state. A first graph 1231 represents a frequency of the first parasitic resonance formed by the surface current induced on the surface of the wide foldable terminal 3200 in the folded state. In the electronic device 3200 in the folded state, according to the present disclosure, when at least one of the conductive side surfaces is grounded to at least one support member of the first housing 1051 or the second housing 1052, the frequency band of the second parasitic resonance may shift according to the resonance-splitting phenomenon. For example, the first graph 1231 may shift to a frequency band that does not overlap a frequency band of a transmission signal from the radiator of the electronic device 3200. Therefore, communication performance and efficiency of the wide foldable terminal 3200 may be improved.

Figure 33A:
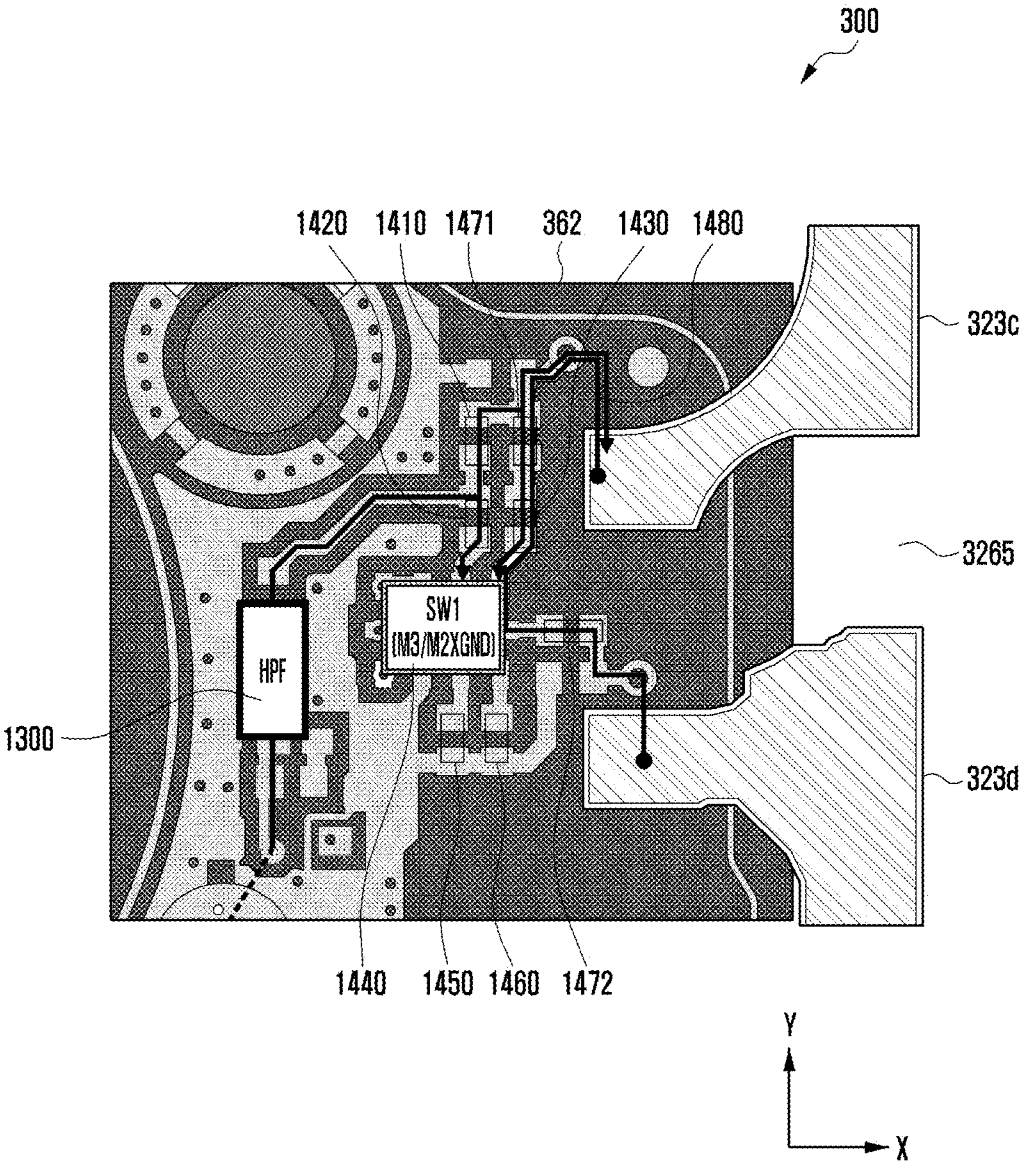
FIG. 33A is a conceptual diagram illustrating a connection structure among a matching circuit unit, the sixth side surface, the third corner, and/or a wireless communication module in the electronic device, according to various embodiments.

FIG. 33A is a conceptual diagram illustrating a connection structure among a matching circuit unit 1400, the sixth side surface 323*c*, the third corner 323*d*, and/or the wireless communication module 192 in the electronic device 300, according to various embodiments.

With reference to FIG. 33A, the matching circuit unit may be provided to the second plate assembly 362 (e.g., second plate or sub-printed circuit board). The matching circuit unit 1400 may include a high-pass filter (HPF) 1300. For example, the high-pass filter 1300 may be electrically connected to the wireless communication module 192. The matching circuit unit 1400 may include a capacitor 1410, a first inductor 1420, a second inductor 1430, a switch 1440, a first ground element 1450, a second ground element 1460, and a conductive line 1480. For example, the matching circuit unit 1400 may be the same as or similar to the second matching circuit unit 922 of FIG. 20A. For example, the switch 1440 may be the same as or similar to the third switch 922*a* of FIG. 20A. The first inductor 1420 and the second inductor 1430 may be the same as or similar to the plurality of inductors 922*b* of FIG. 20A. For example, a first stage of the matching circuit unit 1400 may be electrically connected to a wireless communication module 192. A second stage of the matching circuit unit 1400 may be electrically connected to the sixth side surface 323*c*. A third stage of the matching circuit unit 1400 may be electrically connected to the third corner portion 323*d*.

Figure 33B:
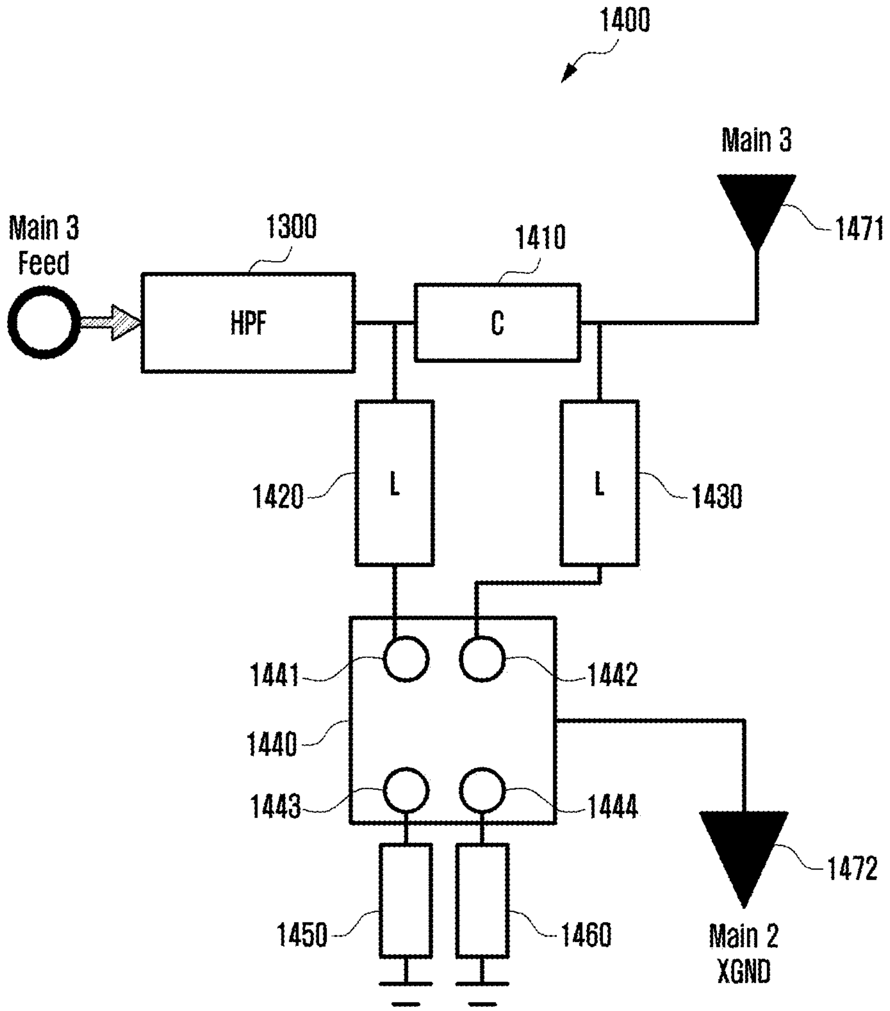
FIG. 33B is a circuit diagram illustrating the matching circuit unit of the electronic device, according to various embodiments.

FIG. 33B is a circuit diagram illustrating the matching circuit unit 1400 of the electronic device 300, according to various embodiments.

With reference to FIG. 33B, the matching circuit unit 1400 may include the high-pass filter 1300, the capacitor 1410, the first inductor 1420, the second inductor 1430, the switch 1440, the first ground element 1450, the second ground element 1460, a first connection element 1471, and a second connection element 1472. The switch 1440 may include a first port 1441, a second port 1442, a third port 1443, and a fourth port 1444.

One end of the high-pass filter 1300 may be electrically connected to a feed (e.g., Main 3 Feed) of the second housing 320. For example, the feed may include and/or may be similar in many respects to the wireless communication module 192 of FIG. 20A, and may include additional features not mentioned above. The other end of the high-pass filter 1300 may be electrically connected to one end of the capacitor 1410 and one end of the first inductor 1420.

One end of the capacitor 1410 may be electrically connected to the other end of the high-pass filter 1300 and one end of the first inductor 1420. The other end of the capacitor 1410 may be electrically connected to one end of the second inductor 1430 and one end of the first connection element 1471.

One end of the first inductor 1420 may be electrically connected to the other end of the high-pass filter 1300 and one end of the capacitor 1410. The other end of the first inductor 1420 may be electrically connected to the first port 1441.

One end of the second inductor 1430 may be electrically connected to the other end of the capacitor 1410 and one end of the first connection element 1471. The other end of the second inductor 1430 may be electrically connected to the second port 1442.

One end of the first connection element 1471 may be electrically connected to the other end of the capacitor 1410 and one end of the second inductor 1430. The other end of the first connection element 1471 may be electrically connected to the fifth side surface 323*b*.

One end of the first ground element 1450 may be electrically connected to the third port 1443. The other end of the first ground element 1450 may be electrically connected to the second plate assembly 362 of the second housing 320.

One end of the second ground element 1460 may be electrically connected to the fourth port 1444. The other end of the second ground element 1460 may be grounded to the second plate assembly 362 of the second housing 320.

One end of the second connection element 1472 may be electrically connected to the switch 1440. For example, the other end of the second connection element 1472 may be electrically connected to the third corner 323*d*.

An electronic device 300, according to an embodiment of the present disclosure, may include a first housing 310; a hinge structure 340 configured to couple with one side surface of the first housing 310; a second housing 320 configured to couple with the hinge structure 340 to face the first housing 310 using the hinge structure 340 as the central axis; and a wireless communication circuit 192 provided to a second support member 3231 provided to the second housing 320. The second housing 320 may include a sixth side portion 323*c* including a conductive portion; a fifth side portion 323*b* provided to face the sixth side portion 323*c* and including a conductive portion; a fourth side portion 323*a* provided to face the hinge structure 340 and including a conductive portion; a third corner portion 323*d* provided between the sixth side portion 323*c* and the fourth side portion 323*a* and including a conductive portion; a fourth corner portion 323*e* provided between the fifth side portion 323*b* and the fourth side portion 323*a* and including a conductive portion; and a first matching circuit unit 921 provided to the second support member 3231 and electrically connected to the sixth side portion 323*c* to induce second surface current J2 of which phase is opposite to that of first surface current J1 induced to the first housing 310, the second housing 320, and the hinge structure 340 when the electronic device 300 is in a folded state in which the first housing 310 and the second housing 320 are folded with respect to each other using the hinge structure 340 as the central axis.

Second parasitic resonance 521 formed by the second surface current J2 may be configured to shift a frequency band of first parasitic resonance induced by the first surface current.

The electronic device 300 may further include a first ground member 421 configured to ground the fourth side surface portion 323*a* to the second support member 3231.

The electronic device 300 may further include a first connecting portion 821 configured to electrically connect the fourth side portion 323*a* and the corner portion 323*d*.

The first connecting portion 821 may include a first switch 821*a* provided to the second support member 3231.

The first switch 821*a* may be turned on when the electronic device 300 is in the folded state and the first switch 821*a* may be turned off when the electronic device 300 is not in the folded state.

The fourth side portion 323*a* may be configured to receive an electrical signal from the wireless communication circuit 192 and to operate as a radiator 700 along with the first corner portion 313*d*.

One end of the first matching circuit unit 921 may be electrically connected to a first point of the second support member 3231. The other end of the first matching circuit unit 921 may be electrically connected to a first point of the sixth side portion 323*c*.

The first matching circuit unit 921 may include a second switch 921*a* and at least one first inductor 921*b*, and the second switch 921*a* may be turned on when the electronic device 300 is in the folded state and turned off when the electronic device 300 is not in the folded state.

A frequency of the second parasitic resonance 521 may have an electrical length from one end to the other end of the sixth side portion 323*c* in the first matching circuit unit 921.

An electronic device 300, according to an embodiment of the present disclosure, may include a first housing 310; a hinge structure 340 configured to couple with one side surface of the first housing 310; a second housing 320 configured to couple with the hinge structure 340 to face the first housing 310 using the hinge structure 340 as the central axis; and a wireless communication circuit 192 provided to a second support member 3231 provided to the second housing 320. The second housing 320 may include a sixth side portion 323*c* including a conductive portion; a fifth side portion 323*b* provided to face the sixth side portion 323*c* and including a conductive portion; a fourth side portion 323*a* provided to face the hinge structure 340 and including a conductive portion; a first corner portion 313*d* provided between the sixth side portion 323*c* and the fourth side portion 323*a* and including a conductive portion; a second corner portion 313*e* provided between the fifth side portion 323*b* and the fourth side portion 323*a* and including a conductive portion; and a first matching circuit unit 921 provided to the second support member 3231 and electrically connected to the sixth side portion 323*c* and the first corner portion 313*d* to induce second surface current J2 of which phase is opposite to that of first surface current J1 induced to the first housing 310, the second housing 320, and the hinge structure 340 when the electronic device 300 is in a folded state in which the first housing 310 and the second housing 320 are folded with respect to each other using the hinge structure 340 as the central axis.

Second parasitic resonance 521 formed by the second surface current J2 may be configured to shift a frequency band of first parasitic resonance induced by the first surface current.

The electronic device 300 may further include a first ground member 421 configured to ground the fourth side portion 323*a* to the second support member 3231.

The electronic device 300 may further include a first connecting portion 821 configured to electrically connect the fourth side portion 323*a* and the first corner portion 313*d*.

The first connecting portion 821 may include a first switch 821*a* provided to the second support member 3231.

The first switch 821*a* may be turned on when the electronic device 300 is in the folded state and the first switch 821*a* may be turned off when the electronic device 300 is not in the folded state.

The fourth side portion 323*a* may be configured to receive an electrical signal from the wireless communication circuit 192 and to operate as a radiator 700 along with the third corner portion 323*d*.

One end of the first matching circuit unit 921 may be electrically connected to a second point of the sixth side portion 323*c*. The other end of the first matching circuit unit 921 may be electrically connected to a second point of the third corner portion 323*d*.

The first matching circuit unit 921 may include a second switch 921*a* and at least one first inductor 821*b*.

The second switch 921*a* may be turned on when the electronic device 300 is in the folded state and turned off when the electronic device 300 is not in the folded state.

While this invention has been described with reference to illustrative embodiments, this description is not intended to be construed in a limiting sense. Various modifications and combinations of the illustrative embodiments, as well as other embodiments of the invention, may be apparent to persons skilled in the art upon reference to the description. It is therefore intended that the appended claims encompass any such modifications or embodiments.

What is claimed is:

1. An electronic device comprising:

a first housing;

a second housing comprising a second support member;

a hinge structure coupled with the first housing and the second housing so that the first housing and the second housing are foldable relative to each other using the hinge structure as a central axis; and a wireless communication circuit provided on the second support member of the second housing, wherein the second housing further comprises:

a sixth side portion provided at a side of the second housing, and comprising a first conductive portion;

a fifth side portion facing the sixth side portion and comprising a second conductive portion;

a fourth side portion facing the hinge structure and comprising a third conductive portion;

a third corner portion between the sixth side portion and the fourth side portion and comprising a fourth conductive portion;

a fourth corner portion between the fifth side portion and the fourth side portion and comprising a fifth conductive portion; and a first matching circuit on the second support member, and comprising a second switch and at least one first inductor, and wherein the first matching circuit is configured to:

turn on the second switch, to electrically couple between the second support member and the sixth side portion through the at least one first inductor, based on the electronic device being in a folded state; and turn off the second switch, to electrically decouple between the second support member and the sixth side portion, based on the electronic device being in an unfolded state.

2. The electronic device of claim 1, wherein a second surface current is induced in case that the second switch is turned on, the second surface current having a second phase opposite to a first phase of a first surface current induced on the first housing, the second housing, and the hinge structure, and wherein a second parasitic resonance formed by the second surface current is configured to shift a frequency band of a first parasitic resonance induced by the first surface current.

3. The electronic device of claim 1, further comprising:

a first ground member configured to electrically ground the fourth side portion to the second support member.

4. The electronic device of claim 1, further comprising:

a first connecting portion configured to electrically couple with the fourth side portion and the third corner portion.

5. The electronic device of claim 4, wherein the first connecting portion comprises a first switch on the second support member.

6. The electronic device of claim 5, wherein the first connecting portion is configured to:

turn on the first switch based on the electronic device being in the folded state; and turned off the first switch based on the electronic device not being in the folded state.

7. The electronic device of claim 4, wherein the fourth side portion is configured to:

receive, from the wireless communication circuit, an electrical signal; and operate as a radiator along with the third corner portion.

8. The electronic device of claim 1, wherein a first end of the first matching circuit is electrically coupled with a first point of the second support member, and wherein a second end of the first matching circuit is electrically coupled with a first point of the sixth side portion.

9. The electronic device of claim 7, wherein a frequency of a second parasitic resonance has an electrical length from one end to another end of the sixth side portion in the first matching circuit.

10. An electronic device comprising:

a first housing;

a second housing comprising a second support member;

a hinge structure coupled with the first housing and the second housing so that the first housing and the second housing are foldable relative to each other using the hinge structure as a central axis; and a wireless communication circuit provided on the second support member of the second housing, wherein the second housing further comprises:

a sixth side portion provided at a side of the second housing, and comprising a first conductive portion;

a fifth side portion facing the sixth side portion and comprising a second conductive portion;

a fourth side portion facing the hinge structure and comprising a third conductive portion;

a third corner portion between the sixth side portion and the fourth side portion and comprising a fourth conductive portion;

a fourth corner portion between the fifth side portion and the fourth side portion and comprising a fifth conductive portion; and a first matching circuit on the second support member, and comprising a second switch and at least one first inductor, wherein the first matching circuit is configured to:

turn on the second switch, to electrically couple between the second support member and the sixth side portion through the at least one first inductor, based on the electronic device being in a folded state; and turn off the second switch, to electrically decouple between the second support member and the sixth side portion, based on the electronic device being in an unfolded state.

11. The electronic device of claim 10, wherein a second surface current is induced in case that the second switch is turned on, the second surface current having a second phase opposite to a first phase of a first surface current induced on the first housing, the second housing, and the hinge structure, and wherein a second parasitic resonance formed by the second surface current is configured to shift a frequency band of a first parasitic resonance induced by the first surface current.

12. The electronic device of claim 10, further comprising:

a first ground member configured to electrically ground the fourth side portion to the second support member.

13. The electronic device of claim 10, further comprising:

a first connecting portion configured to electrically couple with the fourth side portion and the third corner portion.

14. The electronic device of claim 13, wherein the first connecting portion comprises a first switch on the second support member.

15. The electronic device of claim 14, wherein the first connecting portion is configured to:

turn on the first switch based on the electronic device being in the folded state; and turn off the first switch based on the electronic device not being in the folded state.

16. The electronic device of claim 13, wherein the fourth side portion is configured to:

receive, from the wireless communication circuit, an electrical signal; and operate as a radiator along with the third corner portion.

17. The electronic device of claim 10, wherein a first end of the first matching circuit is electrically coupled with a second point of the sixth side portion, and wherein a second end of the first matching circuit is electrically coupled with a second point of the third corner portion.

* * * * *